United States Patent
Omura

(10) Patent No.: US 12,419,286 B2
(45) Date of Patent: Sep. 23, 2025

(54) REEL SEAT AND FISHING ROD INCLUDING SAME

(71) Applicant: FUJI KOGYO CO., LTD., Shizuoka (JP)

(72) Inventor: Kazuhito Omura, Shizuoka (JP)

(73) Assignee: FUJI KOGYO CO., LTD., Shizuoka (JP)

( * ) Notice: Subject to any disclaimer, the term of this patent is extended or adjusted under 35 U.S.C. 154(b) by 0 days.

(21) Appl. No.: 18/400,942

(22) Filed: Dec. 29, 2023

(65) Prior Publication Data
US 2024/0156076 A1 May 16, 2024

Related U.S. Application Data

(62) Division of application No. 18/493,901, filed on Oct. 25, 2023.

(30) Foreign Application Priority Data

Nov. 3, 2022 (KR) .................. 10-2022-0145144
Jun. 14, 2023 (KR) .................. 10-2023-0076064

(51) Int. Cl.
*A01K 87/06* (2006.01)
*A01K 87/08* (2006.01)

(52) U.S. Cl.
CPC .............. *A01K 87/06* (2013.01); *A01K 87/08* (2013.01)

(58) Field of Classification Search
CPC .... A01K 87/08; A01K 87/008; A01K 87/009; A01K 87/06
See application file for complete search history.

(56) References Cited

U.S. PATENT DOCUMENTS

| 2,116,158 | A | | 5/1938 | Pontis |
| 2,180,323 | A | | 11/1939 | Maxwell |
| 2,826,852 | A | | 3/1958 | Wardrip |
| 4,209,931 | A | | 7/1980 | Vance |
| 4,485,580 | A | * | 12/1984 | Ohmura ................ A01K 87/06 43/22 |

(Continued)

FOREIGN PATENT DOCUMENTS

| CN | 1550132 A | * | 12/2004 | ............. A01K 87/06 |
| CN | 1717989 A | * | 1/2006 | |

(Continued)

*Primary Examiner* — Katelyn T Truong
(74) *Attorney, Agent, or Firm* — Oblon, McClelland, Maier &Neustadt, L.L.P.

(57) ABSTRACT

A reel seat coupling a reel to a rod body of a fishing rod and a fishing rod including the reel seat are provided. The reel seat includes a seat body coupled to the rod body, and movable hood movably coupled to the seat body. The seat body includes a curved surface portion formed between a projecting portion and a bulging portion, and the curved surface portion is arcuately curved so as to effectively deliver a bite signal to index and middle fingers. The movable hood includes a hood portion positioned at an opposite side of the projecting portion in a vertical direction, and an accommodating portion accommodating the projecting portion, thereby preventing the index finger from coming into contact with the hood portion. The movable hood includes a reinforcing cover, and the reinforcing cover reinforces the hood portion and a guide protrusion of the hood portion.

12 Claims, 39 Drawing Sheets

(56) References Cited

U.S. PATENT DOCUMENTS

| | | | |
|---|---|---|---|
| 4,653,217 A | 3/1987 | Ohmura | |
| 4,726,139 A * | 2/1988 | Tokuda | A01K 87/06 43/22 |
| 5,875,581 A * | 3/1999 | Yasui | A01K 87/06 43/22 |
| 5,904,000 A * | 5/1999 | Ohmura | A01K 87/06 43/22 |
| D569,945 S | 5/2008 | Omura | |
| 2004/0211108 A1 | 10/2004 | Ezuka | |
| 2010/0064571 A1 | 3/2010 | McCune | |
| 2015/0040463 A1 | 2/2015 | Lin | |
| 2020/0037590 A1 | 2/2020 | Taniguchi | |

FOREIGN PATENT DOCUMENTS

| | | | | |
|---|---|---|---|---|
| CN | 1720794 A | * | 1/2006 | |
| EP | 2888938 A1 | * | 7/2015 | A01K 87/06 |
| FR | 702778 A | * | 4/1931 | |
| GB | 2245468 A | | 1/1992 | |
| JP | 05-003740 A | | 1/1993 | |
| JP | H0626154 Y2 | * | 7/1994 | |
| JP | 09-298982 A | | 11/1997 | |
| JP | 2002-191268 A | | 7/2002 | |
| JP | 2007-216735 A | | 8/2007 | |
| JP | 2009065868 A | * | 4/2009 | |
| JP | 2009-247223 A | | 10/2009 | |
| JP | 2011-10593 A | | 1/2011 | |
| JP | 2018-192953 A | | 11/2016 | |
| JP | 2019-126261 A | | 8/2019 | |
| JP | 2019-146504 A | | 9/2019 | |
| JP | 2019-154371 A | | 9/2019 | |
| JP | 2019-180271 A | | 10/2019 | |
| JP | 2020-120593 A | | 8/2020 | |
| JP | 2020-127414 A | | 8/2020 | |
| JP | 2021-10362 A | | 2/2021 | |
| JP | 2021-10385 A | | 2/2021 | |
| JP | 115245153 A | | 10/2022 | |
| KR | 880000636 Y1 | * | 3/1988 | |
| KR | 910001486 Y1 | * | 3/1991 | |
| KR | 19980063812 U | * | 11/1998 | |
| KR | 20100128215 A | * | 12/2010 | |
| KR | 10-2150338 B1 | | 9/2020 | |
| KR | 10-2150347 B1 | | 9/2020 | |
| TW | 200939951 A | * | 10/2009 | |

* cited by examiner

REEL SEAT AND FISHING ROD INCLUDING SAME

CROSS-REFERENCE TO RELATED APPLICATIONS

This application is a division of U.S. application Ser. No. 18/493,901 filed Oct. 25, 2023, which is based upon and claims the benefit of priority from Korean Patent Application No. 10-2022-0145144 filed Nov. 3, 2022, and Korean Patent Application No. 10-2023-0076064 filed Jun. 14, 2023, the entire contents of each of which are incorporated herein by reference.

TECHNICAL FIELD

The present disclosure relates to a reel seat fixing a reel for fishing, and a fishing rod including such a reel seat.

BACKGROUND

To couple a reel for fishing to a rod body of a fishing rod, a reel seat capable of fixing the reel is connected to the rod body. The reel seat may have a seat body which is formed in a pipe shape such that the rod body is inserted into the reel seat. The seat body is coupled to the rod body, and has a fixed hood fixing one of the legs of the reel. A movable hood for fixing the other of the legs of the reel is coupled to the seat body so as to be movable in an axial direction of the rod body.

An angler can perform a casting motion, a palming motion, a hooking motion, a retrieving motion, or a motion of sensing a bite signal in a stationary state of the fishing rod. The casting motion means a motion of the angler casting a fishing rig including a lure by swinging the fishing rod. The palming motion means a motion of the angler controlling a rotation of a spool of a reel by pressing an edge of the spool by means of a palm in order to subdue a fish. The hooking motion means a motion of the angler hooking a fish's mouth by a fishing hook. The retrieving motion means a motion of the angler retrieving a fishing line and a fishing rig by winding a reel. The bite signal means a vibration delivered to the fishing rod when a fish bites a lure.

By way of example of the fishing reel, a spinning reel and a bait casting reel are known. The spinning reel is attached to a lower side of the seat body, and the bait casting reel is attached to an upper side of the seat body.

In fishing using the bait casting reel, the angler grips the seat body of the reel seat with four fingers other than a thumb and the four fingers are in contact with a lower surface of the seat body. Thus, the shape of the lower surface of the seat body is important for the above-described various motions in fishing or the sensing of a bite signal.

The bite signal can be delivered from the fishing line to the seat body in the form of a weak vibration, and can be delicately applied to the seat body. To sense a delicate bite signal, a skilled angler can lightly bring index and middle fingers into contact with the seat body in the state of relaxing the index and middle fingers. However, in the state of strongly gripping the seat body, the skilled angler cannot easily sense the delicate bite signal. An unskilled angler cannot sense the delicate bite signal because the unskilled angler strongly grips the seat body. Accordingly, the seat body of the reel seat is required to accurately deliver the bite signal to the fingertips so that a skilled angler or an unskilled angler can sense the delicate bite signal.

However, the seat body of the reel seat according to a prior art technique has a lower portion formed in a semi-cylindrical shape, and the semi-cylindrical lower surface of the seat body makes contact with the angler's fingers. A contact area between the lower surface of the seat body and the angler's fingers is small, and the lower surface of the seat body uniformly makes contact with the fingers. Thus, the seat body of the reel seat according to the prior art technique has a poor bite signal delivering performance.

Regarding the accurate delivery of a bite signal, a seat body having a thin thickness and a light weight may enhance the bite signal delivering performance. However, there has not been made any study on the shape of a seat body which is capable of accurately delivering a bite signal to the index and middle fingers in consideration of the form of delivering the bite signal to the seat body.

In the reel seat according to the prior art technique, the movable hood has a cylindrical shape as a whole. Thus, the angler's index finger can come into contact with the gap formed between the lower surface of the seat body and the lower end of the movable hood. If the index finger comes into contact with the gap, an unpleasant feel can be applied to the index finger, and a grip feel can be deteriorated thereby. In addition, the angler may make a mistake during the casting motion or the hooking motion.

To exclude the possibility that the index finger comes into contact with the gap, a movable hood that does not have a cylindrical shape may be taken into consideration. However, the movable hood that does not have a cylindrical shape may have a reduced strength. Accordingly, with regard to a reel seat having a movable hood that does not have a cylindrical shape, it is required to improve the strength of the movable hood. For example, with regard to a push-up force applied to the movable hood when the movable hood fixes the leg of the reel and a force of expanding the movable hood due to the shaking of the leg of the reel, it is required to improve the strength of the movable hood so that the movable hood can securely fix the leg of the reel without deformation of the movable hood.

SUMMARY

Disclosed embodiments provide a reel seat that solves at least one or more of the aforementioned problems of the prior art technique. One embodiment of the present disclosure provides a reel seat which does not provide an unpleasant feel to the angler's fingers and can accurately deliver a bite signal to index and middle fingers. One embodiment of the present disclosure provides a reel seat which has a thin thickness and a light weight, includes an integrally formed seat body, and has an improved bite signal delivering performance. One embodiment of the present disclosure provides a reel seat which includes a movable hood having an improved strength. One embodiment of the present disclosure provides a fishing rod including the above-described reel seat.

The disclosed embodiments relate to a reel seat for coupling a reel to a rod body of a fishing rod. According to one aspect of the embodiments of the reel seat, there is provided a reel seat which couples a reel having first and second legs to a rod body of a fishing rod and includes a seat body and a movable hood. The seat body has a grip body capable of being gripped by fingers, a cylindrical body extending frontward from the grip body, and a bore formed in the cylindrical body and the grip body in an axial direction of the rod body and capable of being coupled to the rod body. The movable hood is coupled to the cylindrical body so as to be movable along a central axis of the bore.

The grip body includes: a seating portion which forms a portion of an upper surface of the grip body, and on which the first and second legs are seated; a first hood portion located at a rear end of the seating portion and fixing the first leg; a projecting portion forming a front end of the grip body below the seating portion and protruding with respect to the cylindrical body along a circumferential direction of the central axis in a radially outward direction of the central axis; a bulging portion spaced apart rearward from the projecting portion and bulging in the radially outward direction; and a first curved surface portion formed between the projecting portion and the bulging portion.

The movable hood includes: a second hood portion formed so as to press and fix the second leg to the seating portion and positioned above the projecting portion in a vertical direction by moving alongside the projecting portion along the central axis; and an accommodating portion formed as a space located below the second hood portion in the vertical direction and accommodating the projecting portion.

In a side view of the seat body, the fast curved surface portion has a first lower end contour line arcuately curved so as to be concave with respect to the central axis. The first lower end contour line includes: a first concave arc line capable of making contact with an index finger, extending from a lower end of the projecting portion and having a first radius; and a second concave arc line capable of making contact with a middle finger, extending from the first concave arc line to the bulging portion and having a second radius larger than the first radius.

In one embodiment, in the side view of the seat body, the first lower end contour line has a first end point becoming a boundary between a lower end of the projecting portion and the first curved surface portion, a second end point becoming a boundary between the bulging portion and the first curved surface portion, and an uppermost point becoming a boundary between the first and second concave arc lines. The first concave arc line is a portion of a circumference line of a first imaginary circle, and the first imaginary circle has the first radius and passes through the first end point and the uppermost point. The second concave arc line is longer than the first concave arc line. The second concave arc line is a portion of a circumference line of a second imaginary circle. The second imaginary circle has the second radius, passes through the uppermost point and the second end point, and is circumscribed about the first imaginary circle at the uppermost point.

In one embodiment, the uppermost point is located on a first imaginary horizontal line parallel to the central axis, the second end point is located on a second imaginary horizontal line parallel to the central axis and located farther from the central axis than the first imaginary horizontal line, and the first end point is located on a third imaginary horizontal line parallel to the central axis and located farther from the central axis than the second imaginary horizontal line.

In one embodiment, the first end point is located between a first imaginary inclined line, which passes through the uppermost point and is inclined at 5° from the first imaginary horizontal line in a direction where the first end point exists, and a second imaginary inclined line, which passes through the uppermost point and is inclined at 15° from the first imaginary horizontal line in the direction where the first end point exists. The second end point is located between the first imaginary horizontal line and a third imaginary inclined line which passes through the uppermost point and is inclined at 5° from the first imaginary horizontal line in a direction where the second end point exists.

In one embodiment, the grip body has a first thickness defined between the bore and the uppermost point, and the first thickness is in the range of 0.3 mm to 1.0 mm.

In one embodiment, in a cross-sectional view of the seat body, the first curved surface portion has a first outer peripheral contour line arcuately curved so as to be convex with respect to the central axis. The first outer peripheral contour line includes a first convex arc line, and the first convex arc line is a portion of a circumference line of a third imaginary circle. The third imaginary circle has a third radius larger than a radius of an imaginary inscribed circle inscribed in the bore, and a center located above the central axis.

In one embodiment, the first convex arc line is a portion of the circumference line of the third imaginary circle having the center located between the seating portion and the bore and passing through the uppermost point, or a portion of the circumference line of the third imaginary circle having the center located above the seating portion and passing through the second end point.

In one embodiment, the grip body includes a second curved surface portion located in rear of the bulging portion and capable of making contact with a ring finger, and a trigger portion located in rear of the second curved surface portion, protruding downward and capable of being inserted between the ring finger and a little finger.

In one embodiment, in the side view of the seat body, the second curved surface portion has a second lower end contour line including a straight line parallel to the central axis. In the cross-sectional view of the seat body, the second curved surface portion has a second outer peripheral contour line including a second convex arc line. The second convex arc line is a portion of a circumference line of a fourth imaginary circle, and the fourth imaginary circle has a fourth radius larger than the radius of the imaginary inscribed circle inscribed in the bore and has a center on the central axis.

In one embodiment, the straight line of the second lower end contour line is located on the first imaginary horizontal line which passes through the uppermost point and is parallel to the central axis.

In one embodiment, the grip body has a second thickness defined by the bore and the second convex arc line, and the second thickness is in the range of 0.3 mm to 1.0 mm.

According to another aspect of the embodiments of the reel seat, there is provided a reel seat which couples a reel having first and second legs to a rod body of a fishing rod and includes a seat body and a movable hood. The seat body has a grip body capable of being gripped by fingers, a cylindrical body extending frontward from the grip body, and a bore formed in the cylindrical body and the grip body in an axial direction of the rod body and capable of being coupled to the rod body. The movable hood is movably coupled to the cylindrical body.

The grip body includes: a seating portion which forms a portion of an upper surface of the grip body, and on which the first and second legs are seated; a first hood portion located at a rear end of the seating portion and fixing the first leg; a projecting portion forming a front end of the grip body below the seating portion and protruding with respect to the cylindrical body along a circumferential direction of the central axis in a radially outward direction of the central axis; a bulging portion spaced apart rearward from the projecting portion and bulging in the radially outward direction; and a first curved surface portion formed between the projecting portion and the bulging portion. In a side view of the seat body, the first curved surface portion has a first lower end contour line arcuately curved so as to be concave with respect to the central axis. The first lower end contour line includes: a first concave arc line capable of making contact with an index finger, extending from a lower end of the projecting portion and having a first radius; and a second concave arc line capable of making contact with a middle ringer, extending from the first concave arc line to the bulging portion and having a second radius larger than the first radius. In a cross-sectional view of the seat body, the first curved surface portion has a first outer peripheral contour line arcuately curved so as to be convex with respect to the central axis. The first outer peripheral contour line includes a first convex arc line, and the first convex arc line has a third radius larger than a radius of an imaginary inscribed circle inscribed in the bore, and a center located above the central axis.

The cylindrical body has a male thread formed on an outer periphery, and a pair of guide grooves extending from a front end of the cylindrical body through the male thread along the central axis.

The movable hood includes a nut coupled to the male thread of the cylindrical body so as to be rotatable in the circumferential direction, and a movable body movable along the central axis by the nut.

The movable body includes: an annular portion to which the nut is relatively rotatably coupled; a second hood portion extending from the annular portion toward the first hood portion, formed so as to press and fix the second leg to the seating portion and positioned above the projecting portion in a vertical direction by moving alongside the projecting portion along the central axis; an accommodating portion located below the second hood portion, formed as a space between the annular portion and the second hood portion and accommodating the projecting portion; a guide protrusion formed on each of a pair of lateral end edges of the second hood portion in the circumferential direction and slidably inserted into each of the pair of guide grooves; and a reinforcing cover configured to cover an outer surface of the second hood portion and to be engaged with the pair of lateral end edges to reinforce the second hood portion and the guide protrusion.

According to a further aspect of the embodiments of the reel seat, there is provided a reel seat which couples a reel having first and second legs to a rod body of a fishing rod and includes a seat body and a movable hood. The seat body has a bore formed in an axial direction of the rod body and capable of being coupled to the rod body. The movable hood is coupled to the seat body so as to be movable along a central axis of the bore.

The seat body includes: a seating portion which forms a portion of an upper surface of the seat body or a portion of a lower surface of the seat body, and on which the first and second legs are seated; a first hood portion located at the seating portion so as to be located opposite to the movable hood and fixing the first leg; a projecting portion formed along a circumferential direction of the central axis at an opposite side of the seating portion with reference to the central axis and protruding in a radially outward direction of the central axis; a cylindrical end portion extending from the seating portion and the projecting portion along the central axis; a male thread formed on an outer periphery of the cylindrical end portion; and a pair of guide grooves extending from one end of the cylindrical end portion through the male thread to the projecting portion.

The movable hood includes a nut coupled to the male thread of the seat body so as to be rotatable in the circumferential direction, and a movable body movable along the central axis by the nut.

The movable body includes: an annular portion to which the nut is relatively rotatably coupled; a second hood portion extending from the annular portion toward the first hood portion, formed so as to press and fix the second leg to the seating portion and positioned at an opposite side of the projecting portion in a vertical direction by moving alongside the projecting portion along the central axis; an accommodating portion located at an opposite side of the second hood portion in the vertical direction, formed as a space between the annular portion and the second hood portion and accommodating the projecting portion; a guide protrusion formed on each of a pair of lateral end edges of the second hood portion in the circumferential direction and slidably inserted into each of the pair of guide grooves; and a reinforcing cover configured to cover an outer surface of the second hood portion and to be engaged with the pair of lateral end edges to prevent deformation of the second hood portion and the guide protrusion.

In one embodiment, the reinforcing cover includes a cover portion formed so as to be in close contact with the outer surface, and an engaging portion protruding from each lateral end of the cover portion in the circumferential direction. The engaging portion is engaged with one of the pair of lateral end edges. The accommodating portion has a pair of first edges becoming the pair of lateral end edges of the second hood portion respectively and parallel to the central axis, and a second edge interconnecting the pair of first edges. The projecting portion has edges formed in a shape corresponding to the pair of first edges and the second edge. One of the pair of first edges partially includes a surface of the engaging portion in the circumferential direction.

In one embodiment, the second hood portion has a pair of engaging grooves with each of which the engaging portion is engaged. The pair of engaging grooves are respectively formed along the pair of lateral end edges, and have a depth corresponding to a thickness of the engaging portion.

In one embodiment, the second hood portion has a seating groove which is formed between the pair of engaging grooves along the outer surface, and on which the cover portion is seated. The seating groove has a depth corresponding to a thickness of the cover portion.

In one embodiment, the guide protrusion includes a first protrusion portion extending from one of the pair of lateral end edges toward the central axis, and a second protrusion portion extending from the first protrusion portion beyond the central axis in the circumferential direction. Each of the pair of guide grooves has a circumferential surface and an inward surface. The circumferential surface of the guide groove is spaced apart from the central axis in the vertical direction and is capable of making contact with a circumferential surface of the second protrusion portion in the circumferential direction. The inward surface of the guide groove is located inside the projecting portion, and extends from the circumferential surface in the circumferential direction. The inward surface is capable of making contact with an outward surface of the second protrusion portion in the radially outward direction. The engaging portion is engaged with the one of the pair of lateral end edges so as to face toward the outward surface of the second protrusion portion to suppress deformation of the guide protrusion.

In one embodiment, the reinforcing cover includes at least one convex portion protruding from the engaging portion toward the central axis. The guide protrusion includes a concave portion, which is formed in the outward surface of the second protrusion portion to be adjacent to the first protrusion portion, and with which the convex portion is engaged. The convex portion is engaged with the concave portion to suppress deformation of the guide protrusion.

In one embodiment, the reinforcing cover is made of a metal material.

In one embodiment, the seating portion is located in the upper surface of the seat body. The seat body includes a curved surface portion which is arcuately curved so as to be concave with respect to the central axis, is located adjacent to the projecting portion and is capable of making contact with an index finger.

In one embodiment, the seating portion is located in the lower surface of the seat body, and the reinforcing cover is capable of making contact with an index finger. The seat body includes a curved surface portion which is arcuately curved so as to be concave with respect to the central axis, is located adjacent to the projecting portion and is capable of making contact with a thumb.

In one embodiment, the seating portion is located in the lower surface of the seat body, and the reinforcing cover is capable of making contact with a little finger. The seat body includes a curved surface portion, which is arcuately curved so as to be concave with respect to the central axis and is located adjacent to the projecting portion.

In the embodiments of the reel seat, the seat body is integrally formed and may be made of carbon fiber-reinforced thermoplastic resin.

The disclosed embodiments relate to a fishing rod including the reel seat. The fishing rod according to one embodiment includes a rod body, and the reel seat according to the above-described one embodiment.

According to one embodiment, the grip body of the seat body has the projecting portion located below the seating portion and forming the lower surface of the grip body, and the movable hood has the accommodating portion having a shape complementary to the projecting portion and accommodating the projecting portion. Thus, the reel seat according to one embodiment excludes the possibility that the angler's index finger comes into contact with a lower end of the second hood portion, and can allow the angler's fingers to grip the seat body without an unpleasant feel.

In the fishing using the reel seat according to one embodiment, a bite signal can be applied to the reel seat in the form of rotational vibration about a rotation center point adjacent to the trigger portion. According to the reel seat of one embodiment, the first concave arc line extending from the projecting portion and arcuately curved so as to be concave with respect to the central axis is formed in the index finger contact portion of the first curved surface portion, and the index finger contact portion can function like a perpendicular plane with respect to the vector of rotational force according to the rotational vibration. Thus, the index finger contact portion can deliver a bite signal, which becomes the rotational vibration applied to the seat body about the rotation center point, to the index finger, and the index finger can come into contact with the index finger contact portion of the first curved surface portion so as to suppress rotation of the reel seat.

In the fishing using the reel seat according to one embodiment, a bite signal can be applied to the reel seat in the form of linear vibration along the axial direction of the rod body. According to the reel seat of one embodiment, the second concave arc line is formed in the middle finger contact portion of the first curved surface portion, and the middle finger contact portion is inclined so as to have a pressure angle with respect to the central axis. Thus, the middle finger contact portion can deliver a bite signal, which becomes the linear vibration applied to the seat body along the central axis, to the middle finger as a resistance of the pressure angle.

According to one embodiment, the first curved surface portion has an outer peripheral contour line, which is arcuately curved so as to be convex with respect to the central axis and has a radius larger than a radius of the bore. The cross section of the first curved surface portion making contact with the index and middle fingers can have an outer peripheral shape that is symmetrical left and right and round flat. Accordingly, the reel seat according to one embodiment can increase the contact area between the index and middle fingers and the seat body even in the state where the index and middle fingers are lightly in contact with seat body regardless of the angler's right hand and left hand, and can improve a bite signal delivering performance for the index and middle fingers.

According to one embodiment, the first curved surface portion of the seat body has a shape that can relieve the tension of the index and middle fingers and can improve a bite signal sensitivity of the index and middle fingers. Thus, the seat body can have an improved bite signal delivering performance for the index and the middle fingers.

According to one embodiment, in the region of the second curved surface portion located in rear of the bulging portion and making contact with the ring finger, the seat body has no cavity and has a thin thickness. Thus, in the state where the ring finger and the little finger strongly grip the seat body and the ring finger is insensitive to a bite signal, the bite signal delivering performance for the ring finger can be improved.

According to one embodiment, the seat body is integrally formed using carbon fiber-reinforced thermoplastic resin having a low density and a high tensile strength. Thus, the first curved surface portion making contact with the index and middle fingers and the second curved surface portion making contact with the ring finger can have a thin thickness, the seat body can have a light weight, and the bite signal delivering performance in the first curved surface portion and the second curved surface portion can be improved.

According to one embodiment, the movable body of the movable hood includes the reinforcing cover, which is engaged with the lateral end edges of the second hood portion and covers the second hood portion. Thus, the second hood portion pressing the leg of the reel can be reinforced by the reinforcing cover, and the leg of the reel can be fixed so as not to shake in the width direction.

According to one embodiment, the guide protrusion includes the first protrusion portion protruding from the lateral end edge of the second hood portion toward the central axis, and the second protrusion portion extending from the first protrusion portion beyond the central axis. The circumferential surface of the first protrusion portion can be supported by the circumferential surface of the guide groove, and the outward surface of the second protrusion portion can be supported by the projecting portion. Thus, the reel seat according to one embodiment can have the annular portion of the movable body which can prevent the deformation and breakage of the movable body and can have a shorter length.

According to one embodiment, the reinforcing cover can reinforce the guide protrusion by being engaged with the guide protrusion at a position where the first protrusion portion changes to the second protrusion portion, and the leg of the reel can be fixed without shaking in the width direction.

According to one embodiment, the reinforcing cover covering the second hood portion is made of a metal material. Therefore, the reel seat can show an improved decorative property and a high-end feel.

BRIEF DESCRIPTION OF DRAWINGS

The accompanying drawings, which are incorporated in and constitute a portion of the specification, illustrate embodiments of the present disclosure, and together with the general description given above and the detailed description of the embodiments given below, serve to explain the principles of the present disclosure.

DETAILED DESCRIPTION

Figure 1:
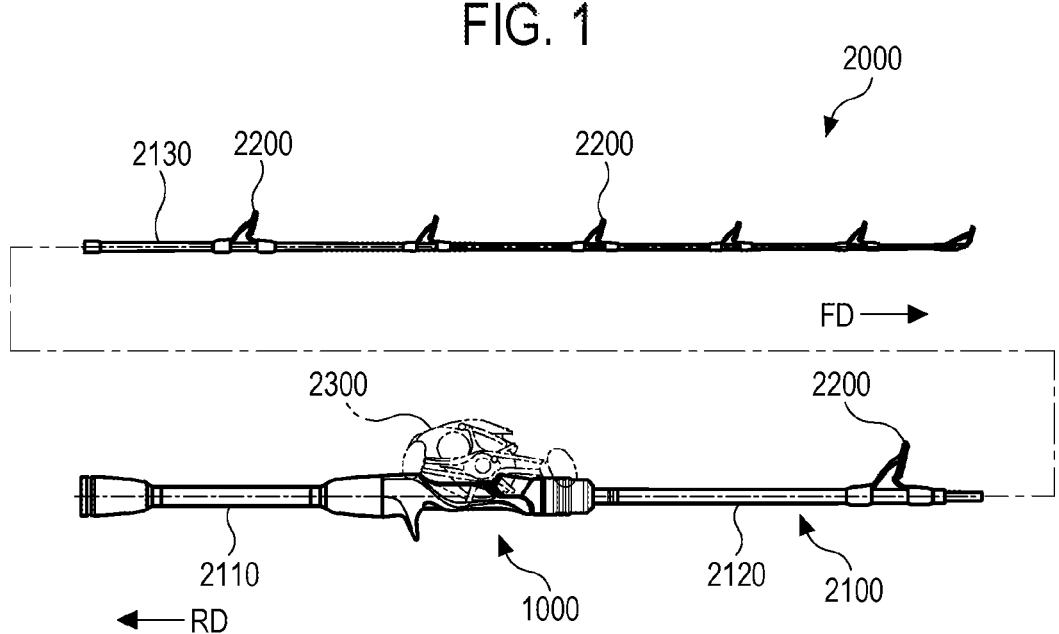
FIG. 1 is a side view showing a fishing rod according to one embodiment, which includes a reel seat according to one embodiment of the present disclosure.

Embodiments of the present disclosure are illustrated for the purpose of explaining the technical idea of the present disclosure. The scope of the rights according to the present disclosure is not limited to the embodiments presented below or the detailed descriptions of such embodiments.

All technical terms and scientific terms used in the present disclosure include meanings that are commonly understood by those of ordinary skill in the technical field to which the present disclosure pertains unless otherwise defined. All terms used in the present disclosure are selected for the purpose of describing the present disclosure more clearly, and are not selected to limit the scope of the rights according to the present disclosure.

Expressions such as "comprising," "including," "having," and the like used in the present disclosure are to be understood as open-ended terms having the possibility of encompassing other embodiments, unless otherwise mentioned in the phrase or sentence containing such expressions.

Singular expressions that are described in the present disclosure may encompass plural expressions unless otherwise stated, which will also apply to the singular expressions recited in the claims.

Expressions such as "first," "second," etc. used in the present disclosure are used to separate a plurality of elements from each other, and are not intended to limit an order or importance of the elements.

In the present disclosure, the description that one element is "connected" or "coupled" to another element should be understood to indicate that the aforesaid one element may be directly connected, or coupled, to the aforesaid another element, and should be further understood that the aforesaid one element may be connected or coupled to the aforesaid another element via a new element.

The dimensional and numerical values described in the present disclosure are not limited only to the dimensional and numerical values that are described herein. Unless specified otherwise, the dimensional and numerical values may be understood to mean the described values and equivalent ranges including the values.

The directional terms "frontward," "front" and the like used in the present disclosure mean a direction directed toward a tip of a fishing rod, while the directional terms "rearward," "rear" and the like mean a direction directed toward a butt of a fishing rod. For example, an arrow FD shown in FIG. 1 indicates a frontward direction directed toward a tip of a fishing rod, while an arrow RD shown in FIG. 1 indicates a rearward direction directed toward a butt of the fishing rod. The directional terms "upward," "upper" and the like used in the present disclosure and the directional terms "downward," "lower" and the like used in the present disclosure are based on an upward side and a downward side in the accompanying drawings.

Hereinafter, the embodiments of the present disclosure are described with reference to the accompanying drawings. Like reference numerals in the accompanying drawings denote like or corresponding elements. Further, in the following description of the embodiments, redundant descriptions for the same or corresponding elements may be omitted. However, even if the descriptions of the elements are omitted, such elements are not intended to be excluded in any embodiment.

Figure 2:
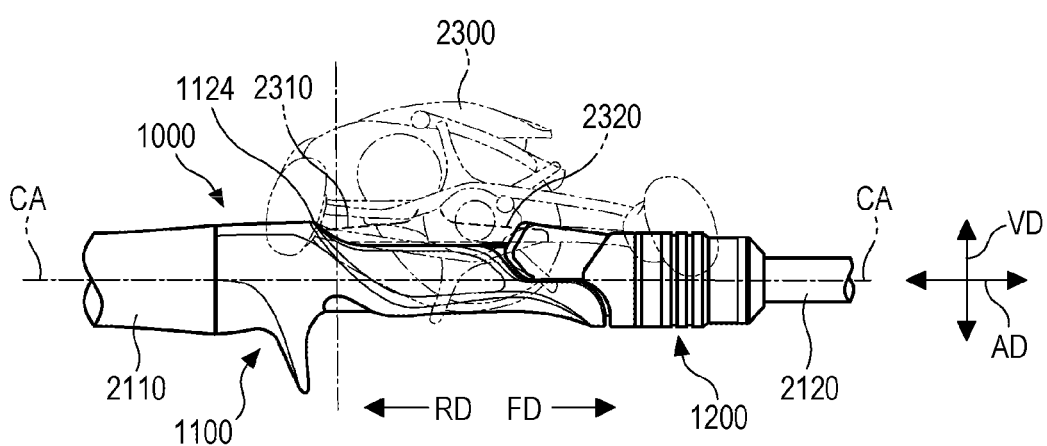
FIG. 2 is an enlarged side view of the fishing rod shown in FIG. 1.

FIG. 1 is a side view showing a fishing rod according to one embodiment, which includes a reel seat according to one embodiment. FIG. 2 is an enlarged side view of the fishing rod shown in FIG. 1. Reference is made to FIGS. 1 and 2.

A fishing rod 2000 includes a rod body 2100, which can elastically deform during fishing and has a thin and long shape. The fishing rod 2000 may include a single rod body or a plurality of rod bodies. The rod body may be a pipe-shaped part or a cylindrical column-shaped part.

The fishing rod 2000 shown in FIG. 1 includes a first rod body 2110, a second rod body 2120, and a third rod body 2130. By way of example, the first rod body 2110 may be referred to as a base rod body, and forms a butt side portion of the fishing rod. An angler may grip the first rod body 2110 during fishing. The second rod body 2120 and the third rod body 2130 may be connected in such a way that a rear end portion of the third rod body 2130 is fitted to a front end portion of the second rod body 2120. As another example, the fishing rod according to the embodiments may include a plurality of rod bodies connected in a telescopic manner.

The fishing rod 2000 may include a plurality of fishing line guides 220) attached to the second rod body 2120 and the third rod body 2130. The fishing line guide 2200 may include a guide ring through which a fishing line can pass, and a frame supporting the guide ring and attached to the rod body. The fishing line guide 2200 guides a fishing line that is released from a reel when casting a fishing rig or is wound on the reel when landing a fish.

The fishing rod 2000 includes a reel seat 1000 according to one embodiment of the present disclosure. The reel seat 1000 may be coupled to a rear end portion of the second rod body 2120, and a front end of the first rod body 2110 may be coupled to a rear end portion of the reel seat 1000. The reel seat 1000 fixes and supports a reel 2300 on which the fishing line is wound. An angler can manipulate the reel 2300 with one hand in the state where the angler grips the reel seat 1000 with the other hand. Thus, the reel seat 1000 can function as apart for coupling the reel to the rod body of the fishing rod and can function as a part gripped by the angler.

In the fishing rod of one embodiment, the reel 2300 may be a bait casting reel that is attached to an upper side of the reel seat 1000. In the bait casting reel, a rotary shaft of a spool for winding the fishing line is disposed so as to be orthogonal to the rod body, and the rotary shaft is supported at both sides thereof.

The reel 2300 has a first leg 2310 and a second leg 2320 extending in opposite directions. The first and second legs 2310 and 2320 are used to attach the reel 2300 to the reel seat 1000. In an example shown in FIG. 2, the first leg 2310 extends in a rearward direction RD, and the second leg 2320 extends in a frontward direction FD. The reel seat 1000 releasably fixes the first leg 2310 and the second leg 2320, whereby the reel 2300 can be detachably coupled to the reel seat 1000.

The reel seat 1000 includes a seat body 1100 that functions as a main body of the reel seat 1000. An angler may grip a portion of the seat body 1100. The first and second legs 2310 and 2320 of the reel are seated on an upper side of the seat body 1100, and the seat body 1100 fixes the first leg 2310. The reel seat 1000 includes a movable hood 1200 fixing the second leg 2320 of the reel to the seat body 1100. The movable hood 1200 is movably coupled to the seat body 1100.

Figure 3:
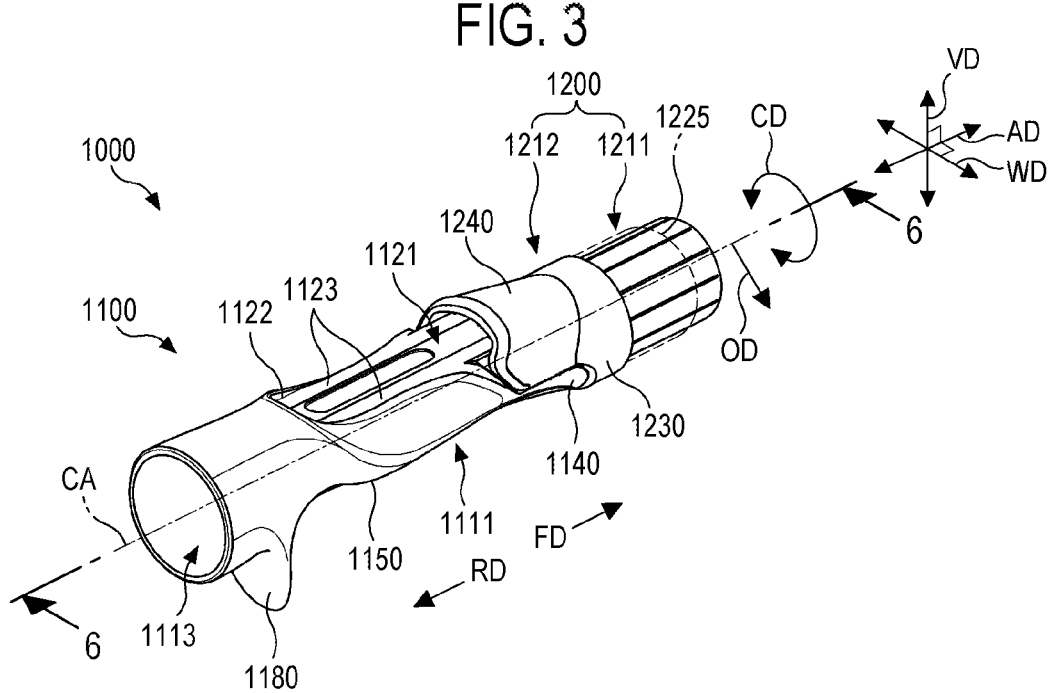
FIG. 3 is a perspective view showing a reel seat according to one embodiment.
Figure 4:
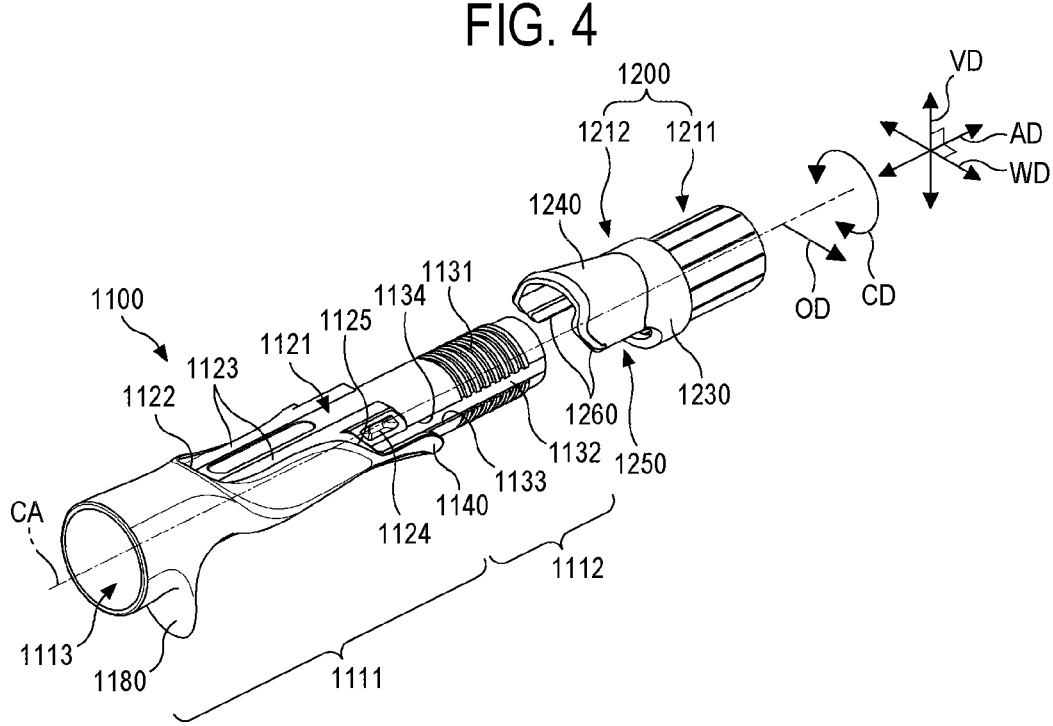
FIG. 4 is an exploded perspective view of the reel seat shown in FIG. 3.
Figure 5:
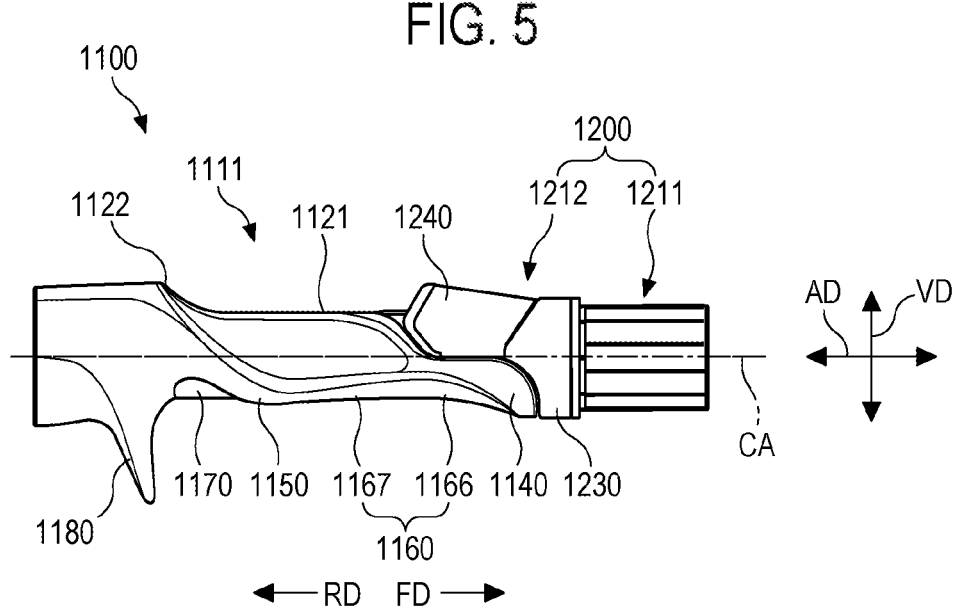
FIG. 5 is a side view of the reel seat shown in FIG. 3.
Figure 6:
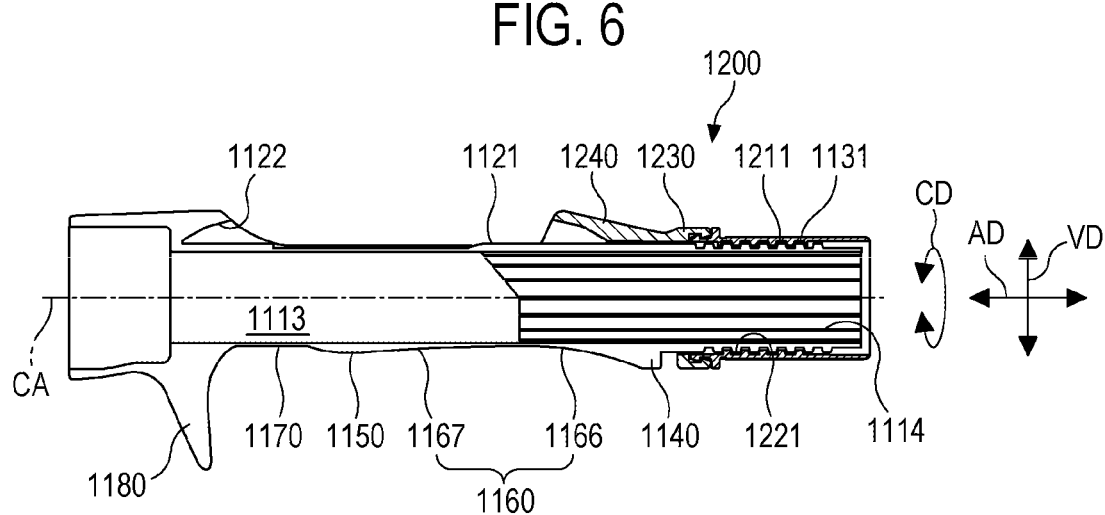
FIG. 6 is a cross-sectional view taken along line 6-6 of FIG. 3.
Figure 7:
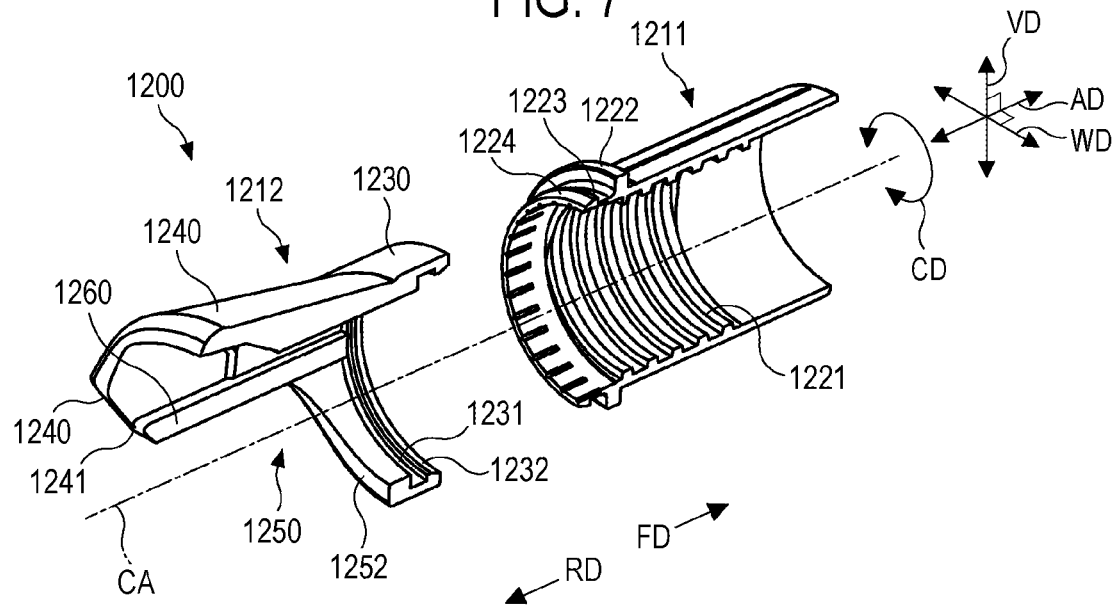
FIG. 7 is an exploded perspective view showing a cross-sectional shape of a movable hood of the reel seat according to one embodiment.
Figure 8:
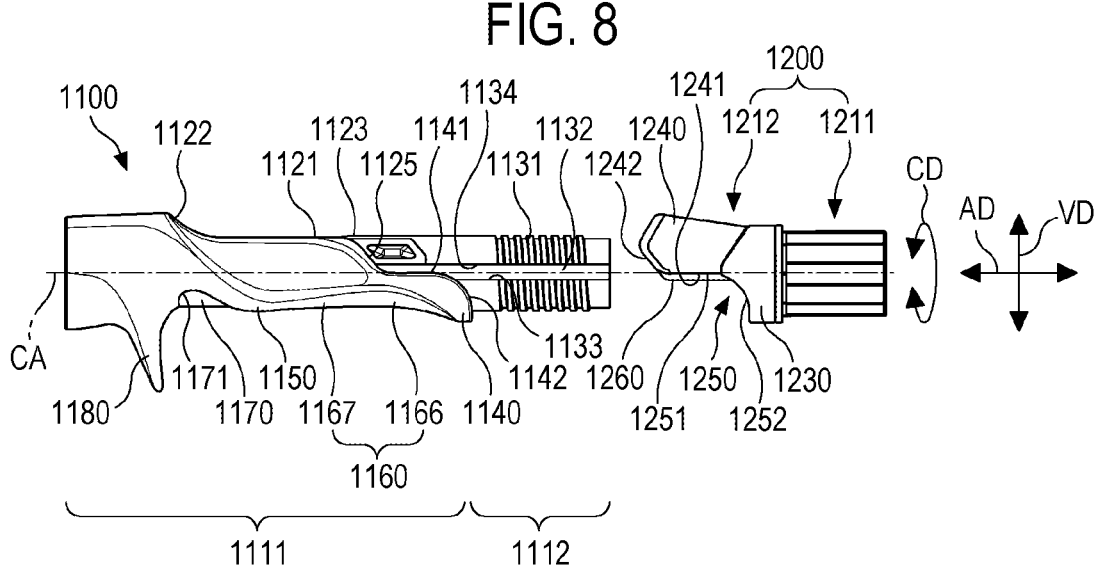
FIG. 8 is a side view of the reel seat shown in FIG. 4.
Figure 9:
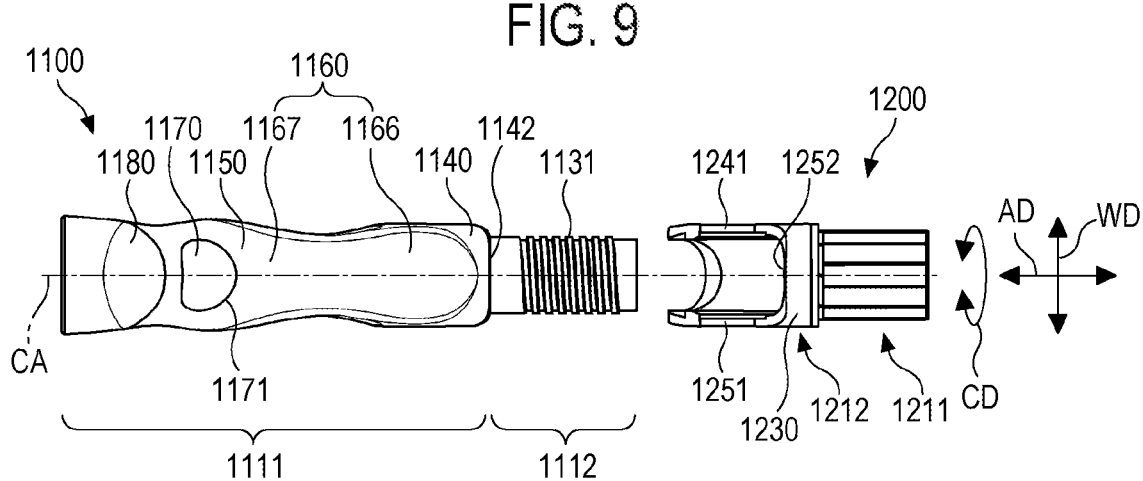
FIG. 9 is a bottom view of the reel seat shown in FIG. 4.

FIG. 3 is a perspective view showing the reel seat according to one embodiment. FIG. 4 is an exploded perspective view of the reel seat shown in FIG. 3. FIG. 5 is a side view of the reel seat shown in FIG. 3. FIG. 6 is a cross-sectional view taken along line 6-6 of FIG. 3. FIG. 7 is an exploded perspective view showing a cross-sectional shape of the movable hood of the reel seat according to one embodiment. FIGS. 8 and 9 are a side view and a bottom view of the reel seat shown in FIG. 4, respectively. Reference is made to FIGS. 3 to 9.

In the reel seat 1000 according to one embodiment, the seat body 110) functions to attach the reel seat to the rod body (e.g., the first rod body and the second rod body shown in FIG. 1) and functions to support the reel (e.g., the reel shown in FIG. 1). A portion of the seat body 1100 may be gripped by the angler's fingers, and the remaining portion of the seat body 1100 may be coupled to the movable hood 1200.

According to one embodiment, the seat body 1100 has a pipe shape. The seat body 1100 may be distinguished into a grip body 1111 and a cylindrical body 1112. The grip body 1111 may be gripped by the angler's fingers. The cylindrical body 1112 extends frontward from the grip body 1111. The cylindrical body 1112 functions as apart for coupling the movable hood 1200 to the seat body 1100 and movably supports the movable hood 1200.

The pipe-shaped seat body 1100 has a bore 1113 which is perforated in an axial direction AD of the rod body or in a longitudinal direction of the seat body. In this regard, the axial direction AD of the rod body means a direction extending through a center of a circular cross-sectional shape of the rod body in a longitudinal direction of the rod body. The bore 1113 is formed in the cylindrical body 1112 and the grip body 1111 in the axial direction AD of the rod body, and is capable of being coupled to the rod body (e.g., the first rod body and the second rod body shown in FIG. 1).

The bore 1113 is formed to be perforated through the seat body 1100 in the axial direction AD between front and rear ends of the seat body. The bore 1113 has a substantially circular cross-sectional shape and defines a central axis CA. In this regard, the central axis CA means an imaginary axis extending through a center of a cross-sectional shape of the seat body in the longitudinal direction of the seat body.

The rod body of the fishing rod may be inserted and fitted into the bore 1113. By way of example, the rear end portion of the second rod body 2120 shown in FIG. 1 is inserted and fitted into the bore 1113 from a front end of the cylindrical body 1112 (a front end of the seat body) along the central axis CA. The rear end portion of the second rod body may be coupled to the bore 1113 formed in the cylindrical body 1112 or the cylindrical body 1112 and the grip body 1111. The reel seat 1000 is attached to the second rod body 2120 inserted into the bore 1113. Further, by way of example, a front end portion of the first rod body 2110 shown in FIG. 1 is inserted and fitted into the bore 1113 from a rear end of the grip body 111 (a rear end of the seat body) along the central axis CA. The reel seat 1000 is attached to the first rod body 2110 and the second rod body 2120 inserted into the bore 1113. An adhesive is applied between a surface of the bore 1113 and outer peripheral surfaces of the rod bodies, whereby the reel seat 1000 and the rod bodies 2110 and 2120 can be coupled by adhesion. A plurality of grooves 1114 (see FIG. 6) may be formed on the surface of the bore 1113 along the central axis CA.

The grip body 1111 of the seat body supports the first and second legs of the reel on its upper surface. The grip body 1111 includes a seating portion 1121 on which the first and second legs are seated. The seating portion 1121 forms a portion of the upper surface of the grip body 1111 (or a portion of an upper surface of the seat body) along the central axis CA. By way of example, the seating portion 1121 may include surfaces of a pair of rail portions 1123 formed on the upper side of the grip body along the central axis CA. A groove 1124 recessed inwardly of the seat body is formed at a front end of each rail portion 1123.

The grip body 1111 has a first hood portion 1122 located at a rear end of the seating portion 1121. The first hood portion 1122 is located opposite to the movable hood 1200 along the central axis CA. The first hood portion 1122 is formed as a wedge-shaped groove at the rear end of the seating portion 1121. When the reel is attached to the seat body 1100, the first leg is inserted and fitted into the first hood portion 1122, and the first hood portion 1122 fixes the first leg to the seating portion 1121.

The grip body 1111 includes a projecting portion 1140 forming a front end portion of the grip body. When the angler grips the grip body 1111 of the seat body, the angler's index finger can come into contact with the projecting portion 1140. The projecting portion 1140 is located at the opposite side of the seating portion 1121 with reference to the central axis CA, and is formed in a circumferential direction CD of the central axis. The projecting portion 1140 is located below the seating portion 1121 with reference to the central axis CA. Further, the projecting portion 1140 projects in a radially outward direction OD of the central axis CA. Specifically, the projecting portion 1140 projects with respect to the cylindrical body 1112 in the radially outward direction OD.

The cylindrical body 1112 of the seat body forms a cylindrical end portion of the seat body that extends from the seating portion 1121 and the projecting portion 1140 along the central axis CA. The cylindrical body 1112 includes a male thread 1131 and a pair of guide grooves 1132. The male thread 1131 is formed on an outer periphery of the cylindrical body 1112 (or an outer periphery of the cylindrical end portion of the seat body). The male thread 1131 is located in a predetermined range between a front end of the cylindrical body and a front end of the grip body. The male thread 1131 is coupled to the movable hood 1200.

The pair of guide grooves 1132 extend along the central axis CA from the front end of the cylindrical body 1112 (one end of the seat body) through the male thread 1131 to the grip body 1111. The pair of guide grooves 1132 guide movement of the movable hood 1200 along the central axis CA. The pair of guide grooves 1132 are located opposite to each other with respect to the central axis CA of the bore 1113. A rear end of each guide groove 1132 is located between a lower end of a front end portion of the rail portion 1123 and an upper end edge of the projecting portion 1140.

Each guide groove 1132 may have first and second circumferential surfaces 1133 and 1134 facing toward each other in the circumferential direction CD, and a bottom surface extending along the central axis CA between the first and second circumferential surfaces. As shown in FIG. 8, the first and second circumferential surfaces 1133 and 1134 are located below and above the central axis CA. The first circumferential surface 1133 is located below the upper end edge of the projecting portion 1140. As another example, the first circumferential surface 1133 or the second circumferential surface 1134 may be located on the central axis CA.

The movable hood 1200 is coupled to the seat body so as to be movable along the central axis CA. Specifically, the movable hood 1200 is movably coupled to the cylindrical body 1112. The movable hood 1200 can be moved along the cylindrical body 1112 through a thread engagement action. The movable hood 1200 includes a nut 1211 causing the thread engagement action, and a movable body 1212 movable along the central axis CA by the nut 1211. The nut 1211 and the movable body 1212 are formed in a ring shape, and the cylindrical body 1112 passes through the nut 1211 and the movable body 1212.

The nut 1211 is rotatable along the outer periphery of the cylindrical body 1112. The nut 1211 is threadedly coupled to the male thread 1131 of the cylindrical body 1112 so as to be rotatable in the circumferential direction CD of the central axis CA. The nut 1211 has a female thread 1221 on its inner periphery. The female thread 1221 and the male thread 1131 are engaged to each other, whereby the nut 1211 is coupled to the cylindrical body 1112 so as to be movable through thread engagement action. As the nut 1211 is rotated in the circumferential direction CD, the nut 1211 may be moved in the rearward direction or the frontward direction by the thread engagement action between the female thread 1221 and the male thread 1131. The nut 1211 may have a cylindrical nut cover 1225 (see FIG. 3), which is fitted to an outer peripheral surface of the nut 1211 and has elasticity. The angler can rotate the nut 1211 by rotating the nut cover 1225.

The nut 1211 is connected to the movable body 1212 so as to be relatively rotatable in the circumferential direction CD. The movable body 1212 has a shape capable of covering and pressing the second leg of the reel. The movable body 1212 is movable in the axial direction AD along the central axis CA, but is not rotated in the circumferential direction CD. That is, the movable body 1212 is guided by the cylindrical body 1112 so as to be moved only along the central axis CA.

The movable body 1212 includes an annular portion 1230 to which the nut 1211 is relatively rotatably coupled. The nut 1211 includes, in the vicinity of its rear end, a flange 1222, an engagement groove 1223 adjacent to the flange 1222, and an engagement protrusion 1224 adjacent to the engagement groove 1223. The flange 1222 and the engagement groove 1223 extend in the circumferential direction CD. The annular portion 1230 of the movable body includes, at its front end, an engagement protrusion 1231 to be engaged with the engagement groove 1223 of the nut 1211, and an engagement groove 1232 adjacent to the engagement protrusion 1231 and engaged with the engagement protrusion 1224 of the nut 1211. The engagement between the engagement protrusion 1224 and the engagement groove 1232 provides relative rotation to the movable body 1212 and the nut 1211.

If the nut 1211 is rotated in one direction in the circumferential direction CD, the nut 1211 can move the movable body 1212 toward the first hood portion 1122 through the flange 1222 by the thread engagement action between the male thread 1131 and the female thread 1221. If the movable body 1212 is brought into contact with the second leg of the reel, as the nut 1211 is further rotated slightly, the movable body 1212 can press and fix the second leg to the seating portion 1121 of the grip body by the thread fastening force between the male thread 1131 and the female thread 1221. If the nut 1211 is rotated in a direction opposite to the one direction, the nut 1211 can be moved away from the first hood portion 1122 by the thread engagement action between the male thread 1131 and the female thread 1221. The engagement protrusion 1224 of the nut 1211 pulls the engagement protrusion 1231 of the movable body 1212 frontward, whereby the movable body 1212 can be moved away from the first hood portion 1122. As such, the nut 1211 is moved frontward or rearward along the central axis CA through the thread engagement action. The movable body 1212 is pushed toward or moved away from the first hood portion by the frontward or rearward movement of the nut 1211.

To guide the movement of the movable body 1212 along the central axis CA, the movable body 1212 includes a pair of guide protrusions 1260. Each guide protrusion 1260 protrudes inward from a circumferential edge of the movable body. The guide protrusions 1260 are slidably inserted into a pair of the guide grooves 1132, respectively. The guide grooves 1132 extend along the central axis CA, thereby preventing rotation of the guide protrusions 1260 in the circumferential direction CD. Therefore, the guide protrusions 1260 are guided only along the central axis CA by the guide grooves 1132, whereby the movable body 1212 can be moved only along the central axis CA. Each guide protrusion 1260 may have a width corresponding to a width of the guide groove in the circumferential direction CD. Referring to FIG. 8, in the side view of the reel seat, the guide protrusion 1260 may have a width corresponding to a distance between the first and second circumferential surfaces 1133 and 1134 located below and above the central axis CA, and the central axis CA may pass through the guide protrusion 1260. As another example, the guide protrusion 1260 may be formed such that the surface thereof in the circumferential direction CD is located on the central axis CA in the side view or the cross-sectional view of the reel seat.

In the reel seat of one embodiment, the seat body 1100 and the movable hood 1200 are configured such that, when the movable hood fixes the second leg, a portion of the movable hood is moved alongside a portion of the seat body along the central axis CA and the portion of the seat body and the portion of the movable hood are positioned in a vertical direction VD. Since the portion of the seat body and the portion of the movable hood are positioned vertically, the seat body can have a reduced overall length, and the angler's index finger can be prevented from coming into contact with the movable hood.

The movable body 1212 includes the annular portion 1230, a second hood portion 1240, an accommodating portion 1250, and a pair of the guide protrusions 1260. The second hood portion 1240 may form a portion of upper and rear portions of the movable body 1212. The accommodating portion 1250 is located at the opposite side of the second hood portion 1240 in the vertical direction VD. The accommodating portion 1250 may form a portion of lower and rear portions of the movable body 1212.

The second hood portion 1240 extends from the annular portion 1230 toward the first hood portion 1122 and may be formed in a shape covering the second leg of the reel. The second hood portion 1240 may be formed in a shape that substantially corresponds to a shape obtained by bisecting a truncated cone in the axial direction thereof. As the movable body 1212 is moved toward the first hood portion 1122 by the nut 1211, the second hood portion 1240 presses and fixes the second leg to the seating portion 1121 of the grip body. According to one embodiment of the present disclosure, the movable body 1212 may further include a reinforcing cover which is engaged with the second hood portion 1240 to reinforce the second hood portion 1240.

The accommodating portion 1250 is located at the opposite side of the second hood portion 1240 in the vertical direction VD, for example, below the second hood portion 1240. Assuming the truncated cone shape of the movable body 1212, the accommodating portion 1250 may be formed in a shape that corresponds to a shape obtained by cutting away such a truncated cone shape so that the second hood portion 1240 remains. Thus, the accommodating portion 1250 may be formed as a space located below the second hood portion 1240. Specifically, the accommodating portion 1250 may be formed as a space between the annular portion 1230 and the second hood portion 1240. As described above, the movable hood 1200 includes the second hood portion 1240 pressing and fixing the second leg to the seating portion 1121, and the accommodating portion 1250 located below the second hood portion 1240 in the vertical direction VD and formed as a space below the second hood portion 1240.

The second hood portion 1240 and the accommodating portion 1250 have a common edge in the circumferential direction CD. The guide protrusion 1260 is formed at each of a pair of lateral end edges 1241 of the second hood portion 1240 in the circumferential direction CD. Alternatively, the guide protrusion 1260 is formed at each of a pair of upper end edges of the accommodating portion 1250 in the circumferential direction CD. As such, the guide protrusion 1260 is formed along the lateral end edge 1241 of the second hood portion 1240 or the upper end edge of the accommodating portion 1250.

The projecting portion 1140 of the seat body and the accommodating portion 1250 of the movable body have a complementary shape. As the movable hood 1200 is moved toward the first hood portion 1122 to fix the second leg, the second hood portion 1240 of the movable body 1212 is moved alongside the projecting portion 1140 along the central axis CA, and the projecting portion 1140 is accommodated in the accommodating portion 1250. Therefore, when the movable hood 1200 fixes the second leg, a portion of the movable hood (e.g., the second hood portion 1240) and a portion of the seat body (e.g., the projecting portion 1140) are positioned in the vertical direction VD, and the portion of the movable hood is positioned above the projecting portion 1140.

The projecting portion 1140 is located opposite to the accommodating portion 1250 along the central axis CA. The accommodating portion 1250 is concave with respect to the projecting portion 1140. Thus, when the movable hood 1200 is moved toward the first hood portion 1122 to press and fix the second leg to the seating portion 1121, the projecting portion 1140 can be inserted and fitted into the accommodating portion 1250, and the accommodating portion 1250 can accommodate the projecting portion 1140.

In the side view of the reel seat 1000 or when viewing the reel seat 1000 from a lateral side, the accommodating portion 1250 may have an L-shape, a curved L-shape, a V-shape, or a curved V-shape. For example, as shown in FIGS. 8 and 9, the accommodating portion 1250 includes a pair of first edges 1251, which become the lateral end edges 1241 of the second hood portion 1240, and a second edge 1252 interconnecting the first edges 1251. The first edges 1251 may be parallel to the central axis CA. In the side view of the reel seat, the first edges 1251 may be located on the central axis CA or above or below the central axis CA. The second edge 1252 is arcuately curved in a circular arc shape.

The projecting portion 1140 has edges formed in a shape corresponding to the first edge 1251 and the second edge 1252 of the accommodating portion 1250. The projecting portion 1140 has a lateral end edge 1141 corresponding to the first edge 1251 of the accommodating portion 1250, and an inner end edge 1142 corresponding to the second edge 1252 of the accommodating portion 1250. Thus, when the movable hood 1200 is moved toward the first hood portion 1122, the first edge 1251 of the accommodating portion is moved in the direction of the central axis CA alongside the lateral end edge 1141 of the protruding portion, and the second edge 1252 of the accommodating portion is in contact with the inner end edge 1142 of the projecting portion in the axial direction AD or is spaced apart by a small distance from the inner end edge 1142. Further, the second hood portion 1240 is moved alongside the projecting portion 1140 along the central axis CA, and the projecting portion 1140 is inserted and fitted into the accommodating portion 1250.

The grip body 1111 has an inclined edge 1125 interconnecting the rail portion 1123 and the lateral end edge 1141 of the projecting portion 1140. The inclined edge 1125 is inclined upward and rearward from the lateral end edge 1141 of the projecting portion, and is connected to the rail portion 1123. The second hood portion 1240 of the movable hood has an inner end edge 1242 that is inclined so as to correspond to the inclined edge 1125. When the second hood portion 1240 fixes the second leg to the seating portion 1121, the inner end edge 1242 is located adjacent to the inclined edge 1125.

According to one embodiment, the seat body 1100 provides a good and stable grip feel to the angler's fingers, and has an improved bite signal delivering performance. Such a function of the seat body 1100 can be achieved by a portion forming a lower surface of the grip body 1111.

By way of example, the grip body 1111 of the seat body includes the projecting portion 1140, a bulging portion 1150, a first curved surface portion 1160, a second curved surface portion 1170, and a trigger portion 1180. The projecting portion 1140, the bulging portion 1150, the first curved surface portion 1160, the second curved surface portion 1170, and the trigger portion 1180 are located below the seating portion 1121, i.e., at the opposite side of the seating portion 1121 with reference to the central axis CA. The surfaces of the projecting portion 1140, the bulging portion 1150, the first curved surface portion 1160, the second curved surface portion 1170, and the trigger portion 1180 form the lower surface of the grip body located below the central axis CA.

The projecting portion 1140 extends rearward from the rear end of the cylindrical body 1112. The projecting portion 1140 projects in the radially outward direction OD with respect to the cylindrical body 1112 along the circumferential direction CD. The lateral end edge 1141 of the projecting portion is parallel to the central axis CA and makes a stepped shape with respect to the guide groove 1132. The inner end edge 1142 of the projecting portion extends from the lateral end edge 1141 and makes a stepped shape with respect to an outer surface of the cylindrical body 1112.

The bulging portion 1150 is spaced apart rearward from the projecting portion 1140. The bulging portion 1150 bulges in the radially outward direction OD along the circumferential direction CD. In the side view of the seat body, a bulging height of the bulging portion 1150 from the central axis CA may be smaller than a projecting height of the projecting portion 1140 from the central axis CA.

The first curved surface portion 1160 is formed between the projecting portion 1140 and the bulging portion 1150. The first curved surface portion 1160 is a curved surface portion which extends rearward from the projecting portion 1140 and is partially surrounded by the projecting portion 1140. In the side view of the seat body, the first curved surface portion 1160 is arcuately curved so as to be concave with respect to the central axis CA. In a cross-sectional view of the reel seat, i.e., when the reel seat is viewed from a cross section orthogonal to the central axis CA, the first curved surface portion 1160 is arcuately curved so as to be convex with respect to the central axis CA.

The second curved surface portion 1170 is located in rear of the bulging portion 1150. The second curved surface portion 1170 may be distinguished in the lower surface of the grip body by a boundary portion 1171 having a substantially semi-elliptical shape. The trigger portion 1180 is located in rear of the second curved surface portion 1170. The trigger portion 1180 is formed as a protrusion that protrudes downward from the grip body 1111 in the radially outward direction with respect to the central axis CA. The trigger portion 1180 may be inclined at a little angle in the frontward direction.

According to one embodiment, the seat body 1100 of the reel seat is integrally formed by injection molding. The seat body 1100 may be integrally molded from thermoplastic resin so as to have the above-described cylindrical body and grip body. By way of example, the seat body 1100 may be integrally formed using carbon fiber-reinforced thermoplastic resin. The carbon fiber reinforced thermoplastic resin has a lower density and a higher tensile strength, when compared with the commonly used glass fiber-reinforced thermoplastic resin. By way of example, as a material of the seat body 1100, carbon fiber-reinforced thermoplastic resin having a grade of PA12-CF30 (L7) may be used. As for the material properties of such carbon fiber-reinforced thermoplastic resin, a tensile strength may be 270 MPa, a bending strength may be 340 MPa, a bending elastic modulus may be 17,000 MPa, a Charpy notched impact strength may be 22 kJ/m$^2$, a deflection temperature under load may be 178 degrees C., and a density may be 1.16 g/cm$^3$.

As a comparative example, the seat body of the reel seat may be integrally formed using glass fiber-reinforced thermoplastic resin having a grade of PA66-GF30. As for the material properties of such glass fiber-reinforced thermoplastic resin, a tensile strength may be 140 MPa, a bending strength may be 215 MPa, a bending elastic modulus may be 6,800 MPa, a Charpy notched impact strength may be 16 kJ/m$^2$, a deflection temperature under load may be 262 degrees C., and a density may be 1.37 g/cm$^3$. The carbon fiber-reinforced thermoplastic resin, which has a lower density and a higher tensile strength in comparison with the glass fiber-reinforced thermoplastic resin, constitutes the seat body of the reel seat according to one embodiment. Thus, the seat body according to one embodiment can have a thinner thickness at a portion making contact with the angler's fingers, and can have a reduced weight.

Figure 10:
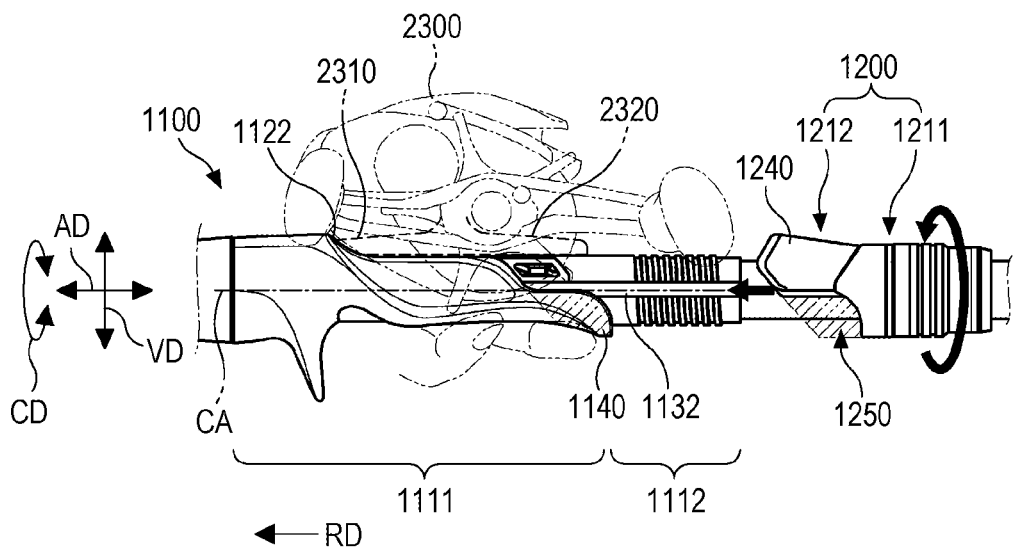
FIG. 10 is a side view of the fishing rod according to one embodiment, and shows an example where a reel is attached to the reel seat according to one embodiment.

FIG. 10 is a side view of the fishing rod according to one embodiment. Reference is made to FIG. 10, which shows an example where a reel is attached to the reel seat according to one embodiment.

The first leg 2310 of the reel 2300 is seated on the seating portion 1121 and inserted into the first hood portion 1122 of the seat body. The movable hood 1200 is moved toward the first hood portion 1122 in order to fix the second leg 2320 of the reel 2300 to the seating portion 1121. The movable hood 1200 is positioned on the cylindrical body 1112 such that the guide protrusion is inserted into the guide groove 1132 of the cylindrical body in the rearward direction RD. As the nut 1211 is rotated in one direction, the movable body 1212 is moved along the central axis CA in the rearward direction RD through the thread engagement action between the nut 1211 and the cylindrical body 1112.

The projecting portion 1140 is located opposite to the accommodating portion 1250 of the movable hood along the central axis CA. As the movable body 1212 is moved toward the first hood portion 1122, the second hood portion 1240 of the movable body is moved alongside the projecting portion 1140 along the central axis CA, and the projecting portion 1140 is inserted into the accommodating portion 1250. At the same time, when the projecting portion 1140 is inserted into the accommodating portion 1250, the second hood portion 1240 is positioned above the projecting portion 1140 in the vertical direction VD.

Figure 11:
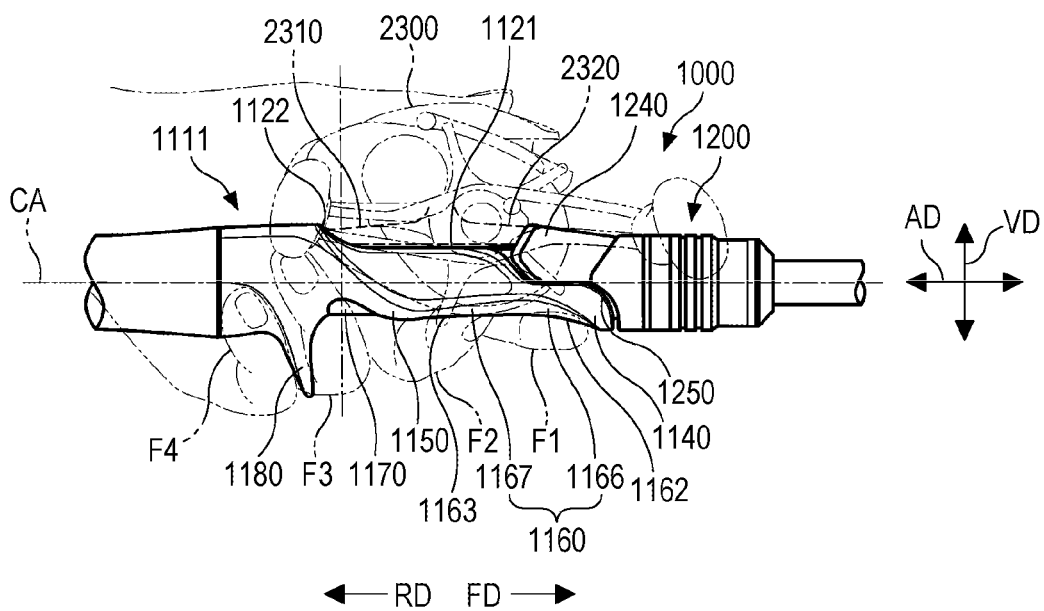
FIG. 11 is a side view of the fishing rod according to one embodiment, and shows an example where an angler grips the reel seat in the state where the reel is attached to the reel seat according to one embodiment.

FIG. 11 is a side view of the fishing rod according to one embodiment. Reference is made to FIG. 11, which shows an example where an angler grips the reel seat in a state where the reel is attached to the reel seat according to one embodiment.

The angler can grip the grip body 1111 in such a way of surrounding the grip body 1111 of the seat body by an index finger F1, a middle finger F2, a ring finger F3, and a little finger F4. In the state where the angler grips the grip body 1111, the first curved surface portion 1160 between the projecting portion 1140 and the bulging portion 1150 can make contact with the index finger F1 and the middle finger F2. The second curved surface portion 1170 can make contact with the ring finger F3. The lower surface of the rear end portion of the grip body 1111 can make contact with the little finger F4. The trigger portion 1180 can be inserted between the ring finger F3 and the little finger F4.

If the movable hood 1200 fixes the second leg 2320, the projecting portion 1140 and the second hood portion 1240 are positioned vertically in such a way that the second hood portion 1240 of the movable body is positioned above the projecting portion 1140 of the grip body and the projecting portion 1140 of the grip body is inserted into the accommodating portion 1250 of the movable body. Thus, the grip body 1111 can have a shorter length, and the movable hood 1200 can be positioned closer to the first hood portion 1122.

Further, it is possible to exclude the possibility that a fingertip of the angler's index finger F1 comes into contact with the movable hood 1200. That is, since the projecting portion 1140 is accommodated in the accommodating portion 1250, the fingertip of the angler's index finger F1 does not come into contact with a boundary between the grip body 1111 and the movable hood 1200. Thus, the angler can allow the index finger F1 to be in contact with the seat body 1100 (e.g., the surface of the projecting portion 1140) in a relaxed state without an unpleasant feel. As such, the reel seat according to one embodiment can provide a good grip feel to the angler.

When the angler grips the grip body of the seat body, the index finger F1 and the middle finger F2 come into contact with the surface of the first curved surface portion 1160 between the projecting portion 1140 and the bulging portion 1150. In the seat body 1100 made of carbon fiber-reinforced thermoplastic resin, a portion, with which the index finger F1 and the middle finger F2 come into contact (e.g., the first curved surface portion 1160), can have a thinner thickness, and the seat body 1100 can have a reduced weight. Therefore, the bite signal delivering performance can be improved in the first curved surface portion 1160 making contact with the index finger F1 and the middle finger F2.

The seat body of the reel seat according to one embodiment can not only provide a good grip feel to the hand, but also improve the bite signal delivery to the fingers. The improved bite signal delivering performance can be achieved by the surface shapes of the projecting portion, the first curved surface portion, the bulging portion, and the second curved surface portion, which are provided in the grip body of the seat body.

Figure 12:
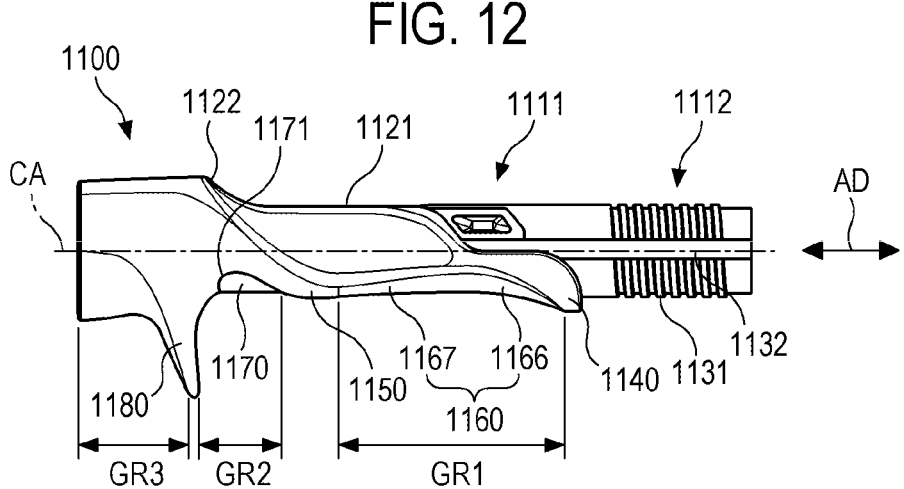
FIG. 12 is a side view showing the seat body of the reel seat according to one embodiment.
Figure 13:
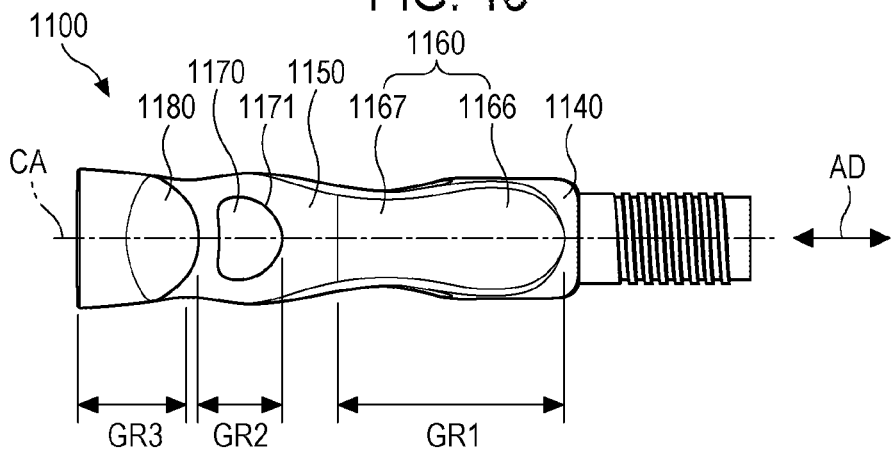
FIG. 13 is a bottom view of the seat body shown in FIG. 12.
Figure 14:
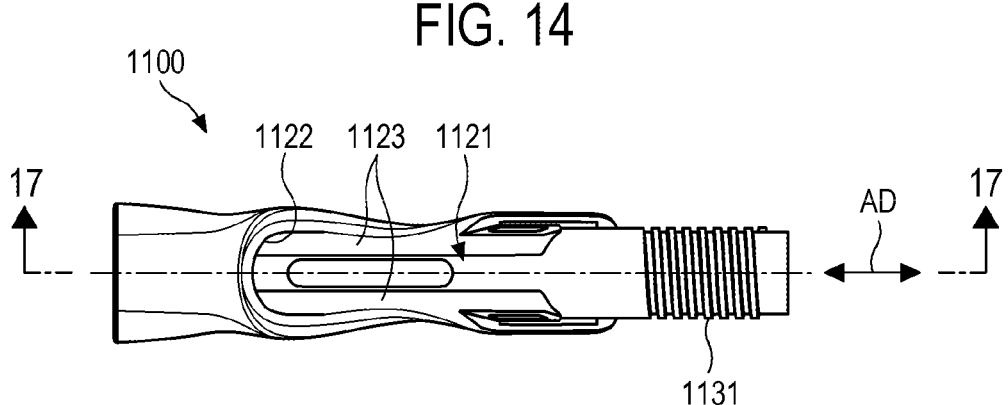
FIG. 14 is a top view of the seat body shown in FIG. 12.
Figure 15:
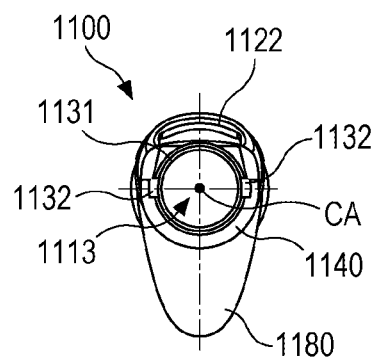
FIG. 15 is a front view of the seat body shown in FIG. 12.

FIG. 12 is a side view showing the seat body of the reel seat according to one embodiment. FIGS. 13, 14, and 15 are a bottom view, a top view, and a front view of the seat body shown in FIG. 12, respectively. Reference is made to FIGS. 12 to 15.

The surfaces of the projecting portion 1140, the bulging portion 1150, the first curved surface portion 1160, the second curved surface portion 1170, and the trigger portion 1180 form a portion of the lower surface of the grip body 1111 located below the central axis CA. The angler can grip the grip body 1111 of the seat body so that the index finger, the middle finger, the ring finger, and the little finger surround the lower surface of the grip body 1111 (see, e.g., FIG. 11). The above-described portions formed in the lower surface of the grip body 1111 are formed so as to provide a good grip feel and improved bite signal delivery to the fingers.

Reference is made to FIGS. 12 and 13. A first grip region GR1 from the projecting portion 1140 to a front start point of the bulging portion 1150 is a region that is gripped by the index finger and the middle finger. The first curved surface portion 1160 is located in the first grip region GR1. A second grip region GR2 from a rear end point of the bulging portion 1150 to the trigger portion 1180 is a region that is gripped by the ring finger. The second curved surface portion 1170 is located in the second grip region GR2. A third grip region GR3 from the trigger portion 1180 to the rear end of the grip body 1111 is a region that is gripped by the little finger.

The first curved surface portion 1160 extends from a lower end of the projecting portion 1140 up to the bulging portion 1150 in the rearward direction. The first curved surface portion 1160 has a continuous shape without a discontinuous surface. The second curved surface portion 1170 connects with the lower surface of the grip body through the semicircular or semi-elliptical boundary portion 1171. The second curved surface portion 1170 can be distinguished in the lower surface of the grip body by the boundary portion 1171. When viewing the seat body from a bottom side, or in the bottom view of the seat body, the second curved surface portion 1170 is a portion of the grip body 1111 which is formed in a semicircular or semi-elliptical shape by the boundary portion 1171.

Figure 16:
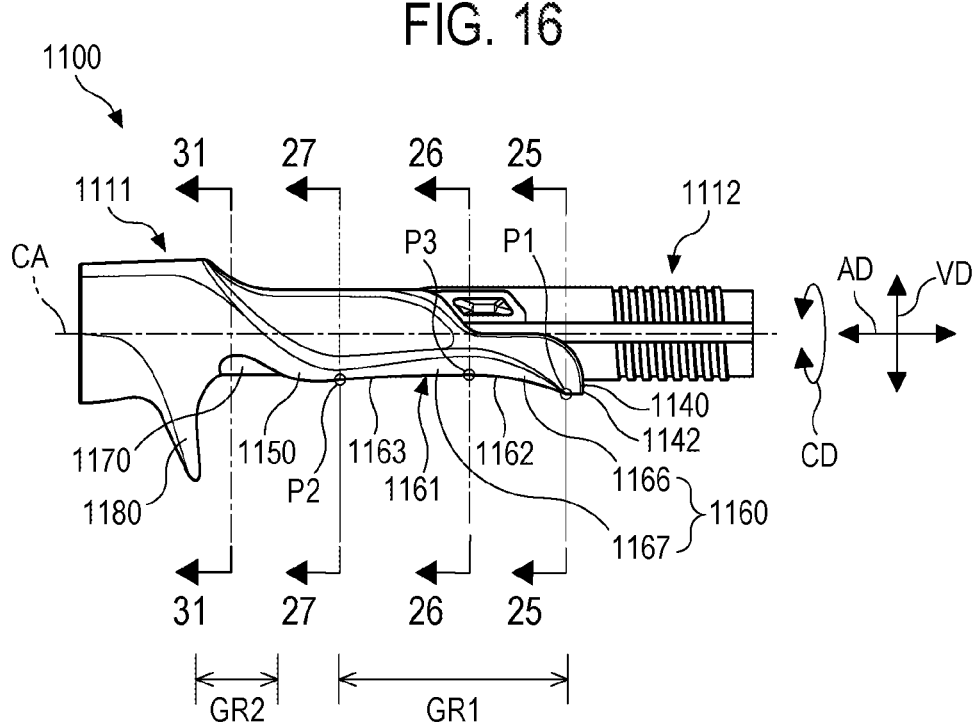
FIG. 16 is a side view showing the seat body of the reel seat according to one embodiment.
Figure 17:
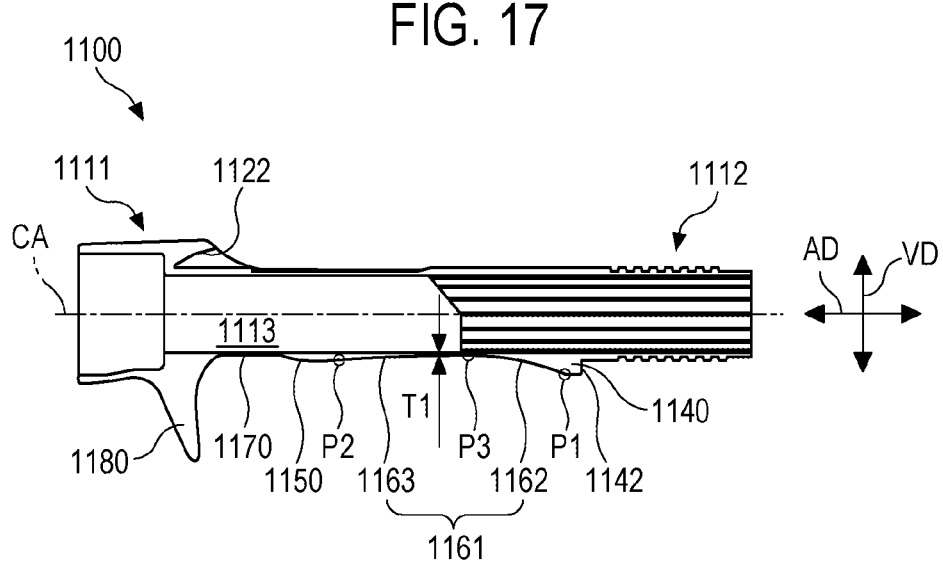
FIG. 17 is a cross-sectional view taken along line 17-17 of FIG. 14.
Figure 18:
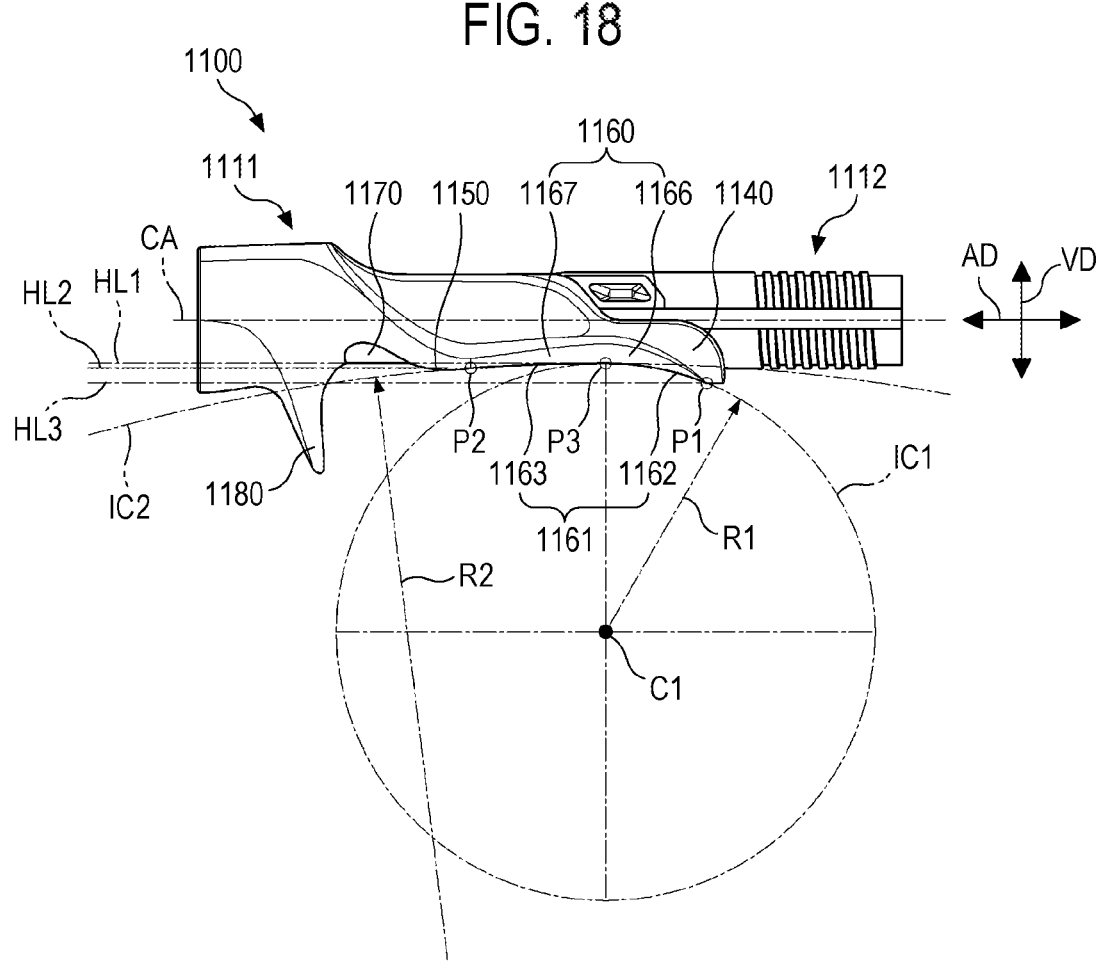
FIG. 18 is a side view of the seat body, and shows a lower end contour line of a grip body shown in FIG. 16.

FIG. 16 is a side view showing the seat body of the reel seat according to one embodiment. FIG. 17 is a cross-sectional view taken along line 17-17 of FIG. 14. FIG. 18 is a side view of the seat body, and shows a lower end contour line of the grip body shown in FIG. 16. Reference is made to FIGS. 16 to 18.

The surface of the first curved surface portion 1160 forms the lower surface of the grip body in the first grip region GR1. In the side view of the seat body, the surface of the first curved surface portion 1160 is located between the projecting portion 1140 and the bulging portion 1150 and is arcuately curved so as to be concave toward the central axis CA. In the cross-sectional view of the seat body, the surface of the first curved surface portion 1160 is arcuately curved in a circular arc shape so as to be convex from the central axis CA.

In the side view of the seat body, the first curved surface portion 1160 has a first lower end contour line 1161 corresponding to the shape of a lower end of the grip body 1111 in the first grip region. The first lower end contour line 1161 means a contour line that forms the shape of the lower end surface of the first curved surface portion 1160 in the side view of the seat body. The first lower end contour line 1161 is arcuately curved so as to be concave with respect to the central axis CA.

According to one embodiment, the first lower end contour line 1161 of the first curved surface portion includes a first concave arc line 1162 and a second concave arc line 1163. The first concave arc line 1162 can make contact with the index finger (see FIG. 11), and the second concave arc line 1163 can make contact with the middle finger (see FIG. 11). The first concave arc line 1162 and the second concave arc line 1163 are connected to each other. The first concave arc line 1162 extends rearward from the lower end of the projecting portion 1140, and the second concave arc line 1163 extends from the first concave arc line 1162 to the bulging portion 1150. The second concave arc line 1163 has a length longer than a length of the first concave arc line 1162. The first concave arc line 1162 has a first radius R1, and the second concave arc line 1163 has a second radius R2 larger than the first radius R1. The first curved surface portion 1160 may include two portions in which the first and second concave arc lines 1162 and 1163 are formed respectively. The portion of the first curved surface portion, in which the first concave arc line 1162 is formed, is an index finger contact portion 1166. The portion of the first curved surface portion, in which the second concave arc line 1163 is formed, is a middle finger contact portion 1167. The index finger contact portion 1166 is surrounded by the projecting portion 1140, and the middle finger contact portion 1167 extends from the index finger contact portion 1166.

The first curved surface portion 1160 defined between the projecting portion 1140 and the bulging portion 1150 may be formed in the grip body 1111 to have a boundary with respect to the projecting portion 1140 and the bulging portion 1150. Therefore, in the side view of the seat body, the first lower end contour line 1161 has a first end point Pt and a second end point P2. Further, the first lower end contour line 1161 has an uppermost point P3 that is closest to the central axis CA. The first lower end contour line 1161 may be defined between the first end point P1 and the second end point P2 in the first curved surface portion, and the first lower end contour line passes through the uppermost point P3. Since the second concave arc line 1163 is longer than the first concave arc line 1162, the uppermost point P3 is located closer to the projecting portion 1140 than the bulging portion 1150.

In the side view of the seat body, the first end point P1 becomes a boundary between the lower end of the projecting portion 1140 and the first curved surface portion 1160 (or a boundary between the lower end of the projecting portion and the first concave arc line). A front end of the first curved surface portion 1160 and the projecting portion 1140 may be distinguished through the first end point P1. The first end point P1 is spaced apart in the rearward direction from a front end of the projecting portion 1140 (a lowermost end of the inner end edge 1142 of the projecting portion), and the projecting portion 1140 has, between the front end thereof and the first end point P1, a lower end surface parallel to the central axis CA.

In the side view of the seat body, the second end point becomes a boundary between the bulging portion 1150 and the first curved surface portion 1160 (or a boundary between the bulging portion and the second concave arc line). A rear end of the first curved surface portion 1160 and the bulging portion 1150 may be distinguished through the second end point P2. The second end point P2 is spaced apart in the frontward direction from the lowermost apex of the bulging portion 1150. In the side view of the seat body, the bulging portion 1150 is round and convex downwardly. The second end point P2 may be located at a point where curvature changes between the first curved surface portion 1160 and the bulging portion 1150.

In the side view of the seat body, the uppermost point P3 becomes a boundary between the first concave arc line 1162 and the second concave arc line 1163. The first concave arc line 1162 is defined by the first end point P1 and the uppermost point P3 along the central axis CA, and the second concave arc line 1163 is defined by the uppermost point P3 and the second end point P2 along the central axis CA.

Referring to FIG. 18, the first end point P1, the second end point P2, and the uppermost point P3 of the first lower end contour line 1161 are spaced apart downward from the central axis CA. In this regard, a first imaginary horizontal line HL1 parallel to the central axis CA, a second imaginary horizontal line HL2 parallel to the central axis CA and located farther from the central axis CA than the first imaginary horizontal line HL1, and a third imaginary horizontal line HL3 parallel to the central axis CA and located farther from the central axis CA than the second imaginary horizontal line HL2 are assumed. The first imaginary horizontal line HL1 passes through the uppermost point P3, and the uppermost point P3 is located on the first imaginary horizontal line HL1. The second imaginary horizontal line HL2 passes through the second end point P2, and the second end point P2 is located on the second imaginary horizontal line HL2. The third imaginary horizontal line HL3 passes through the first end point P1, and the first end point P1 is located on the third imaginary horizontal line HL3. The first imaginary horizontal line HL1 is located closest to the central axis CA, the third imaginary horizontal line HL3 is located farthest from the central axis CA, and the second imaginary horizontal line HL2 is located between the first imaginary horizontal line HL1 and the third imaginary horizontal line HL3. That is, in the side view of the seat body, the second end point P2 is located above the first end point P1, and the uppermost point P3 is located above the second end point P2.

In the side view of the seat body, the first concave arc line 1162 formed by the first curved surface portion 1160 is defined between the first end point P1 and the uppermost point P3, and the second concave arc line 1163 formed by the first curved surface portion 1160 is defined between the uppermost point P3 and the second end point P2. The first and second concave arc lines 1162 and 1163 are formed as a curved line having a predetermined radius. The first concave arc line 1162 is a portion of a circumference line of a first imaginary circle IC1 having a first radius R1. The second concave arc line 1163 is a portion of a circumference line of a second imaginary circle IC2 having a second radius R2.

Figure 19:
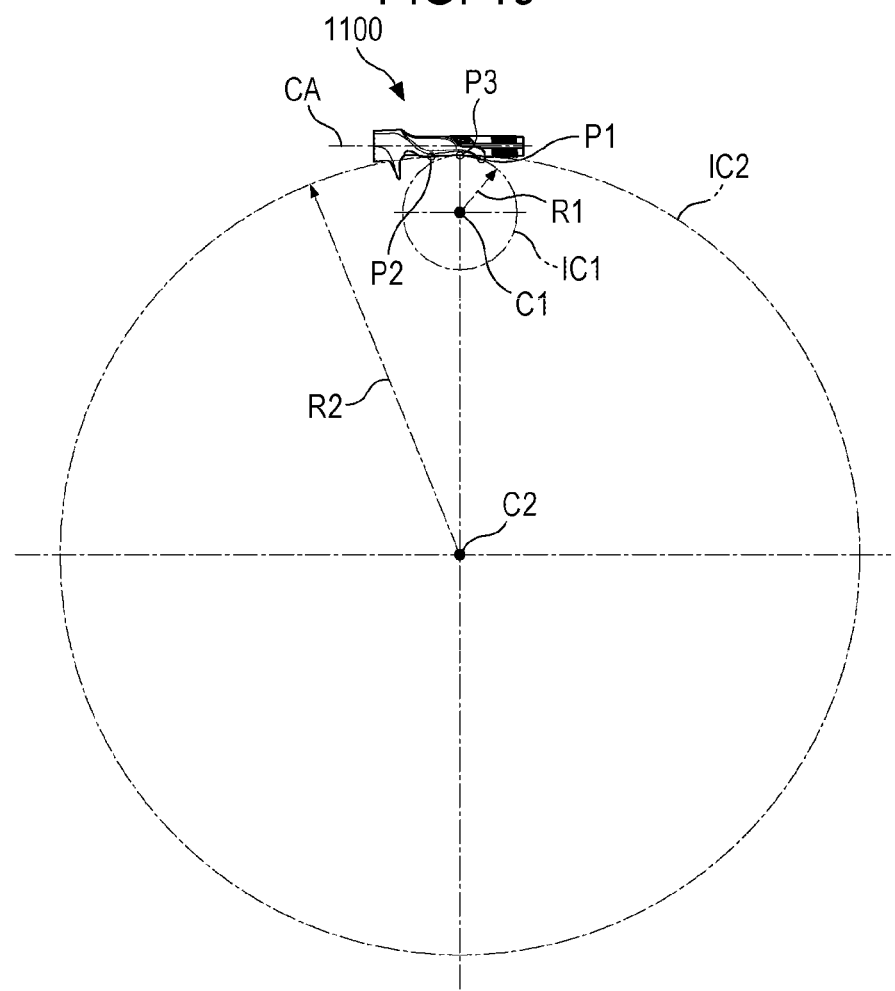
FIG. 19 is a side view of the seat body, and shows imaginary circles forming a first lower end contour line of the grip body.
Figure 20:
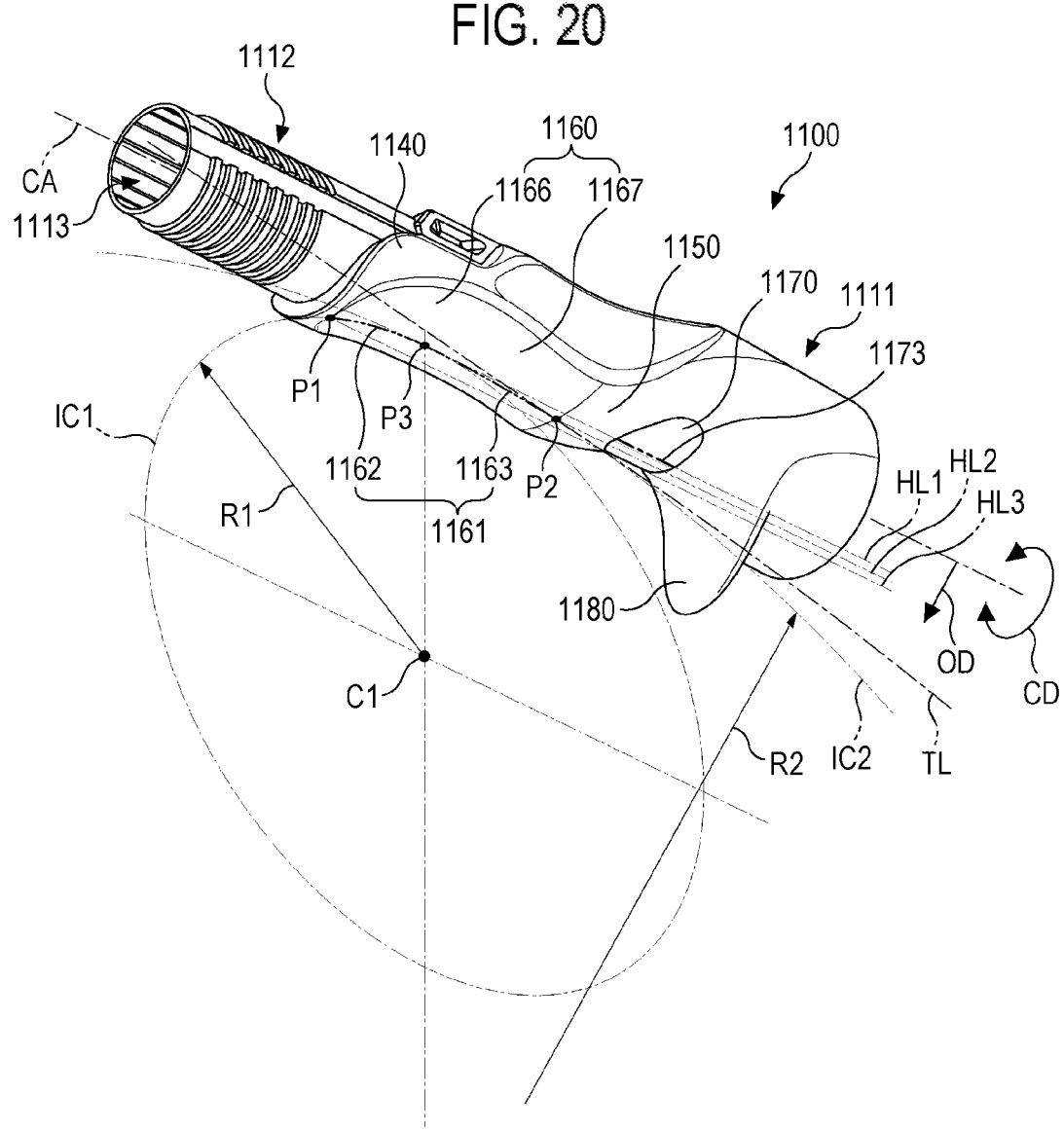
FIG. 20 is a perspective view of the seat body, and shows the first lower end contour line of the grip body.

FIG. 19 is a side view of the seat body, and shows the imaginary circles forming the first lower end contour line of the grip body. FIG. 20 is a perspective view of the seat body, and shows the first lower end contour line of the grip body. Reference is made to FIGS. 18 to 20.

In the front view of the reel seat or when viewing the reel seat from a front side, the central axis CA, the first imaginary circle IC1, and the second imaginary circle IC2 may exist in a single plane that bisects the seat body left and right. Referring to FIGS. 19 and 20, the first imaginary circle IC1 having the first radius R1 passes through the first end point P1 and the uppermost point P3. A first center C1 of the first imaginary circle IC1 is located immediately below the uppermost point P3. That is, when assuming an imaginary line that extends vertically from the central axis CA and passes through the uppermost point P3, the first center C1 of the first imaginary circle IC1 is located on such an imaginary line. The first imaginary circle IC1 is inscribed in the second imaginary circle IC2 having the second radius R2. The second imaginary circle IC2 passes through the second end point P2 and the uppermost point P3. Further, the second imaginary circle IC2 is circumscribed about the first imaginary circle IC1 at the uppermost point P3. The second radius R2 of the second imaginary circle is larger than the first radius R1 of the first imaginary circle. Thus, the radius (second radius R2) of the second concave arc line 1163 is larger than the radius (first radius R1) of the first concave arc line 1162. The second center C2 of the second imaginary circle IC2 is located immediately below the uppermost point P3 and immediately below the center of the first imaginary circle IC1. As shown in FIG. 19, the center of the first imaginary circle IC1 and the center of the second imaginary circle IC2 are located on the aforesaid imaginary line extending vertically from the central axis CA and passing through the uppermost point P3. The first imaginary horizontal line HL1, which passes through the uppermost point P3 and is parallel to the central axis, becomes a tangent line of the first imaginary circle IC1 and the second imaginary circle IC2 at the uppermost point P3. As shown in FIG. 20, an imaginary tangent line of the second imaginary circle IC2 forming the second concave arc line 1163 (specifically, an imaginary tangent line of the second concave arc line between the uppermost point and the second end point) is inclined with respect to the central axis CA.

Figure 21:
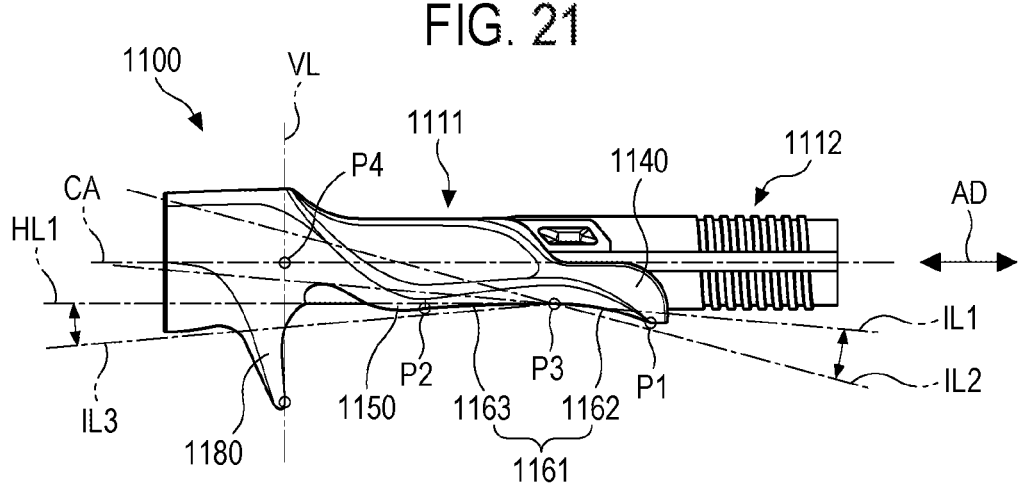
FIG. 21 is a side view of the seat body corresponding to FIG. 16, and shows end points and an uppermost point of the first lower end contour line.
Figure 22:
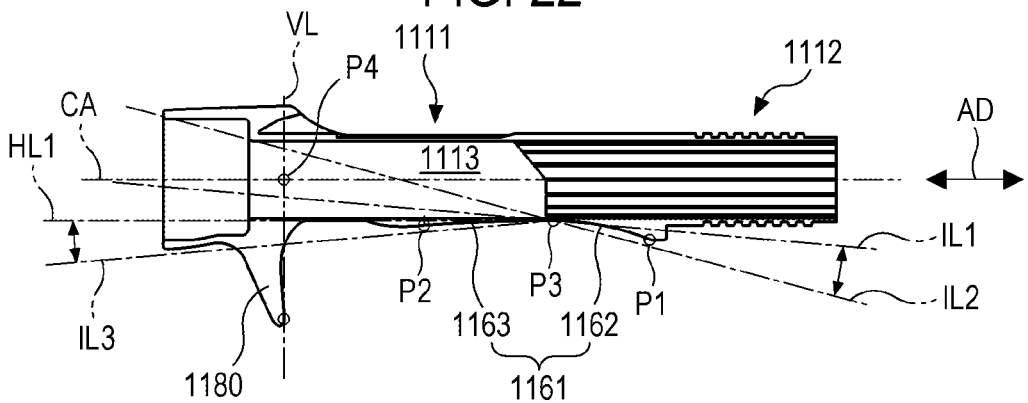
FIG. 22 is a cross-sectional view of the seat body corresponding to FIG. 17, and shows the end point and the uppermost point of the first lower end contour line.

FIG. 21 is a side view of the seat body corresponding to FIG. 16, and shows the end points and the uppermost point of the first lower end contour line. FIG. 22 is a cross-sectional view of the seat body corresponding to FIG. 17, and shows the end points and the uppermost point of the first lower end contour line. Reference is made to FIGS. 21 and 22.

The first end point P1, the second end point P2, and the uppermost point P3, which define the first and second concave arc lines, may be located within a specific range in the grip body. In this regard, in the side view of the seat body or in the cross-sectional view of the seat body, a first imaginary inclined line IL1, a second imaginary inclined line IL2, and a third imaginary inclined line IL3, which pass through the uppermost point P3 and are inclined from the first imaginary horizontal line HL1, are assumed. The first end point P1 is located between the first imaginary inclined line IL and the second imaginary inclined line IL2. The first imaginary inclined line IL1 is inclined at 5° from the first imaginary horizontal line HL1 in a direction where the first end point P1 exists (the downward direction). The first imaginary inclined line IL1 is inclined clockwise about the uppermost point P3, and an included angle between the first imaginary inclined line IL1 and the first imaginary horizontal line HL1 is 5°. The second imaginary inclined line IL2 is inclined at 15° from the first imaginary horizontal line HL1 in the direction where the first end point P1 exists (the downward direction). The second imaginary inclined line IL2 is inclined clockwise about the uppermost point P3, and an included angle between the second imaginary inclined line IL2 and the first imaginary horizontal line HL1 is 15°. The second end point P2 is located between the first imaginary horizontal line HL1 and the third imaginary inclined line IL3. The third imaginary inclined line IL3 is inclined at 5° from the first imaginary horizontal line HL1 in a direction where the second end point P2 exists (the downward direction). The third imaginary inclined line IL3 is inclined clockwise about the uppermost point P3, and an included angle between the third imaginary inclined line IL3 and the first imaginary horizontal line HL1 is 175°.

The grip body 1111 of the seat body has a rotation center point that becomes a rotation center of the seat body when a bite signal is applied to the seat body. In the side view of the seat body or the cross-sectional view of the seat body along the central axis CA, the rotation center point P4 is located on the central axis CA of the bore in rear of the bulging portion 1150. Specifically, the rotation center point P4 may be located at an intersection point between the central axis CA and an imaginary vertical line VL, which passes through a front end of the trigger portion 1180 and is perpendicular to the central axis CA. Further, the rotation center point P4 is located between the first imaginary inclined line IL1 and the second imaginary inclined line IL2.

Figure 23:
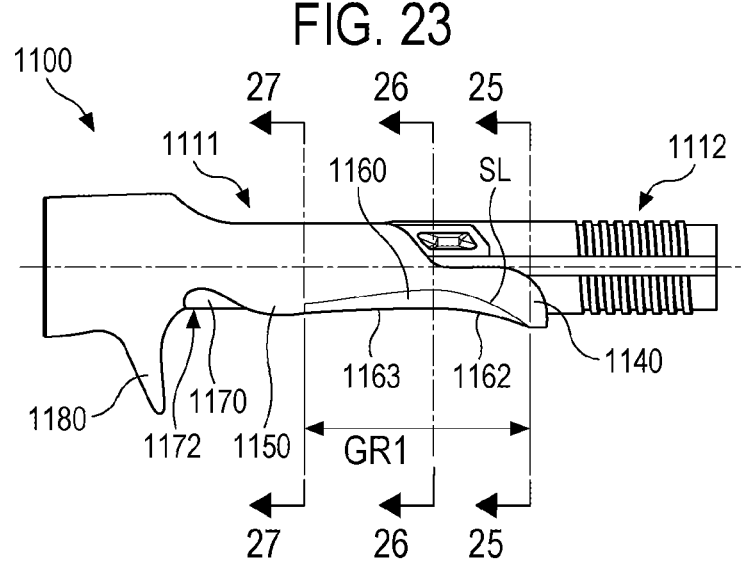
FIG. 23 is a side view of the seat body according to one embodiment, and schematically shows a range of an outer peripheral contour of a first curved surface portion.
Figure 24:
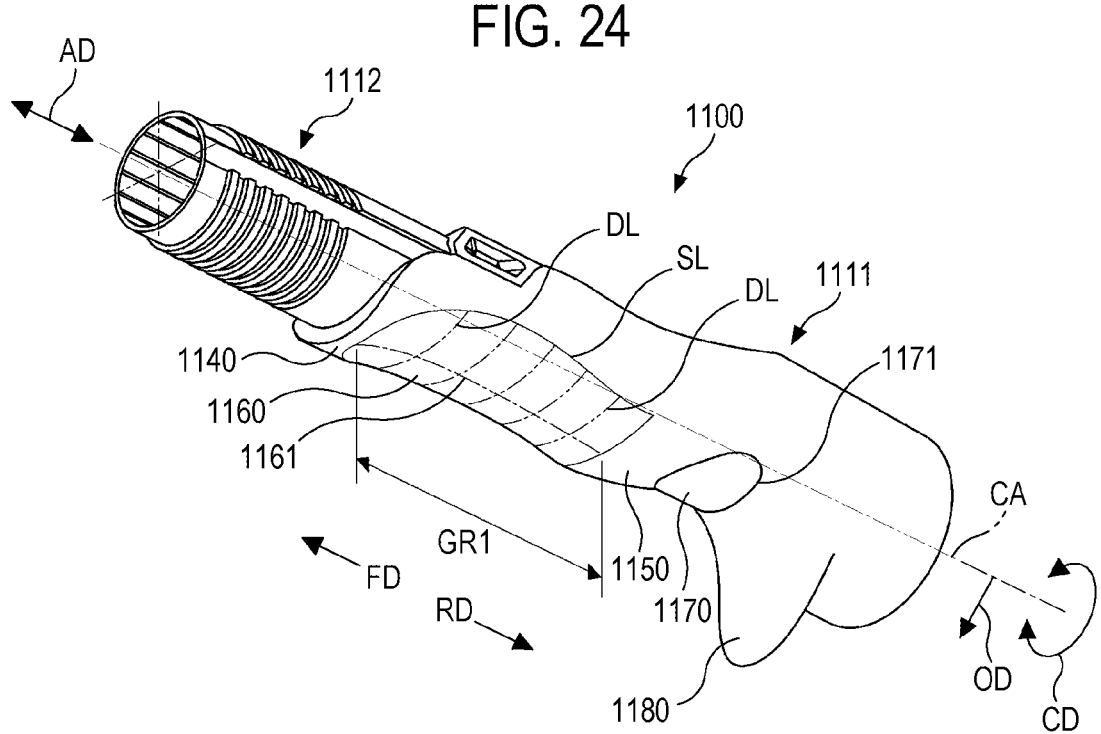
FIG. 24 is a perspective view of the seat body according to one embodiment, and schematically shows the range of the outer peripheral contour of the first curved surface portion.

The first curved surface portion 1160 of the grip body shows a round flat outer peripheral contour. Thus, when the angler grips the grip body 1111, a contact area between inner finger surfaces of the index and middle fingers and the lower surface of the seat body can be increased, and the bite signal can be efficiently delivered to the inner finger surfaces of the index and middle fingers. The aforesaid outer peripheral contour shown by the first curved surface portion 1160 is a round arcuately-curved shape and means a shape larger than the circular cross-sectional shape of the bore. Regarding the aforesaid outer peripheral contour of the first curved surface portion, reference is made to FIGS. 23 and 24. FIG. 23 is a side view of the seat body of the reel seat according to one embodiment, and schematically shows a range of the outer peripheral contour of the first curved surface portion. FIG. 24 is a perspective view of the seat body of the reel seat according to one embodiment, and schematically shows the range of the outer peripheral contour of the first curved surface portion.

Figure 25:
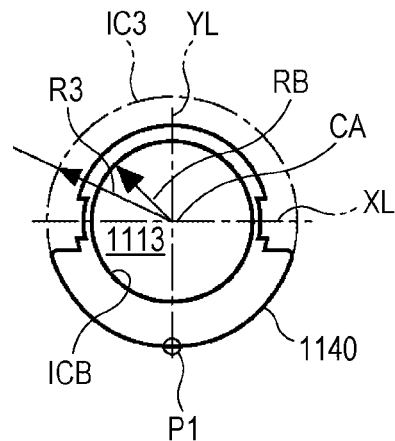
FIG. 25 is a cross-sectional view of the seat body taken along line 25-25 of FIG. 16.
Figure 26:
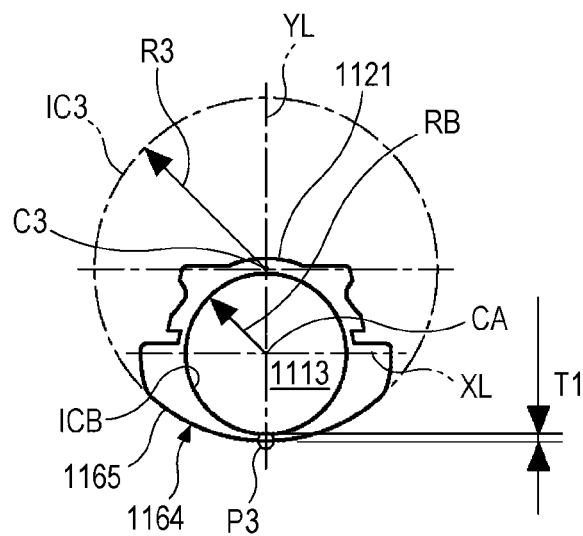
FIG. 26 is a cross-sectional view of the seat body taken along line 26-26 of FIG. 16.
Figure 27:
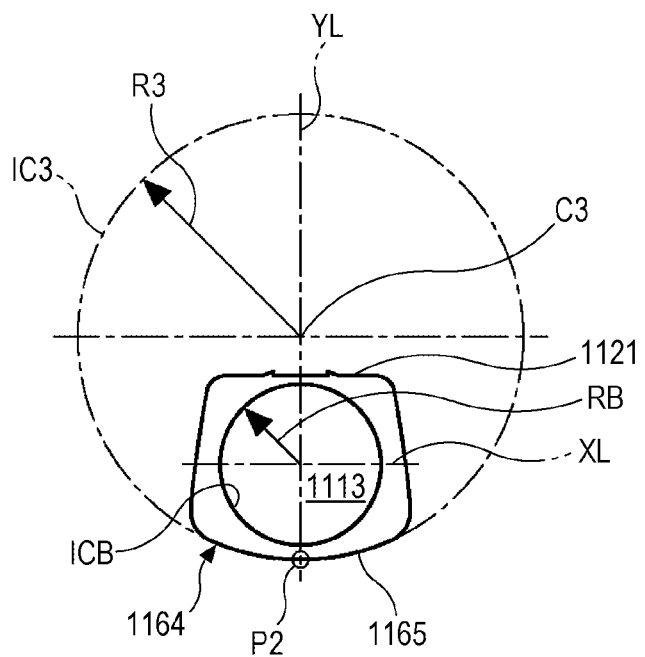
FIG. 27 is a cross-sectional view of the seat body taken along line 27-27 of FIG. 16.
Figure 28:
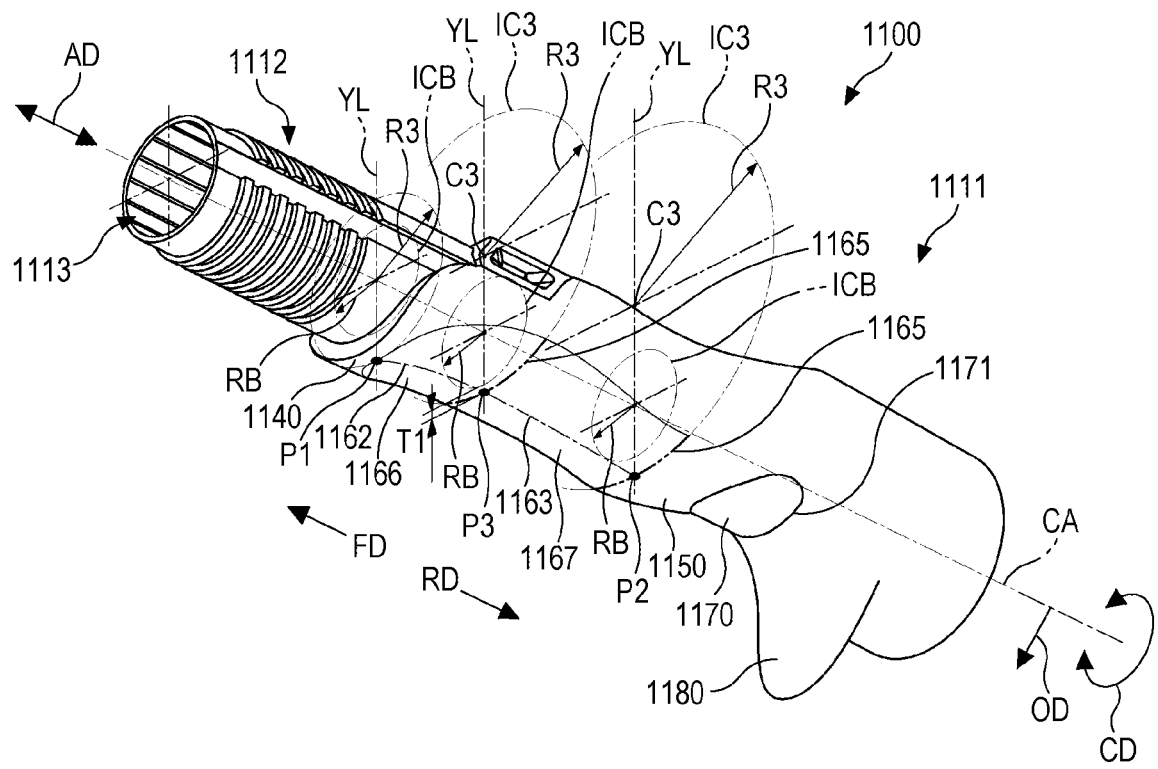
FIG. 28 is a perspective view showing the first lower end contour line and a first outer peripheral contour line formed on the seat body of the reel seat according to one embodiment.

In FIGS. 23 and 24, a solid line SL indicates the aforesaid outer peripheral contour of the first curved surface portion. In FIG. 24, an alternate long and two short dashes lines DL are imaginary lines showing the degree of curvature of the aforesaid outer peripheral contour, and corresponds to a first outer peripheral contour line of the first curved surface portion to be described below. The aforesaid outer peripheral contour of the first curved surface portion 1160 has a shape symmetrical with reference to the first lower end contour line 1161. Further, the aforesaid outer peripheral contour is located between the projecting portion 1140 and the bulging portion 1150, and forms a portion of the shape of the lower surface of the grip body in the cross-sectional shape of the seat body. Regarding the aforesaid outer peripheral contour of the first curved surface portion, reference is made to FIGS. 25 to 28 showing the cross-sectional shape of the seat body. FIGS. 25 to 27 are cross-sectional views of the seat body taken along lines 25-25, 26-26, and 27-27 of FIG. 16, respectively. FIG. 28 is a perspective view showing a first lower end contour line and a first outer peripheral contour line formed in the seat body of the reel seat according to one embodiment.

FIG. 25 is a cross-sectional view of the seat body at the first end point P1 becoming a front end of the first lower end contour line. The bore 1113 has a substantially circular cross-sectional shape. In the cross-sectional view of the seat body, an X coordinate axis and a Y coordinate axis, which have an origin located at the central axis CA of the bore 1113, may be defined. Hereinafter, the X coordinate axis is referred to as an X axis center line XL of the bore, the Y coordinate axis is referred to as a Y axis center line YL of the bore, and the X axis center line XL and the Y axis center line YL are orthogonal to each other at the central axis CA.

Referring to FIGS. 25 to 27, in the cross-sectional views of the seat body, the first curved surface portion has a first outer peripheral contour line 1164 forming the aforesaid outer peripheral contour. In the cross-sectional view of the seat body, the first outer peripheral contour line 1164 means a contour line that corresponds to an outer peripheral shape of the surface of the first curved surface portion. The first outer peripheral contour line 1164 is arcuately curved so as to be convex with respect to the central axis CA.

The first outer peripheral contour line 1164 includes a first convex arc line 1165. The first convex arc line 1165 is formed as a curved line that is symmetrical left and right with respect to the Y axis center line YL of the bore. The first convex arc line 1165 is a portion of a circumference line of a third imaginary circle IC3 having a third radius R3. A third center C3 of the third imaginary circle IC3 is located above the central axis CA on the Y axis center line YL. Further, the third radius R3 of the third imaginary circle IC3 is larger than a radius RB of an imaginary inscribed circle ICB, which is inscribed in the circular cross-sectional shape of the bore 1113 and has a center on the central axis CA.

Referring to FIG. 28, the position of the third center C3 of the third imaginary circle IC3 may vary within a region between the first end point P1 and the second end point P2. The third center C3 of the third imaginary circle IC3 may be located gradually upward from the first end point P1 toward the second end point P2, and the third radius R3 of the third imaginary circle may gradually increase from the first end point P1 toward the second end point P2.

As shown in FIGS. 25 and 28, the third imaginary circle IC3 passing through the first end point P1 has the third center C3 located on the central axis CA. The third radius R3 corresponds to a distance between the surface of the projecting portion 1140 and the central axis CA.

As shown in FIGS. 26 and 28, the first convex arc line 1165 is a portion of a circumference line of the third imaginary circle IC3, which has the third center C3 located between the seating portion 1121 and the bore 1113 and passes through the uppermost point P3. The third radius R3 is larger than the third radius shown in FIG. 25. Thus, in the region between the first end point P1 and the uppermost point P3, the third center C3 of the third imaginary circle IC3 is located between the seating portion 1121 and the central axis CA, and the third radius R3 is larger than the third radius shown in FIG. 25 and smaller than the third radius shown in FIG. 27.

As shown in FIGS. 27 and 28, the first convex arc line 1165 is a portion of a circumference line of the third imaginary circle IC3, which has the third center C3 located above the seating portion 1121 and passes through the second end point P2. The third radius R3 is larger than the third radius shown in FIG. 26. Thus, in the region between the uppermost point P3 and the second end point P2, the third center C3 of the third imaginary circle IC3 is located above the position of the center shown in FIG. 26. The third radius R3 is larger than the third radius shown in FIG. 26 and smaller than the third radius shown in FIG. 28.

In the region of the first outer peripheral contour line of the first curved surface portion 1160, the grip body 1111 may have a minimum thickness at the uppermost point P3 or in the vicinity of the uppermost point P3. Referring to FIGS. 17 and 28, the grip body 1111 has a first thickness T1 defined between the bore 1113 and the uppermost point P3. The first thickness T1 is a thickness of the grip body 1111 at the uppermost point P3. Further, the first thickness T1 is a thickness between the lowermost point of the bore 1113 located on the Y axis center line YL and the uppermost point P3 of the first lower end contour line. The first thickness T1 is within a range of 0.3 mm to 1.0 mm, and is minimal in the thicknesses of the grip body defined along the first lower end contour line 1161. Thus, the thickness of the grip body at the first concave arc line 1162 between the first end point P1 and the uppermost point P3 is larger than the first thickness T1, and the thickness of the grip body at the second concave arc line 1163 between the uppermost point P3 and the second end point P2 is larger than the first thickness T1. Further, the thickness of the grip body at the second end point P2 is larger than the first thickness T1, and the thickness of the grip body at the first end point P1 is larger than the thickness of the grip body at the second end point P2. The thicknesses of the grip body change between the first end point P1 and the second end point P2. This is because the first and second concave arc lines 1162 and 1163 are connected to each other while having different curvatures.

According to one embodiment, the seat body may be made of carbon fiber-reinforced thermoplastic resin having a low density and a high tensile strength. Further, due to the first curved surface portion 1160 at which the first thickness T1 is formed, the seat body has a thin thickness in the first grip region GR1, and has a reduced weight. Therefore, the first grip region GR1 making contact with the index and middle fingers can have an improved bite signal delivering performance.

Figure 29:
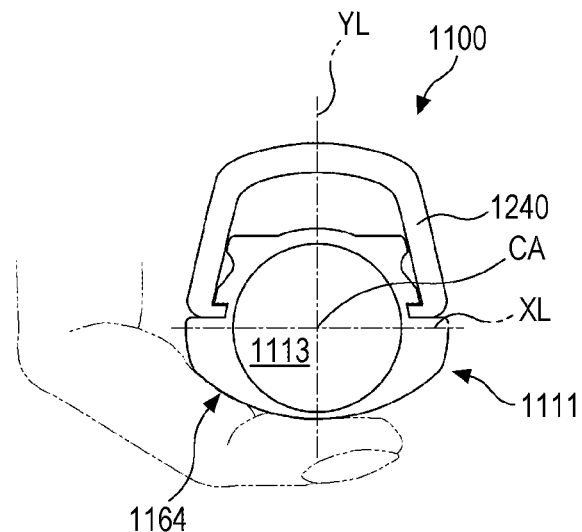
FIG. 29 is a cross-sectional view showing an example where an angler grips the seat body of the reel seat according to one embodiment.

FIG. 29 is a cross-sectional view showing an example where an angler grips the seat body of the reel seat according to one embodiment. Referring to FIG. 29, the first outer peripheral contour line 1164 of the first curved surface portion is symmetrical left and right with respect to the Y axis center line YL, and provides a round flat contour shape to the first curved surface portion of the grip body. Thus, the contact area between the inner finger surfaces of the index and middle fingers and the first curved surface portion can be increased in the state where the inner finger surfaces of the index and middle fingers are lightly in contact with the first curved surface portion regardless of the angler's right hand and left hand. Further, the bite signal delivery for the inner finger surfaces of the index and middle fingers can be improved.

Figure 30:
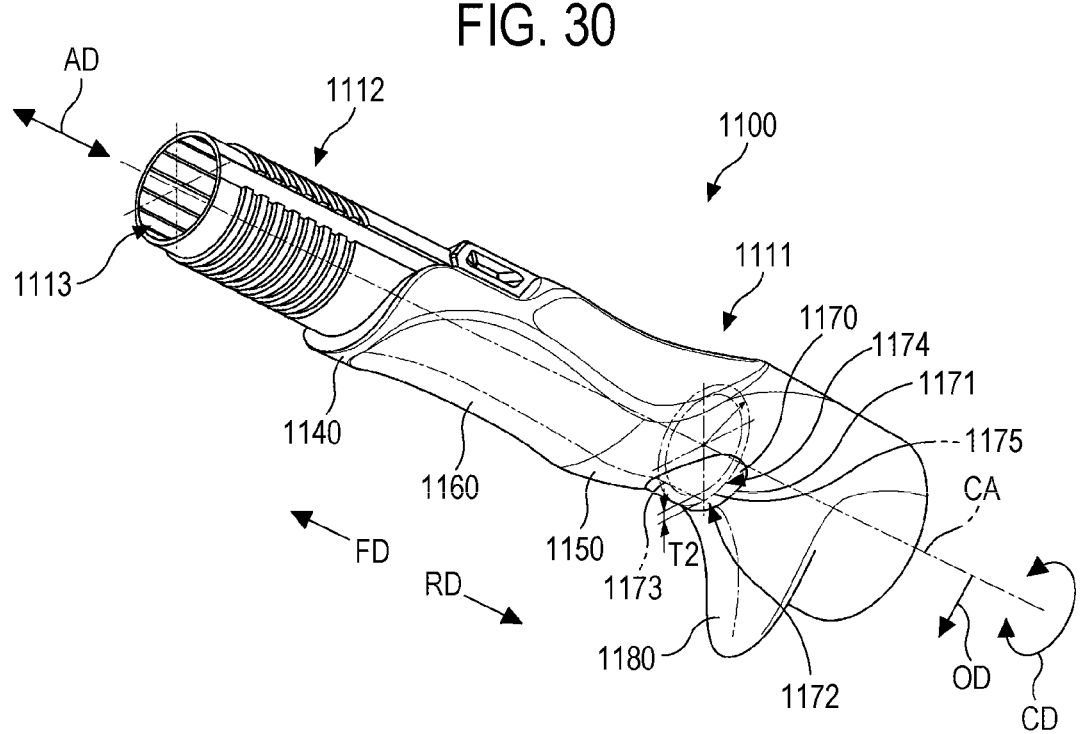
FIG. 30 is a perspective view of the seat body of the reel seat according to one embodiment, and shows a lower end contour and an outer peripheral contour of a second curved surface portion.
Figure 31:
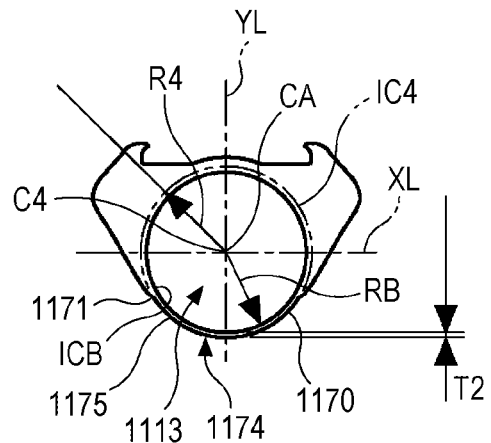
FIG. 31 is a cross-sectional view taken along line 31-31 of FIG. 16.
Figure 32:
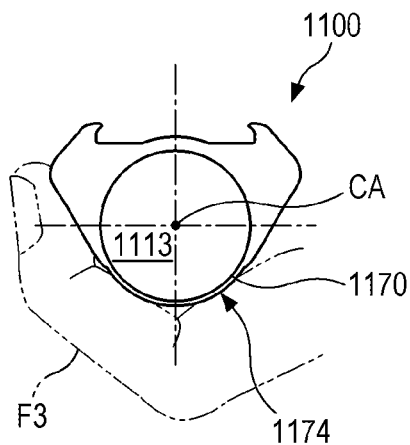
FIG. 32 is a cross-sectional view showing an example where the second curved surface portion makes contact with a ring finger when an angler grips the reel seat according to one embodiment.

FIG. 30 is a perspective view of the seat body of the reel seat according to one embodiment, and shows a contour of the second curved surface portion. FIG. 31 is a cross-sectional view taken along line 31-31 of FIG. 16, FIG. 32 is a cross-sectional view showing an example where the second curved surface portion makes contact with a ring finger when an angler grips the reel seat according to one embodiment. The second curved surface portion of the seat body is described with reference to FIGS. 16, 20 and 30 to 32.

The second curved surface portion 1170 is located in front of the trigger portion 1180. Thus, when an angler grips the grip body, the second curved surface portion 1170 can make contact with an inner finger surface of the ring finger. The grip body may have a constant thickness in the second curved surface portion 1170.

Referring to FIGS. 16 and 30, in the side view of the seat body, the second curved surface portion 1170 has a second lower end contour line 1172. In the side view of the seat body, the second lower end contour line 1172 is a contour line corresponding to the surface of the second curved surface portion 1170. The second lower end contour line 1172 includes a straight line 1173 parallel to the central axis CA. Referring to FIG. 20, the straight line 1173 may be located on the first imaginary horizontal line HL1 passing through the uppermost point P3 of the first lower end contour line and parallel to the central axis CA.

Referring to FIGS. 30 and 31, in the cross-sectional view of the seat body, the second curved surface portion 1170 has a second outer peripheral contour line 1174. In the cross-sectional view of the seat body, the second outer peripheral contour line 1174 is a contour line corresponding to an outer peripheral shape of the second curved surface portion 1170. The second outer peripheral contour line 1174 includes a second convex arc line 1175.

The second convex arc line 1175 is formed as a curved line that is symmetrical left and right with respect to the Y axis center line YL. The second convex arc line 1175 is a portion of a circumference line of a fourth imaginary circle IC4 having a fourth radius R4. The second convex arc line 1175 having the fourth radius R4 exists within a range defined by the boundary portion 1171. The fourth imaginary circle IC4 has a fourth center C4 located on the central axis CA. The fourth radius R4 of the fourth imaginary circle is larger than the radius RB of the imaginary inscribed circle ICB inscribed in the bore 1113. That is, the fourth imaginary circle IC4 is located concentrically with the imaginary inscribed circle ICB.

The grip body 1111 has a second thickness T2 at the second curved surface portion 1170. Referring to FIGS. 30 and 31, the second thickness T2 is the thickness of the grip body defined by the bore 1113 and the second convex arc line 1175 in the second curved surface portion 1170. The second thickness T2 is in the range of 0.3 mm to 1.0 mm. Thus, the grip body 1111 can have the second thickness T2 that is uniform throughout the whole of the second curved surface portion 1170.

Referring to FIGS. 30 and 32, when the angler grips the grip body, the second curved surface portion 1170 can make contact with the inner finger surface of the ring finger F3. In the region of the grip body where the ring finger comes into contact with the grip body, the grip body includes the second curved surface portion 1170. The grip body has a thin, second thickness T2 at the second curved surface portion 1170, and does not have a cavity in the portion of the grip body where the second curved surface portion 1170 is formed. Since, due to the second curved surface portion 1170, the grip body has a thin thickness in the region making contact with the ring finger, the grip body has an improved bite signal delivering performance at the second curved surface portion 1170 making contacting with the ring finger. Further, when the ring finger and the little finger strongly grip the grip body through the trigger portion 1180, the ring finger may be insensitive to a bite signal, but the grip body can improve the bite signal delivery to the ring finger.

Figure 33:
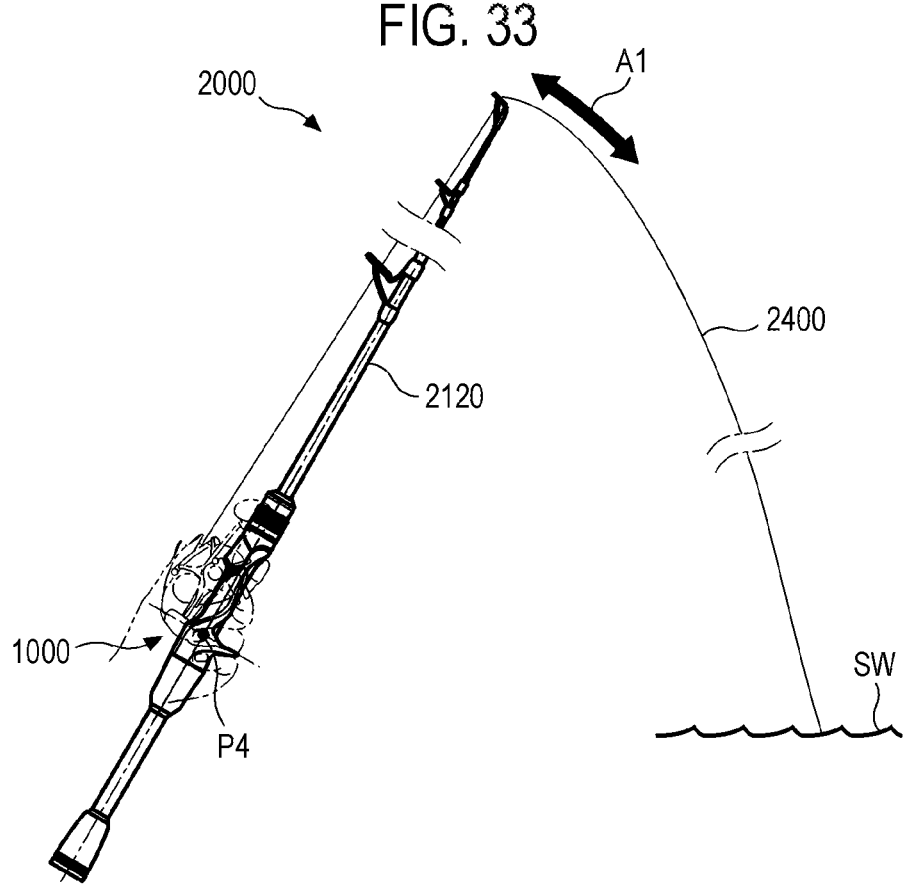
FIG. 33 is a side view showing an example where an angler performs fishing by using the fishing rod including the reel seat according to one embodiment.
Figure 34:
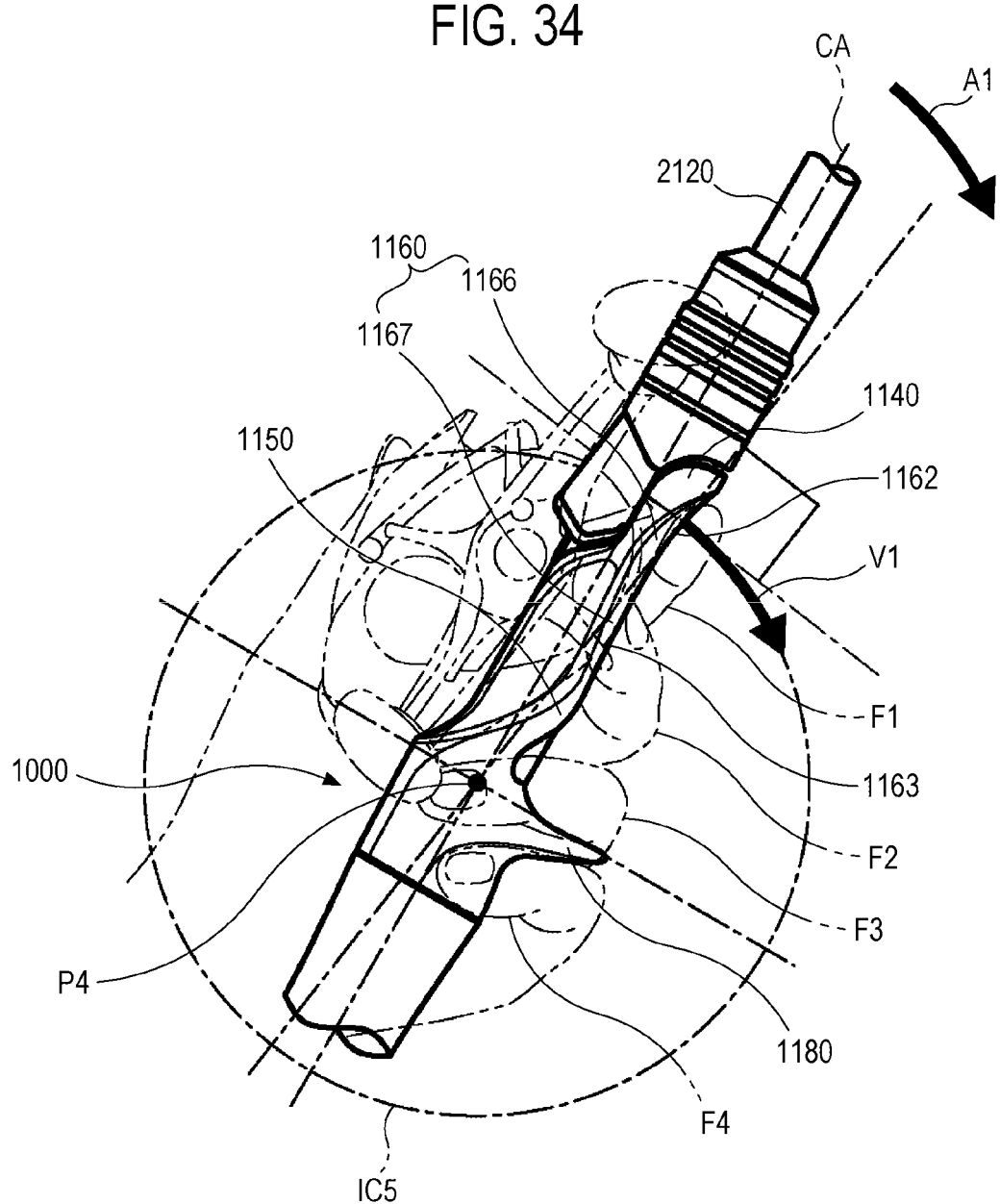
FIG. 34 is an enlarged view of FIG. 33.

FIG. 33 is a side view showing an example where an angler performs fishing by using the fishing rod including the reel seat according to one embodiment. FIG. 34 is an enlarged view of FIG. 33. Reference is made to FIGS. 33 and 34.

The angler may wait for a bite signal in the state where the fishing rod 2000 is erected with respect to the surface of water SW. In the state where the first curved surface portion 1160 is in contact with the inner finger surface of the index finger F1 and the inner finger surface of the middle finger F2 and the trigger portion 1180 is strongly gripped by the ring finger F3 and the little finger F4, the angler may grip the grip body of the seat body. In the state where the fishing rod 2000 is erected with respect to the surface of water SW, the bite signal may be delivered to the rod body 2120 and the reel seat 1000 as a rotational vibration which acts about the rotation center point P4 of the seat body. The rotation center point P4 may be located on the central axis CA in rear of the bulging portion 1150 and above the trigger portion 1180. That is, the bite signal may act on the rod body 2120 and the reel seat 1000 as the rotational vibration shown by an arrow A1.

Due to the bite signal of the rotational vibration, a vector V1 of rotational vibration acts on the inner finger surface of the index finger F1 through the first curved surface portion 1160. By way of example, when assuming a fifth imaginary circle IC5 which has a center at the rotation center point P4 and passes through the first concave arc line 1162, the vector V1 of rotational vibration can act in a circumferential direction of the fifth imaginary circle IC5. The index finger contact portion 1166 of the first curved surface portion, in which the first concave arc line 1162 is formed, becomes a perpendicular plane with respect to the vector V1 of rotational vibration. Further, the inner finger surface of the index finger F1 is positioned at the position of the index finger contact portion 1166 where the first concave arc line 1162 is formed, while supporting the grip body to suppress the rotation of the seat body. Accordingly, the force of the vector V1 of rotational vibration can be definitely delivered to the inner finger surface of the index finger F1 through the index finger contact portion 1166, and the bite signal of rotational vibration can be effectively delivered to the index finger F1 through the index finger contact portion 1166. Further, since the outer peripheral contour of the index finger contact portion 1166 of the first curved surface portion is formed as the above-described first convex arc line, the index finger contact portion 1166 can deliver the bite signal to the index finger F1 through a further increased contact area. As described above, the index finger contact portion 1166 of the first curved surface portion is configured to deliver the bite signal, which becomes the rotational vibration applied to the seat body about the rotation center point P4 (i.e., the vector V1 of rotational vibration), to the index finger.

Figure 35:
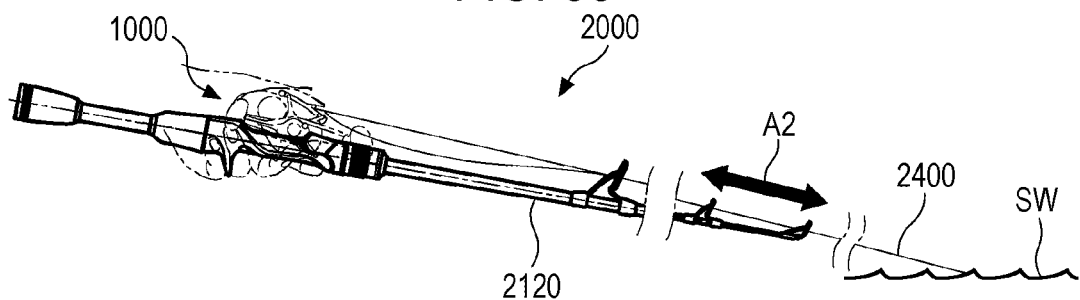
FIG. 35 is a side view showing another example where an angler performs fishing by using the fishing rod including the reel seat according to one embodiment.
Figure 36:
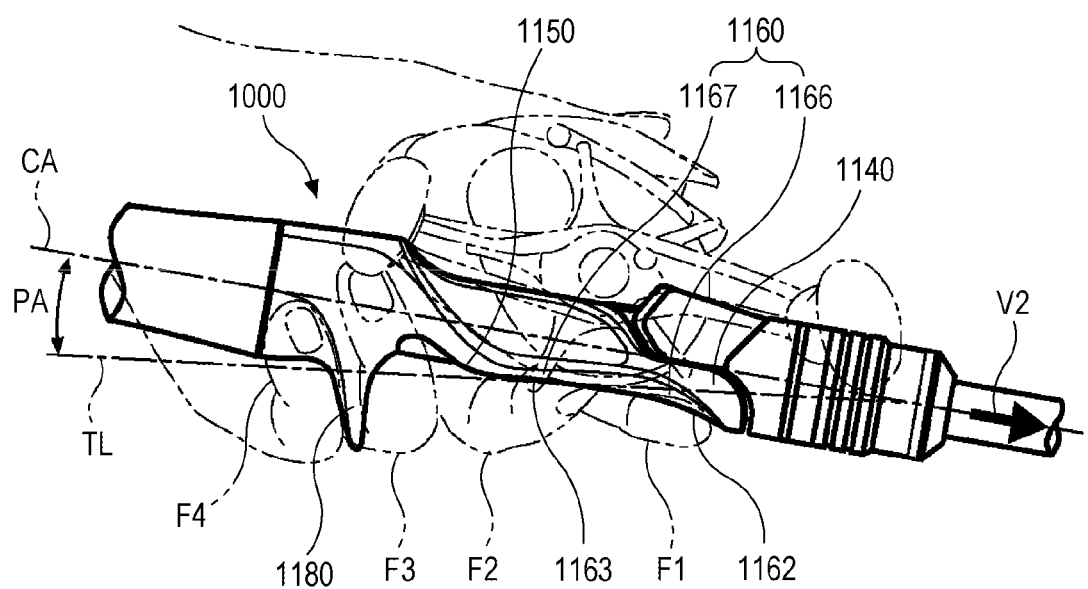
FIG. 36 is an enlarged view of FIG. 35.

FIG. 35 is aside view showing another example where an angler performs fishing by using the fishing rod including the reel seat according to one embodiment. FIG. 36 is an enlarged view of FIG. 35. Reference is made to FIGS. 35 and 36.

The angler may wait for a bite signal in the state where the fishing rod 2000 is directed to the surface of water SW. In the state where the fishing rod 2000 is directed to the surface of water SW, because of the tightness and looseness of a fishing line 2400, the bite signal may be delivered to the reel seat 1000 in the axial direction of the rod body 2120 as linear vibration shown by an arrow A2. A vector V2 of linear vibration may act on the seat body of the reel seat due to the bite signal of linear vibration.

The second concave arc line 1163 of the first curved surface portion is inclined with respect to the vector V2 of linear vibration and the central axis CA so as to have a pressure angle PA with respect to the vector V2 of linear vibration. By way of example, an imaginary tangent line TL of the second concave arc line 1163 (the imaginary tangent line TL of the second imaginary circle) is inclined with respect to the central axis CA, thereby forming the pressure angle PA with respect to the vector V2 of linear vibration. The middle finger contact portion 1167 where the second concave arc line 1163 is formed makes contact with the inner finger surface of the middle finger F2 while having the pressure angle PA. The middle finger F2 can support the middle finger contact portion 1167 along the ring finger F3, in the state where a joint is not bent and tension is relieved. The middle finger contact portion 1167, which is in contact with the middle finger F2 while having the pressure angle PA, can apply, to the middle finger F2, a resistance or a pressure caused by the force of the vector V2 of linear vibration. Therefore, the bite signal of linear vibration can be effectively delivered to the middle finger F2 through the middle finger contact portion 1167. Further, since the outer peripheral contour of the middle finger contact portion 1167 of the first curved surface portion is formed as the above-described first convex arc line, the middle finger contact portion 1167 can deliver the bite signal to the middle finger F2 through a further increased contact area. As described above, the middle finger contact portion 1167 where the second concave arc line is formed is configured to highly reliably deliver the bite signal, which becomes the linear vibration applied to the seat body along the central axis CA (i.e., the vector V2 of linear vibration), to the middle finger F2.

Since the ring finger F3 and the little finger F4 strongly grip the grip body, the ring finger F3 and the little finger F4 may be insensitive to the bite signal. However, since the first curved surface portion 1160 of the grip body has a shape relieving the tension of the index finger F1 and the middle finger F2, the bite signal sensitivity of the inner finger surfaces of the index finger F1 and the middle finger F2 can be increased, and the shape of the first curved surface portion 1160 of the grip body can effectively deliver the bite signal to the index finger and the middle finger.

Figure 37:
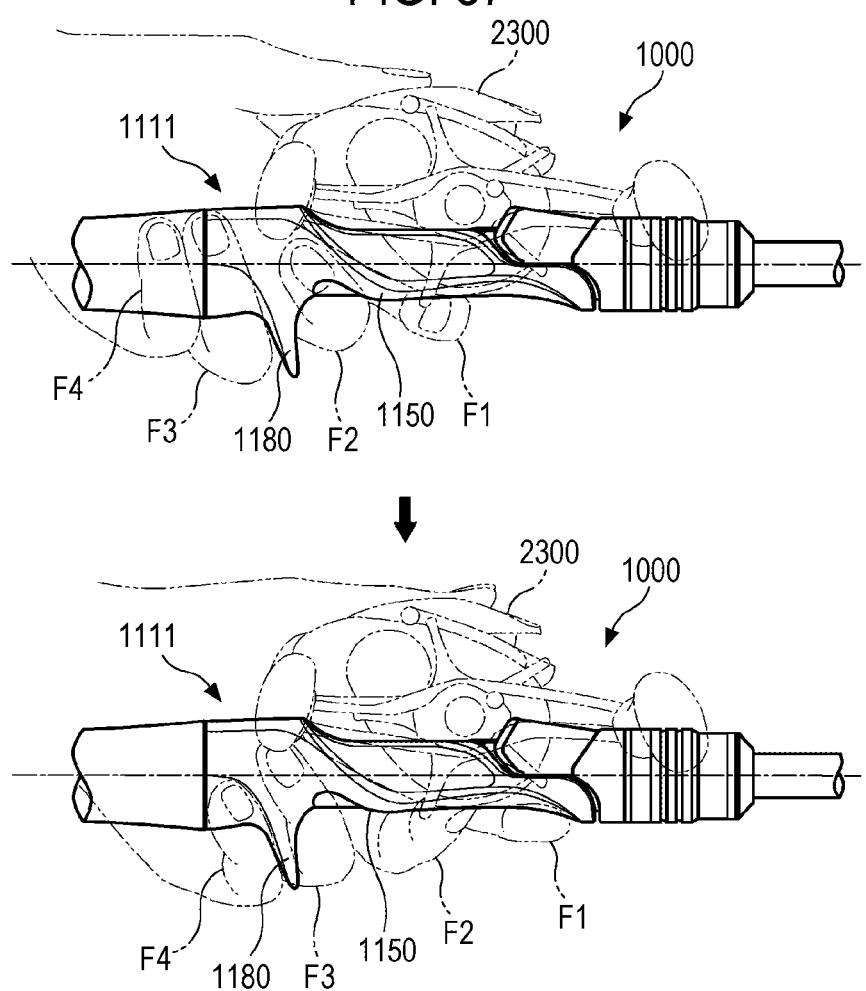
FIG. 37 is a side view showing a change in finger position in fishing where the reel seat according to one embodiment is used.

The reel seat according to one embodiment effectively delivers the bite signal to the fingers and does not binder a change in finger's positions. FIG. 37 is a side view showing a change in finger position in fishing where the reel seat according to one embodiment is used.

The upper part of FIG. 37 shows an example where an angler grips the seat body when the angler performs a casting motion. In the casting motion using the reel 2300, the angler can grip the grip body 1111 by a grip form in which the angler inserts the trigger portion 1180 between the middle finger F2 and the ring finger F3 (so-called two-finger grip). Alternatively, the angler can grip the grip body 1111 by a grip form in which the angler inserts the trigger portion 1180 between the index finger F1 and the middle finger F2 (so-called one-finger grip).

After the casting motion, the angler quickly performs a palming motion. As shown in the lower part of FIG. 37, when the casting motion changes to the palming motion, the angler quickly changes the positions of the fingers so that the angler grips the grip body 1111 by a grip form in which the trigger portion 1180 is inserted between the ring finger F3 and the little finger F4 (so-called three-finger grip). In the grip body 1111, the bulging portion 1150 located in front of the trigger portion 1180 does not greatly protrude downward. Thus, when the casting motion changes to the palming motion, the bulging portion 1150 does not hinder the change of the finger positions.

Figure 38:
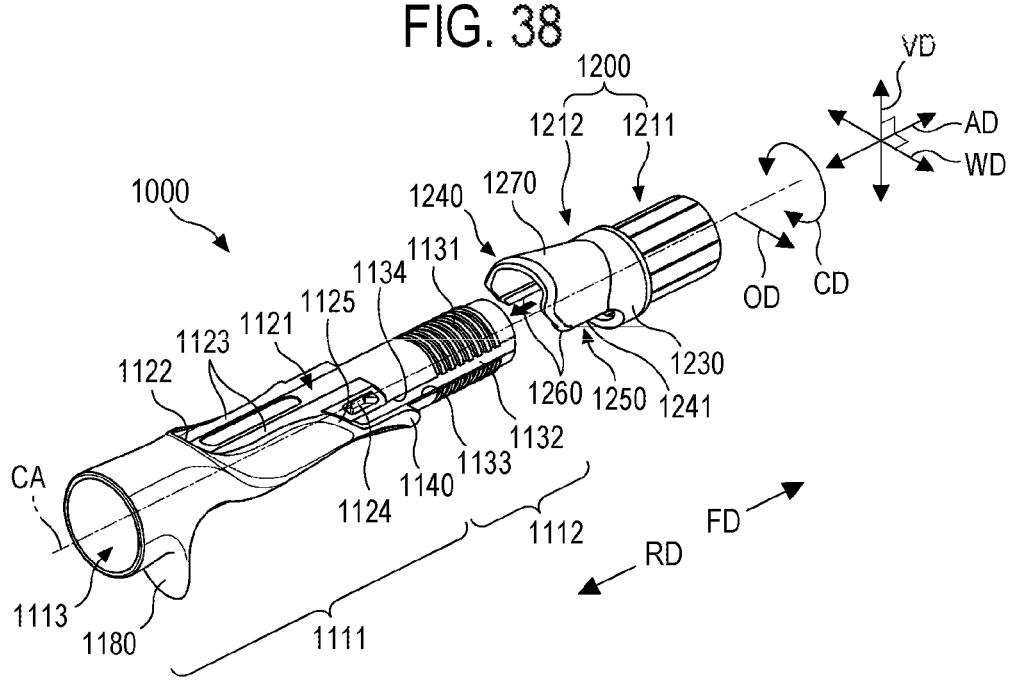
FIG. 38 is a perspective view showing a reel seat according to one embodiment of the present disclosure.
Figure 39:
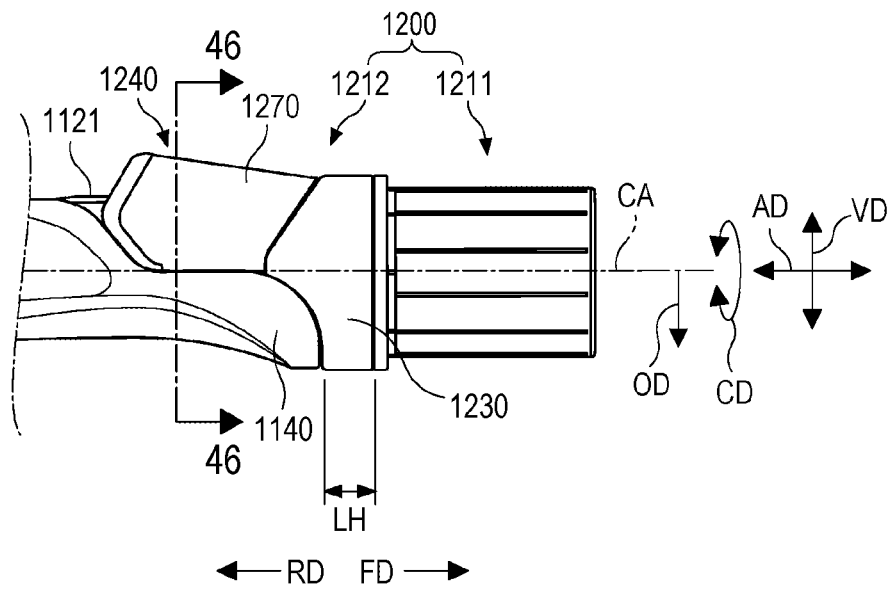
FIG. 39 is a side view of a front portion of the reel seat shown in FIG. 38, and shows a state where the movable hood and the seat body are coupled to each other.
Figure 40:
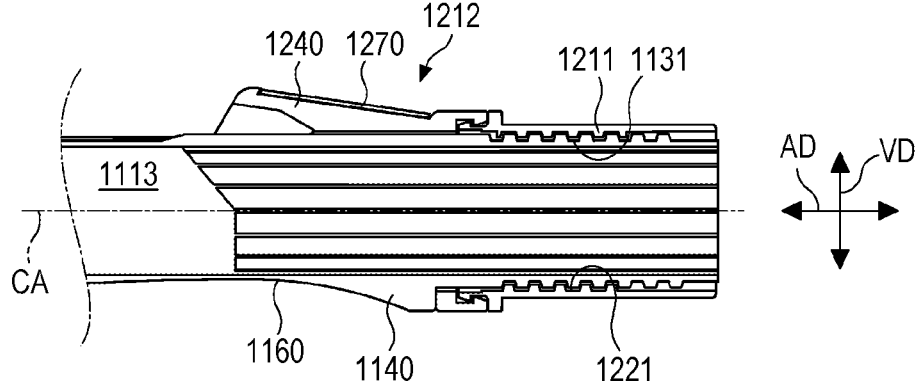
FIG. 40 is a cross-sectional view of the front portion of the reel seat shown in FIG. 39.
Figure 41:
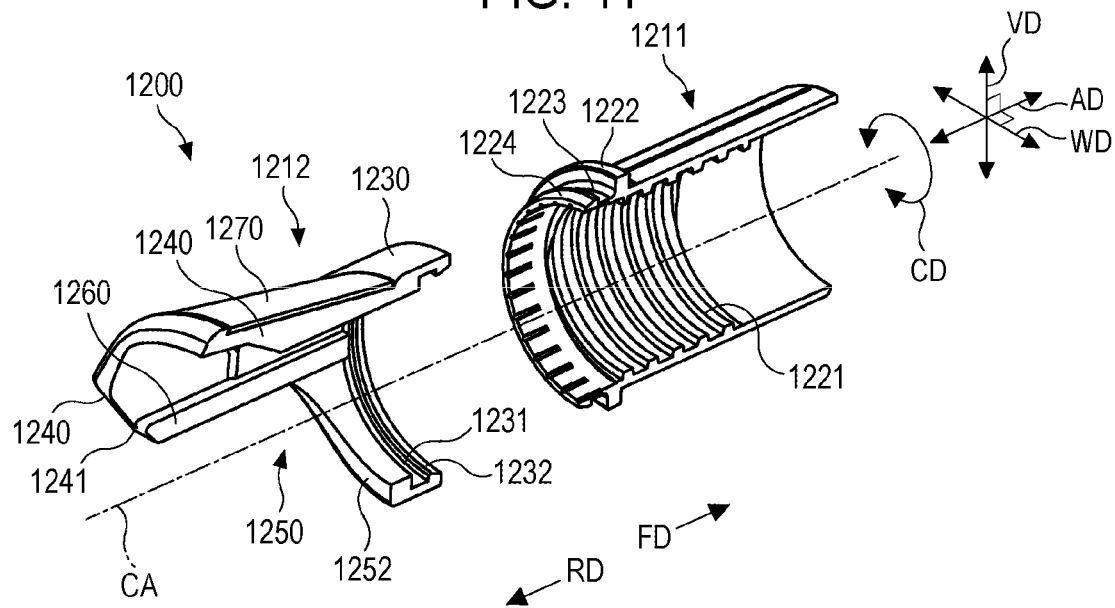
FIG. 41 is an exploded perspective view showing a cross-sectional shape of the movable hood of the reel seat shown in FIG. 39.
Figure 42:
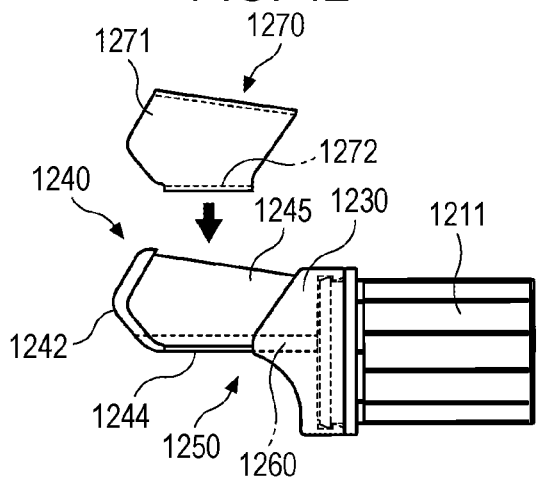
FIG. 42 is an exploded side view of the movable hood shown in FIG. 39.

FIG. 38 is a perspective view showing a reel seat according to one embodiment of the present disclosure. FIG. 39 is a side view of a front portion of the reel seat shown in FIG. 38, and shows a state where a movable hood and a seat body are coupled to each other. FIG. 40 is a cross-sectional view of the front portion of the reel seat shown in FIG. 39. FIG. 41 is an exploded perspective view showing a cross-sectional shape of the movable hood of the reel seat shown in FIG. 39. FIG. 42 is an exploded side view of the movable hood shown in FIG. 39. Reference is made to FIGS. 38 to 42.

The reel seat 1000 according to one embodiment may have the same structure and configuration as those of the reel seat of the above-described embodiment, except that the movable body of the movable hood further includes a component for preventing deformation of the second hood portion. The grip body 1111 of the seat body shown in FIG. 38 includes the same first curved surface portion as the first curved surface portion of the above-described embodiment.

Referring to FIGS. 38 and 39, when the movable hood 1200 is moved toward the first hood portion to fix the second leg of the reel, the second hood portion 1240 is positioned above the projecting portion 1140, and the projecting portion 1140 is inserted into the accommodating portion 1250. Since the projecting portion 1140 of the grip body and the second hood portion 1240 of the movable hood are positioned in the vertical direction, the grip body 1111 can have a reduced overall length, and the annular portion 1230 of the movable body can have a shorter lower end length LH. By way of example, the lower end length LH of the annular portion 1230 may be 4 mm to 6 mm. The second hood portion 1240 protruding from the annular portion 1230 presses the second leg of the reel to the seating portion 1121. If the second hood portion 1240 does not apply a strong pressing force to the second leg, the second leg of the reel may shake in a width direction WD. If the degree of rotation of the nut 1211 is increased so that the second hood portion 1240 can apply the strong pressing force, the second hood portion 1240 may be deformed by a reaction force from the second leg. According to the reel seat 1000 of one embodiment, the movable body 1212 includes a reinforcing cover 1270, which is coupled to the second hood portion 1240 to reinforce the second hood portion 1240 and the guide protrusion 1260.

The reinforcing cover 1270 is configured to cover an outer surface of the second hood portion 1240 of the movable body along the central axis CA and in the circumferential direction CD of the central axis. The reinforcing cover 1270 is configured to engage with a pair of lateral end edges 1241 of the second hood portion 1240 where the guide protrusion 1260 is located. Therefore, the reinforcing cover 1270 can prevent the deformation of the second hood portion 1240 and the guide protrusion 1260 of the movable body.

The reinforcing cover 1270 may be made of a metal material. By way of example, the metal material of the reinforcing cover may be titanium having a light weight and a high strength. As another example, the metal material of the reinforcing cover may be stainless steel or aluminum having a decorative property. Since the reinforcing cover 1270 made of a metal material covers the second hood portion 1240, the movable hood 1200 can have a decorative property and a high-end feel.

Figure 43:
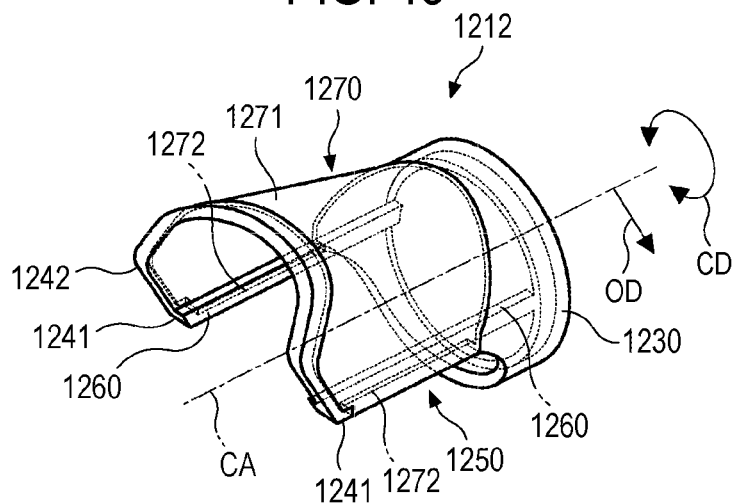
FIG. 43 is a perspective view of the movable body of the movable hood shown in FIG. 39.
Figure 44:
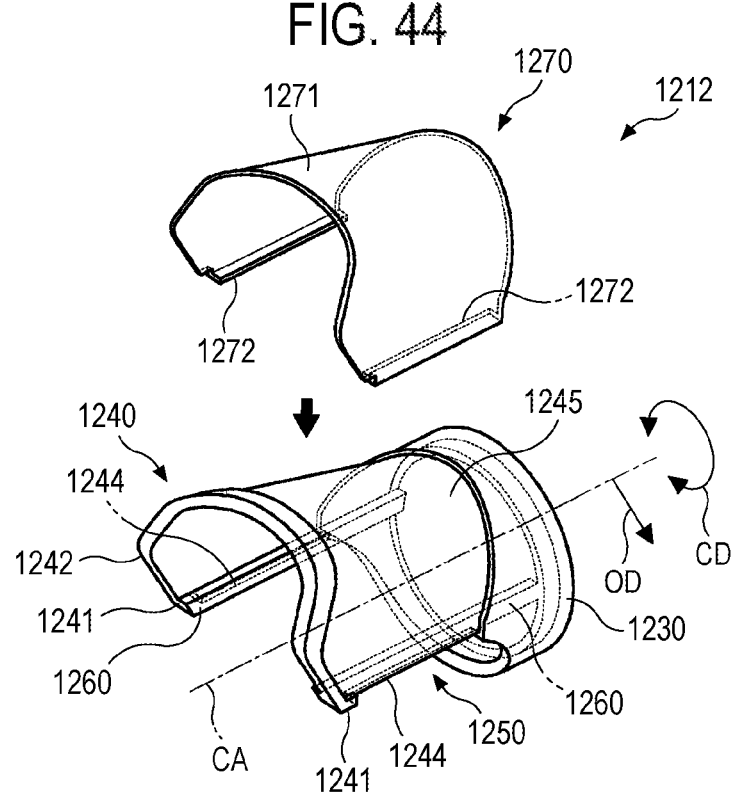
FIG. 44 is an exploded perspective view of the movable body shown in FIG. 43.
Figure 45:
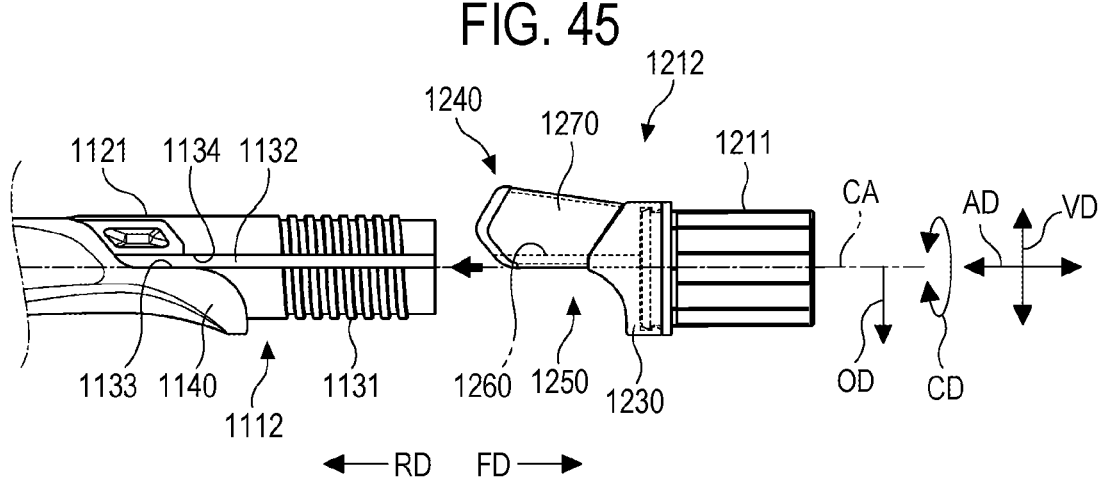
FIG. 45 is a partial side view of the reel seat showing a state where the movable hood and the seat body are disassembled
Figure 46:
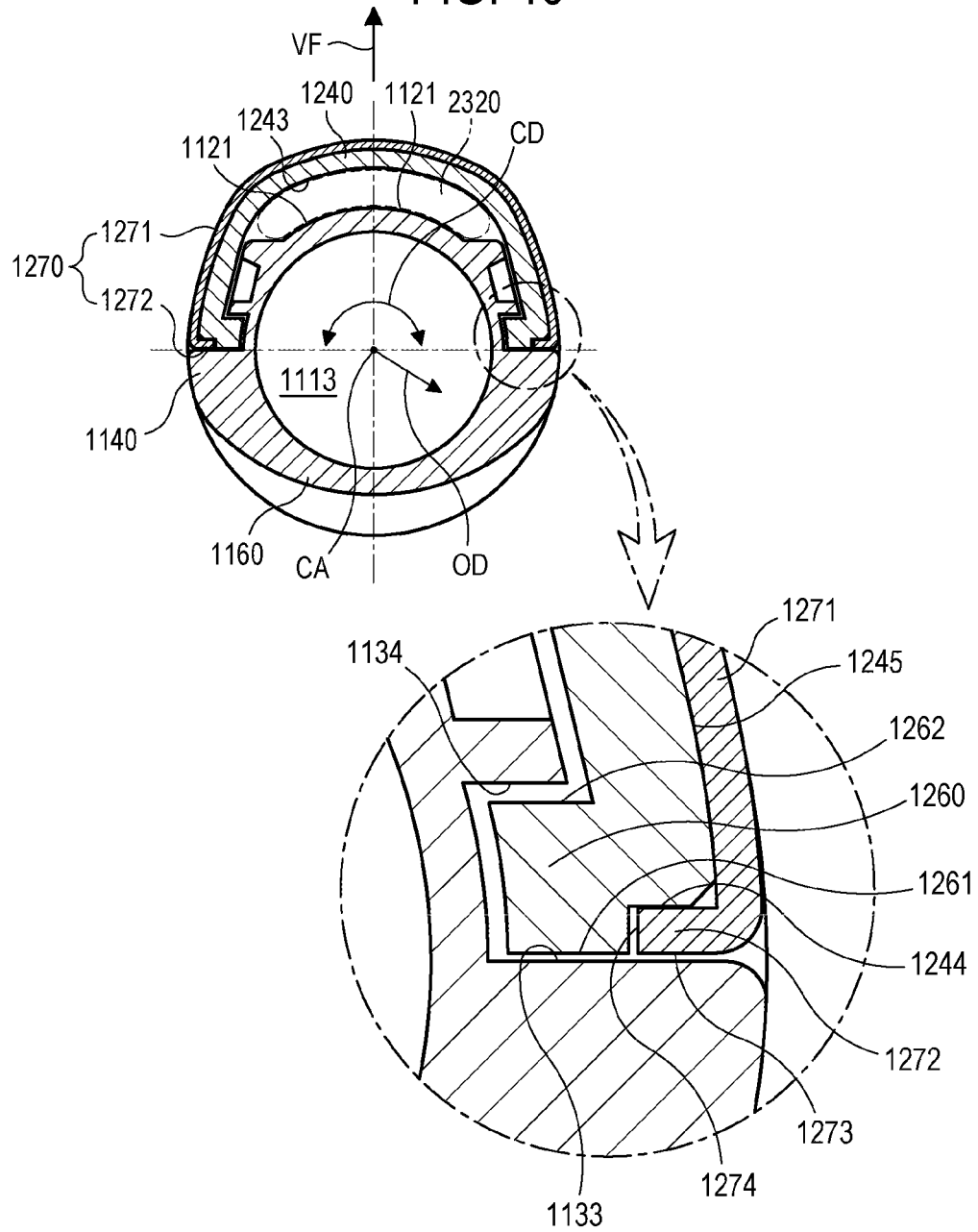
FIG. 46 is a cross-sectional view taken along line 46-46 of FIG. 39.

FIG. 43 is a perspective view of the movable body of the movable hood shown in FIG. 39, and FIG. 44 is an exploded perspective view of the movable body shown in FIG. 43. FIG. 45 is a partial side view of the reel seat, and shows a state where the movable hood and the seat body are disassembled. FIG. 46 is a cross-sectional view taken along line 46-46 of FIG. 39. Reference is made to FIGS. 42 to 46.

The reinforcing cover 1270 includes a cover portion 1271 and an engaging portion 1272. The cover portion 1271 is formed so as to cover the outer surface of the second hood portion 1240 (the surface of the second hood portion which is located opposite to an inner surface 1243 pressing the second leg). Further, the cover portion 1271 is formed so as to make close contact with the outer surface of the second hood portion 1240. The engaging portion 1272 protrudes toward the central axis CA from each lateral end of the cover portion 1271 in the circumferential direction CD. The engaging portion 1272 can be engaged with the lateral end edge 1241 of the second hood portion. The engaging portion 1272 engaged with the lateral end edge 1241 of the second hood portion is inserted into the guide groove 1132 of the seat body together with the guide protrusion 1260.

The reinforcing cover 1270 may be formed from a metal plate material by press working. The cover portion 1271 is formed in an arcuately curved shape so as to have a uniform thickness along the circumferential direction CD. A cross-sectional shape of the cover portion 1271 may take a substantially C-shape corresponding to the shape of the outer surface of the second hood portion. The engaging portion 1272 may be formed by continuously bending, toward the central axis CA, each lateral end portion of the cover portion 1271 which corresponds to the guide protrusion 1260. The engaging portion 1272 may have the same thickness as a thickness of the cover portion 1271. The reinforcing cover 1270 made of a metal material may have elasticity and rigidity. Thus, the reinforcing cover 1270 may be coupled to the second hood portion 1240 in such a way of pressing the reinforcing cover 1270 toward the second hood portion 1240 to be snap-coupled to the second hood portion.

According to one embodiment, in the movable body 1212 in which the reinforcing cover 1270 is coupled to the second hood portion 1240, the movable body 1212 may not have a step between the second hood portion 1240 and the reinforcing cover 1270. In this regard, the second hood portion 1240 has a pair of engaging grooves 1244 having a depth corresponding to a thickness of the engaging portion 1272.

Referring to FIGS. 43 and 44, each engaging portion 1272 is engaged with each engaging groove 1244. The engaging groove 1244 is formed in parallel to the central axis CA along the lateral end edge 1241. The engaging groove 1244 is located adjacent to the guide protrusion 1260 in the radially outward direction OD. Since the engaging groove 1244 has a concave depth corresponding to the thickness of the engaging portion, no step is formed between the lower surface of the guide protrusion 1260 (the circumferential surface of the guide protrusion) and the lower surface of the engaging portion 1272 (the circumferential surface of the engaging portion) in the state where the engaging portion 1272 is engaged with the lateral end edge 1241 of the second hood portion.

Further, according to one embodiment, the second hood portion 1240 has a seating groove 1245 on which the cover portion 1271 of the reinforcing cover is seated. The seating groove 1245 is formed between the engaging grooves 1244 along the outer surface of the second hood portion in the circumferential direction CD, and has a depth corresponding to the thickness of the cover portion 1271. The seating groove 1245 communicates with each engaging groove 1244. Since the seating groove 1245 has a concave depth, the seating groove 1245 makes a step with respect to the annular portion 123), and makes a step with respect to the inner end edge 1242 of the second hood portion. The cover portion 1271 may have a thickness corresponding to the concave depth of the seating groove 1245. When the cover portion 1271 is seated on the seating groove 1245, no step is formed between the cover portion 1271 and the annular portion 1230 and between the cover portion 1271 and the inner end edge of the second hood portion.

Since the accommodating portion 1250 is formed as a space below the second hood portion 1240, the lateral end edge 1241 of the second hood portion 1240 becomes the first edge of the accommodating portion 1250 (i.e., the first edge 1251 of the accommodating portion shown in FIG. 8). The lower surface of the engaging portion 1272 (the circumferential surface of the engaging portion) may form the first edge of the accommodating portion 1250 and may be located at the same height as the central axis CA. As shown in FIGS. 43 and 45, in the state where the engaging portion 1272 is engaged with the lateral end edge 1241 of the second hood portion, the lower surface of the engaging portion 1272 may form the first edge of the accommodating portion 1250. That is, the first edge of the accommodating portion 1250 can partially include the lower surface of the engaging portion 1272.

Reference is made to FIGS. 45 and 46. The lower surface of the guide protrusion 1260 and the lower surface of the engaging portion 1272 may be located at the same height as the central axis CA. The guide groove 1132 of the seat body extends rearward from the front end of the cylindrical body 1112 (one end of the seat body). The guide groove 1132 may have first and second circumferential surfaces 1133 and 1134 facing toward each other in the circumferential direction CD, and a bottom surface extending along the central axis CA between the first and second circumferential surfaces 1133 and 1134. The surface of the guide groove, which corresponds to the lower surface 1261 of the guide protrusion and the lower surface 1273 of the engaging portion, is the first circumferential surface 1133. The second circumferential surface 1134 is located opposite to the first circumferential surface 1133. In the side view of the seat body, the first circumferential surface 1133 may be located at the same height as the central axis CA, and may partially form the lateral end edge of the projecting portion 1140. In the state where the second hood portion 1240 is positioned above the projecting portion 1140, the lower surface 1261 of the guide protrusion and the lower surface 1273 of the engaging portion 1272 may make contact with the first circumferential surface 1133 in the circumferential direction CD.

As the second hood portion 1240 is moved toward the first hood portion by the rotation of the nut 1211, the first edge of the accommodating portion 1250 (the lower surface 1273 of the engaging portion) is moved alongside the lateral end edge of the projecting portion 1140 along the central axis CA, and the projecting portion 1140 is inserted into the accommodating portion 1250. As the second hood portion 1240 is moved toward the first hood portion, due to the rotation of the nut 1211, the second hood portion 1240 presses, at the inner surface 1243 thereof, the second leg 2320 of the reel to the seating portion 1121. A pressing force acts on the second leg 2320 from the second hood portion 1240, and a reaction force VF resisting the pressing force acts on the second hood portion 1240 from the second leg 2320. The reaction force VF acts to push up the second hood portion 1240, i.e., to press the second hood portion 1240 upward. As the reaction force VF acts, the upper surface 1262 of the guide protrusion comes into contact with the second circumferential surface 1134 of the guide groove. As the nut 1211 is further rotated, a stronger reaction force VF acts on the second hood portion 1240. Therefore, the second hood portion 1240 and the guide protrusion 1260 may be deformed. However, the cover portion 1271 of the reinforcing cover is in close contact with the outer surface of the second hood portion 1240, and the engaging portion 1272 of the reinforcing cover is engaged with the lateral end edge of the second hood portion where the guide protrusion 1260 is located. Accordingly, the reinforcing cover 1270 can prevent the deformation of the second hood portion 1240 and the deformation of the guide protrusion 1260.

Figure 47:
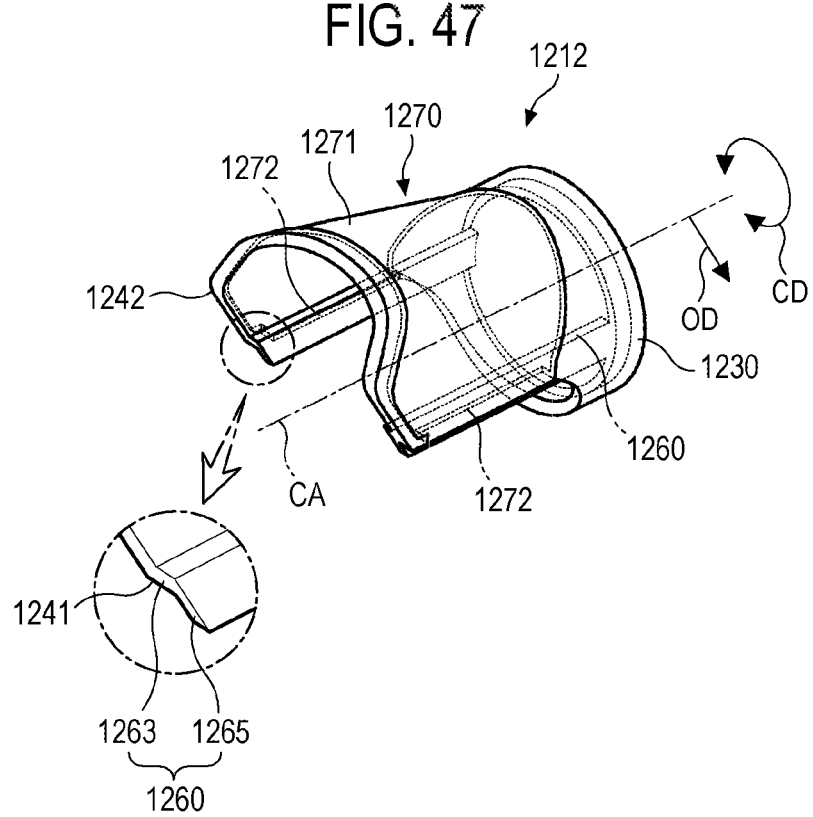
FIG. 47 is a perspective view of a movable body of a movable hood according to one embodiment of the present disclosure.
Figure 48:
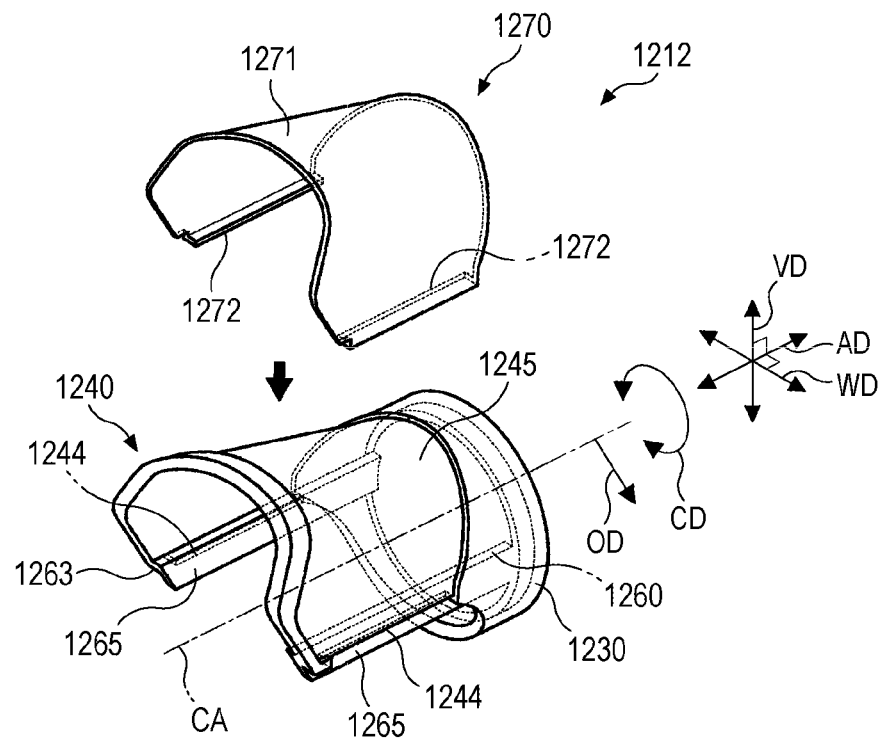
FIG. 48 is an exploded perspective view of the movable body shown in FIG. 47.
Figure 49:
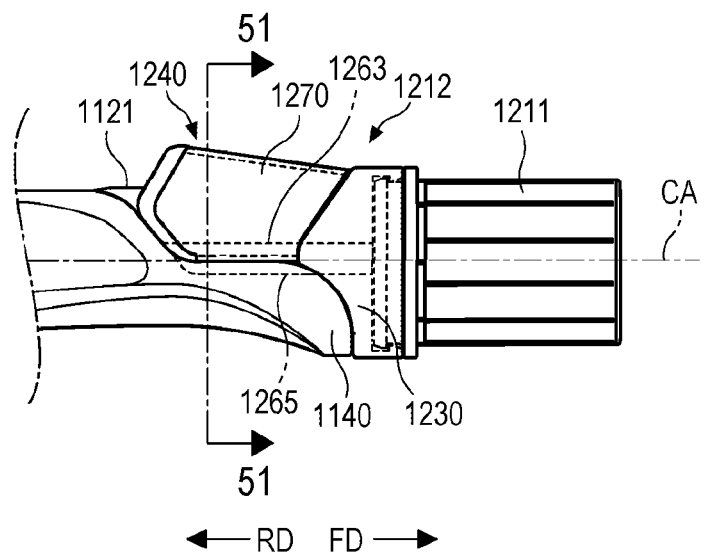
FIG. 49 is a partial side view of the reel seat according to one embodiment in which the movable body shown in FIG. 47 is employed.
Figure 50:
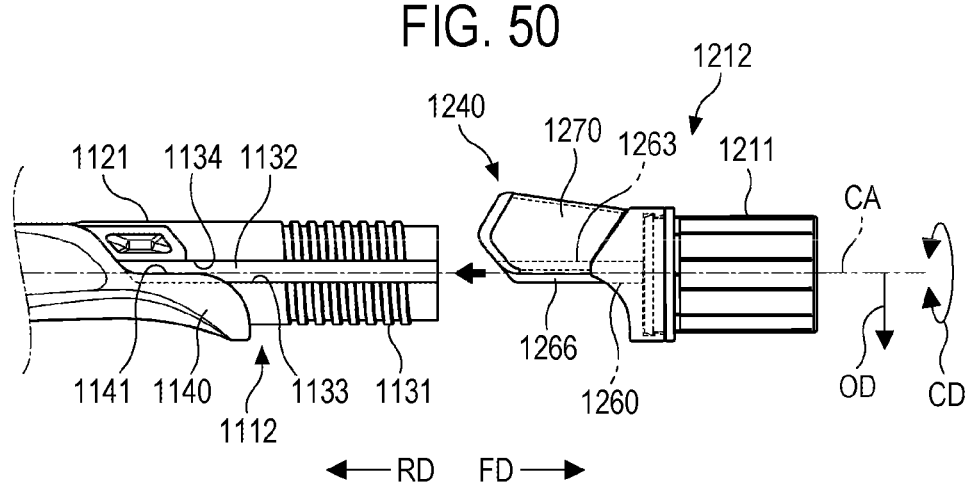
FIG. 50 is an exploded side view of the reel seat according to one embodiment in which the movable body shown in FIG. 47 is employed.
Figure 51:
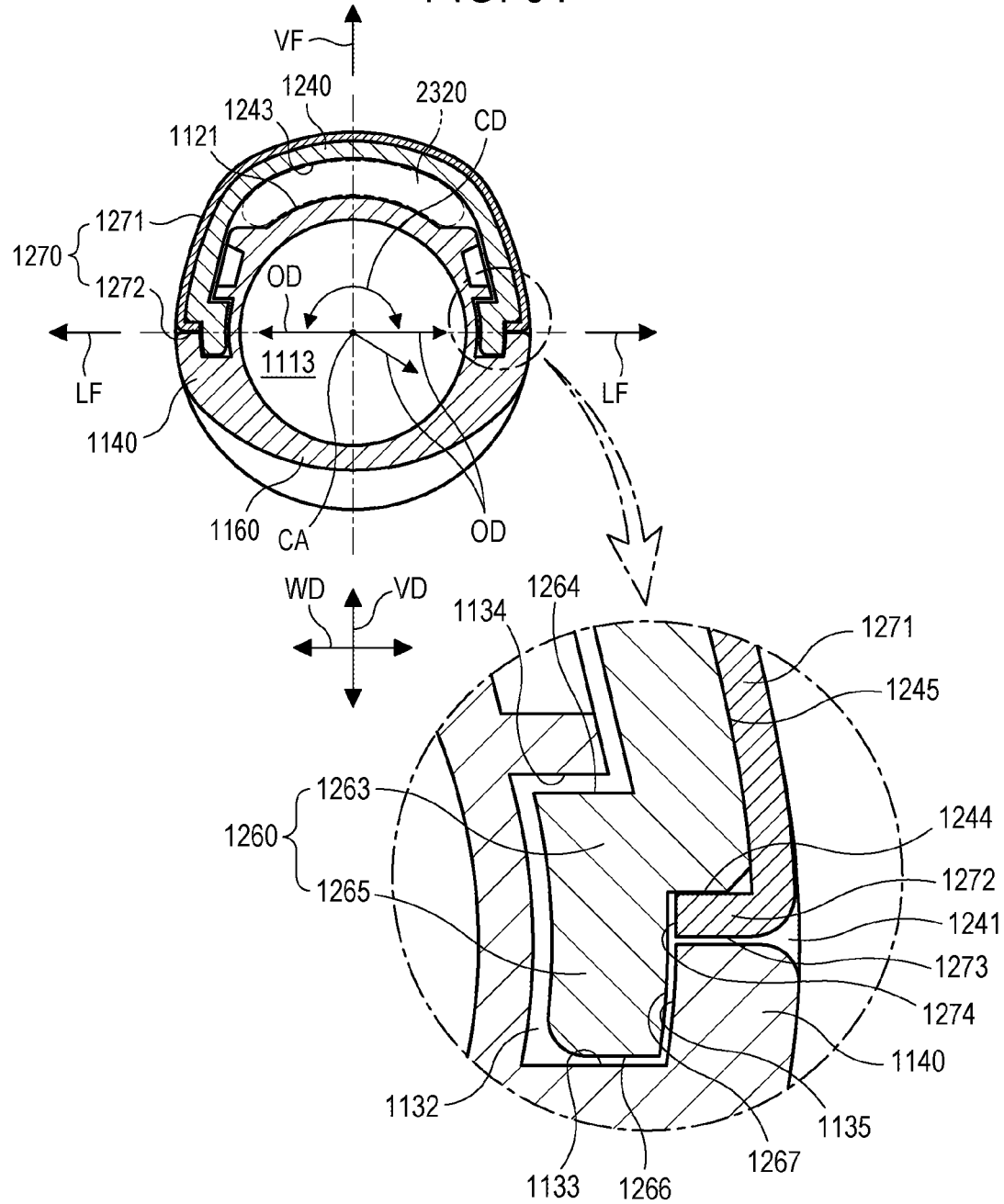
FIG. 51 is a cross-sectional view taken along line 51-51 of FIG. 49.

FIG. 47 is a perspective view of a movable body of a movable hood according to one embodiment of the present disclosure. FIG. 48 is an exploded perspective view of the movable body shown in FIG. 47. FIG. 49 is a partial side view of a reel seat according to one embodiment in which the movable body shown in FIG. 47 is employed. FIG. 50 is an exploded side view of the reel seat according to one embodiment in which the movable body shown in FIG. 47 is employed. FIG. 51 is a cross-sectional view taken along line 51-51 of FIG. 49. Reference is made to FIGS. 47 to 51.

The guide protrusion 1260 includes a first protrusion portion 1263 extending from the lateral end edge 1241 of the second hood portion toward the central axis CA, and a second protrusion portion 1265 extending downward from the first protrusion portion 1263 beyond the central axis CA. Thus, the guide protrusion 1260 of this embodiment has a circumferential thickness larger than a circumferential thickness of the guide protrusion of the above-described embodiment.

The guide groove 1132 has a groove width corresponding to the thickness of the guide protrusion 1260 in the circumferential direction CD. The guide groove 1132 of this embodiment extends through the lateral end edge 1141 of the projecting portion 1140.

The guide groove 1132 may have two surfaces facing toward each other in the circumferential direction CD. In the two surfaces facing toward each other in the circumferential direction, the surface located downward is the first circumferential surface 1133. The first circumferential surface 1133 is located below the central axis CA in the vertical direction VD or in the circumferential direction CD. Since the guide groove 1132 passes through the lateral end edge 1141 of the projecting portion 1140, a portion of the first circumferential surface 1133 is located inside the projecting portion 1140. The first circumferential surface 1133 can make contact with a lower surface 1266 of the second protrusion portion 1265 in the circumferential direction CD (the circumferential surface of the second protrusion portion).

Further, the guide groove 1132 may have two surfaces, which extend along the central axis CA and face toward each other in the radially outward direction OD. In the two surfaces facing toward each other in the outer radial direction, the surface located further outwards is an inward surface 1135 (see FIG. 51). The inward surface 1135 is defined between the guide groove 1132 and the projecting portion 1140. The inward surface 1135 is located inside the projecting portion 1140 and extends upward from the first circumferential surface 1133. The inward surface 1135 can make contact with an outward surface 1267 of the second protrusion portion 1265 in the radially outward direction OD.

The engaging portion 1272 of the reinforcing cover is engaged with the lateral end edge 1241 of the second hood portion so as to face toward the outward surface 1267 of the second protrusion portion 1265. Thus, when the second hood portion 1240 is positioned above the projecting portion 1140, the lower surface 1273 of the engaging portion 1272 can make contact with the lateral end edge 1141 of the projecting portion 1140.

The legs of the reel may have various widths. The movable hood is required to firmly fix the legs of the reel having various widths to the seating portion of the grip body. By way of example, referring to FIG. 51, the reel can be moved in the width direction WD due to the movement of the fishing line in the state where the second leg 2320 is fixed to the seating portion 1121 by the second hood portion 1240. Therefore, a lateral surface of the second leg 2320 can come into contact with the inner surface 1243 of the second hood portion 1240, and an expansion force LF for expanding the second hood portion 1240 in the width direction WD can be applied to the inner surface of the second hood portion 1240 in the radially outward direction OD. The movable body includes the above-described accommodating portion, and the second hood portion 1244 protrudes from the annular portion of the movable body. As the expansion force LF is applied to the second hood portion 1240, the second hood portion 1240 may be deformed in the width direction WD with reference to an apex of the second hood portion 1240 in the vertical direction. Further, since the second leg 2320 is not fixed in place, a casting motion may be unstable, and noise may be generated due to vibration.

Reference is made to FIGS. 50 and 51. As the second hood portion 1240 is moved alongside the projecting portion 1140, a reaction force VF acts on the second hood portion 1240. Therefore, the second hood portion 1240 and the guide protrusion 1260 may be deformed. However, the cover portion 1271 of the reinforcing cover can prevent the deformation of the second hood portion 1240, and the engaging portion 1272 of the reinforcing cover can prevent the deformation of the guide protrusion 1260. The second protrusion portion 1265 extends downward beyond the central axis CA, and the outward surface 1267 of the second protrusion portion can make contact with the inward surface 1135 of the guide groove adjacent to the projecting portion 1140 in the radially outward direction OD (or in the width direction WD) and can be supported by the inward surface 1135. Thus, due to the second protrusion portion 1265, the guide protrusion 1260 can effectively resist the expansion force LF that expands the second hood portion 1240. Further, since an inward end surface 1274 of the engaging portion 1272 faces toward the outward surface 1267 of the second protrusion portion, the reinforcing cover can suppress being pushed in the radially outward direction (or in the width direction) of the second protrusion portion 1265, and can reinforce the guide protrusion 1260.

Figure 52:
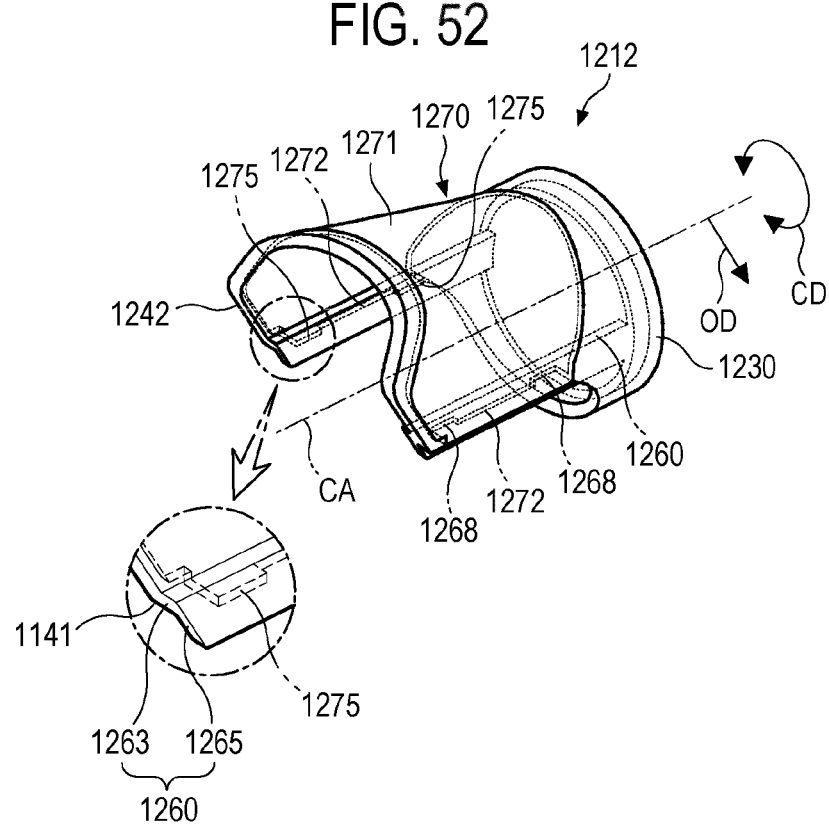
FIG. 52 is a perspective view of a movable body of a movable hood according to one embodiment of the present disclosure.
Figure 53:
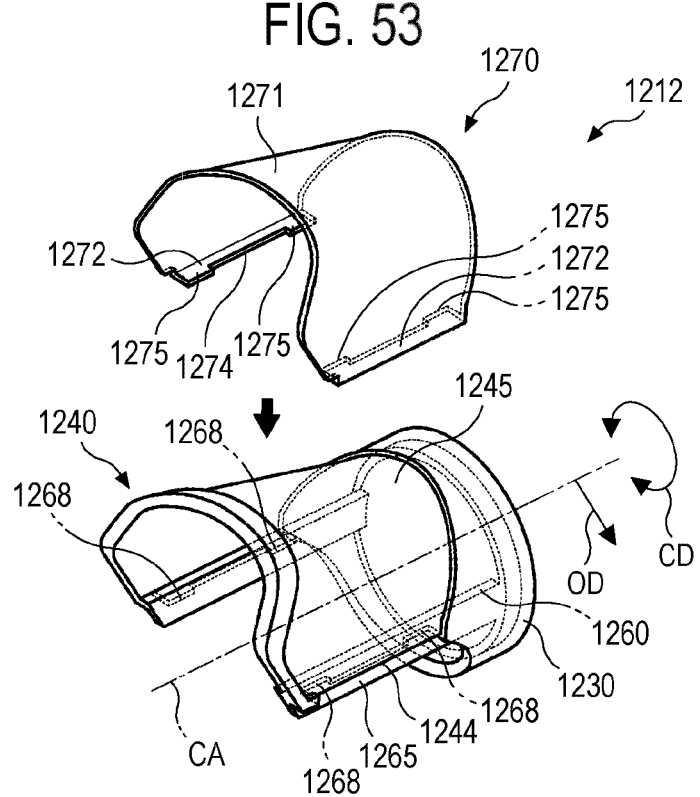
FIG. 53 is an exploded perspective view of the movable body shown in FIG. 52.
Figure 54:
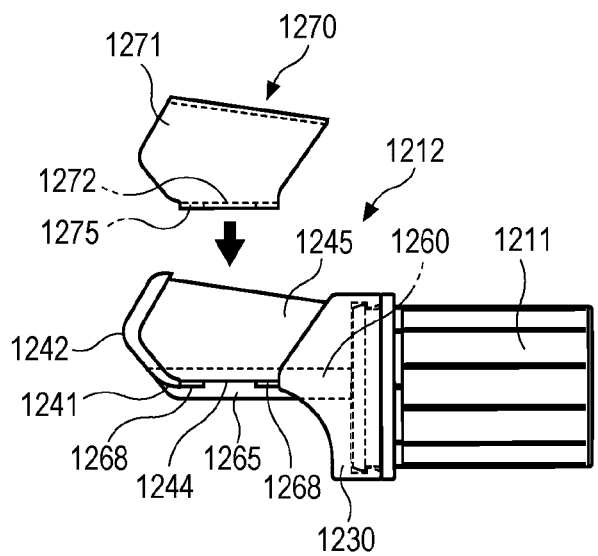
FIG. 54 is an exploded side view of the movable body shown in FIG. 52.
Figure 55:
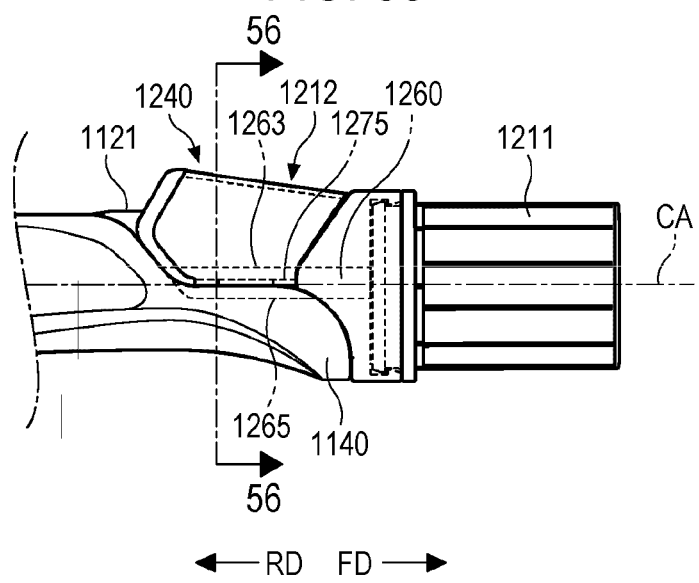
FIG. 55 is a partial side view of the reel seat according to one embodiment in which the movable body shown in FIG. 52 is employed.
Figure 56:
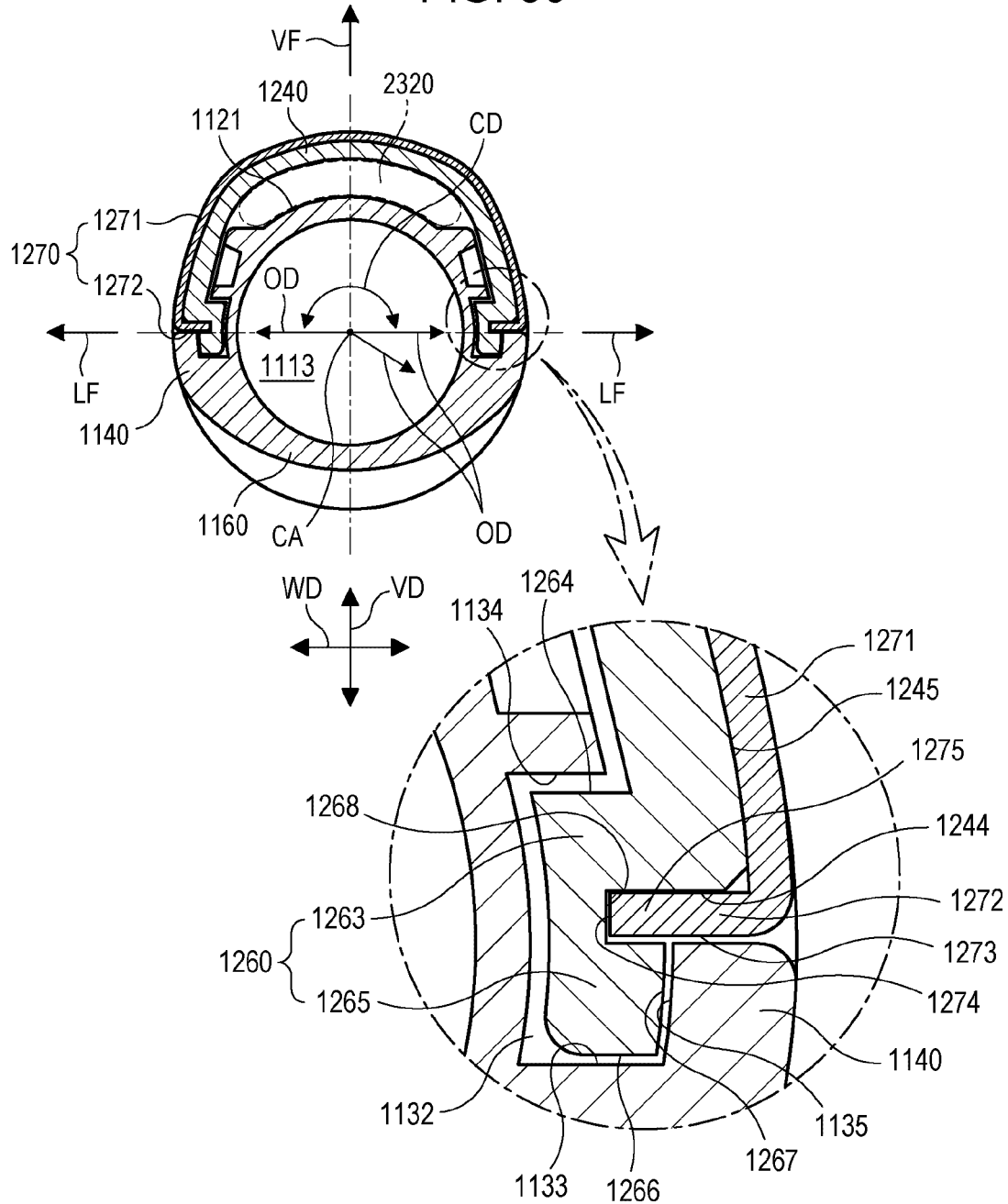
FIG. 56 is a cross-sectional view taken along line 56-56 of FIG. 55.

FIG. 52 is a perspective view of a movable body of a movable hood according to one embodiment of the present disclosure. FIG. 53 is an exploded perspective view of the movable body shown in FIG. 52. FIG. 54 is an exploded side view of the movable body shown in FIG. 52. FIG. 55 is a partial side view of a reel seat according to one embodiment in which the movable body shown in FIG. 52 is employed. FIG. 56 is a cross-sectional view taken along the line 56-56 of FIG. 55. Reference is made to FIGS. 52 to 56. When compared to the embodiment shown in FIGS. 47 to 51, the embodiment shown in FIGS. 52 to 56 has engagement between the engaging portion and the guide protrusion.

The reinforcing cover 1270 includes at least one convex portion 1275 protruding from each engaging portion 1272 toward the central axis CA. By way of example, one or more convex portions 1275 may protrude from the inward end surface 1274 of the engaging portion 1272. Each guide protrusion 1260 includes a concave portion 1268 with which the convex portion 1275 is engaged. The concave portion 1268 is located adjacent to the engaging groove 1244 and is formed in the outward surface 1267 of the second protrusion portion. The convex portion 1275 of the engaging portion is engaged with the concave portion 1268, thereby reinforcing the guide protrusion 1260. Further, since the convex portion 1275 is engaged with the concave portion 1268, the reinforcing cover 1270 can be prevented from being separated from the second hood portion 1240.

In the side view of the reel seat, the concave portion 1268 has a substantially rectangular shape, and has a predetermined depth in the radially inward direction of the central axis CA. A dimension of the concave portion 1268 in the vertical direction VD may be approximately the same as the thickness of the engaging portion 1272 of the reinforcing cover (or the thickness of the convex portion 1275). Two concave portions 1268 may be formed in the outward surface 1267 of the second protrusion portion 1265, and the convex portions 1275 may be formed to correspond to the concave portion 1268. As another example, one concave portion 1268 may be formed in the outward surface 1267 of the second protrusion portion 1265, and the convex portion 1275 may be formed to correspond to the concave portion 1268.

In the side view of the reel seat, the convex portion 1275 has a rectangular shape complementary to the rectangular shape of the concave portion 1268. The convex portion 1275 may be engaged with the concave portion 1268 such that a gap is formed between a radially inward surface of the convex portion and a radially outward surface of the concave portion. Thus, the reinforcing cover 1270 can maintain an arcuately-curved shape that makes close contact with the outer surface of the second hood portion 1240, without the engaging portion 1272 being pushed in the radially outward direction OD.

Since the position where the convex portion 1275 is engaged with the concave portion 1268 is located above the inward surface 1135 of the guide groove, the second protrusion portion 1265 can be reinforced. The concave portion 1268 is formed in the engaging groove 1244, and opens in the radially outward direction. That is, the concave portion 1268 is located at a position where the guide protrusion changes from the first protrusion portion 1263 to the second protrusion portion 1265, i.e., at a base end of the second protrusion portion 1265. The convex portion 1275 of the reinforcing cover protrudes continuously from the engaging portion 1272 toward the central axis CA, and is engaged with the concave portion 1268. Accordingly, at the position of the guide protrusion 1260 where the first protrusion portion changes to the second protrusion portion, due to rigidity of the reinforcing cover, the first protrusion portion 1263 and the second protrusion portion 1265 are suppressed from being pushed in the radially outward direction and the deformation of the guide protrusion 1260 is suppressed.

Thus, when the expansion force LF acts on the second hood portion 1240, the guide protrusion 1260 is reinforced such that the guide protrusion 1260 is suppressed from being pushed in the radially outward direction due to the rigidity of the reinforcing cover 1270. Further, the outward surface 1267 of the second protrusion portion 1265 can be supported by the inward surface 1135.

Figure 57:
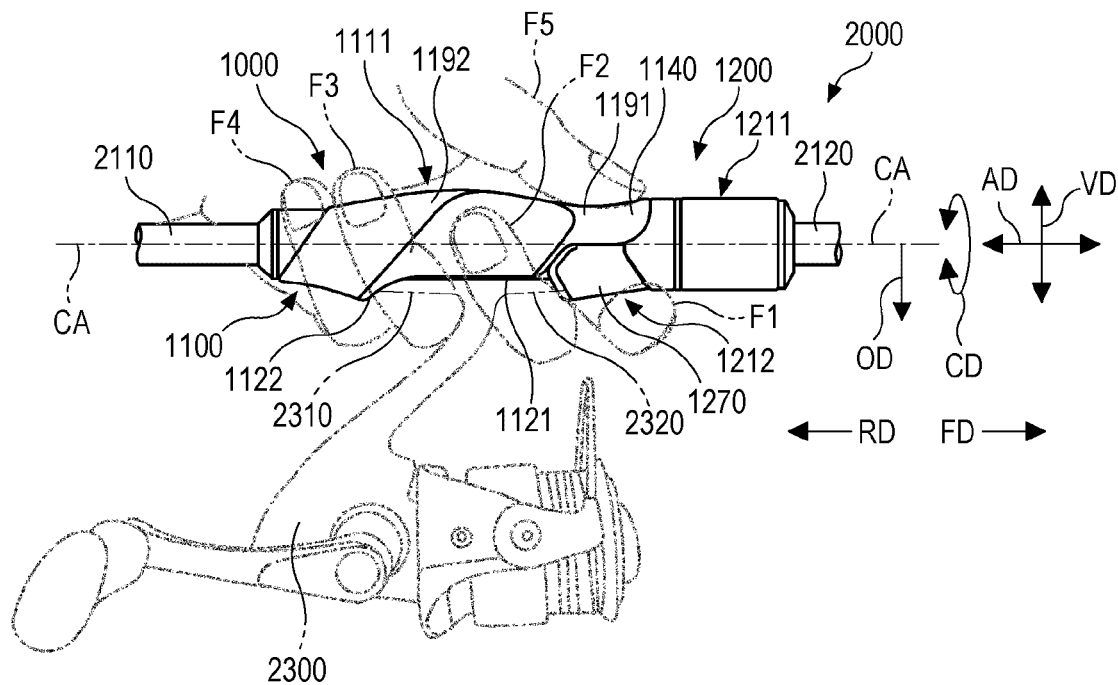
FIG. 57 is a side view showing a portion of a fishing rod including a reel seat according to one embodiment of the present disclosure.
Figure 58:
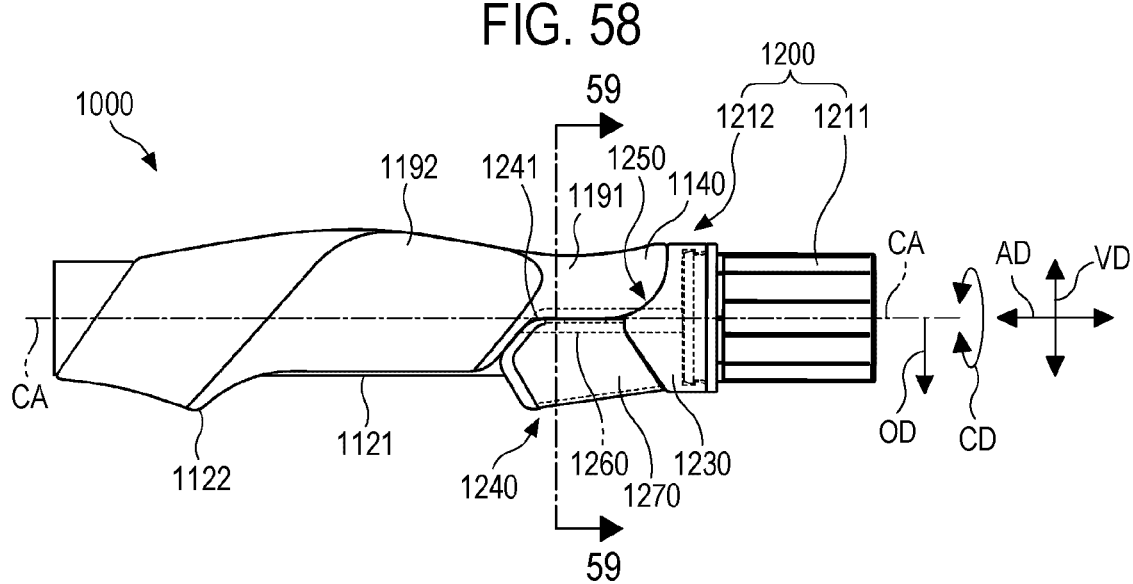
FIG. 58 is a side view of the reel seat shown in FIG. 57.
Figure 59:
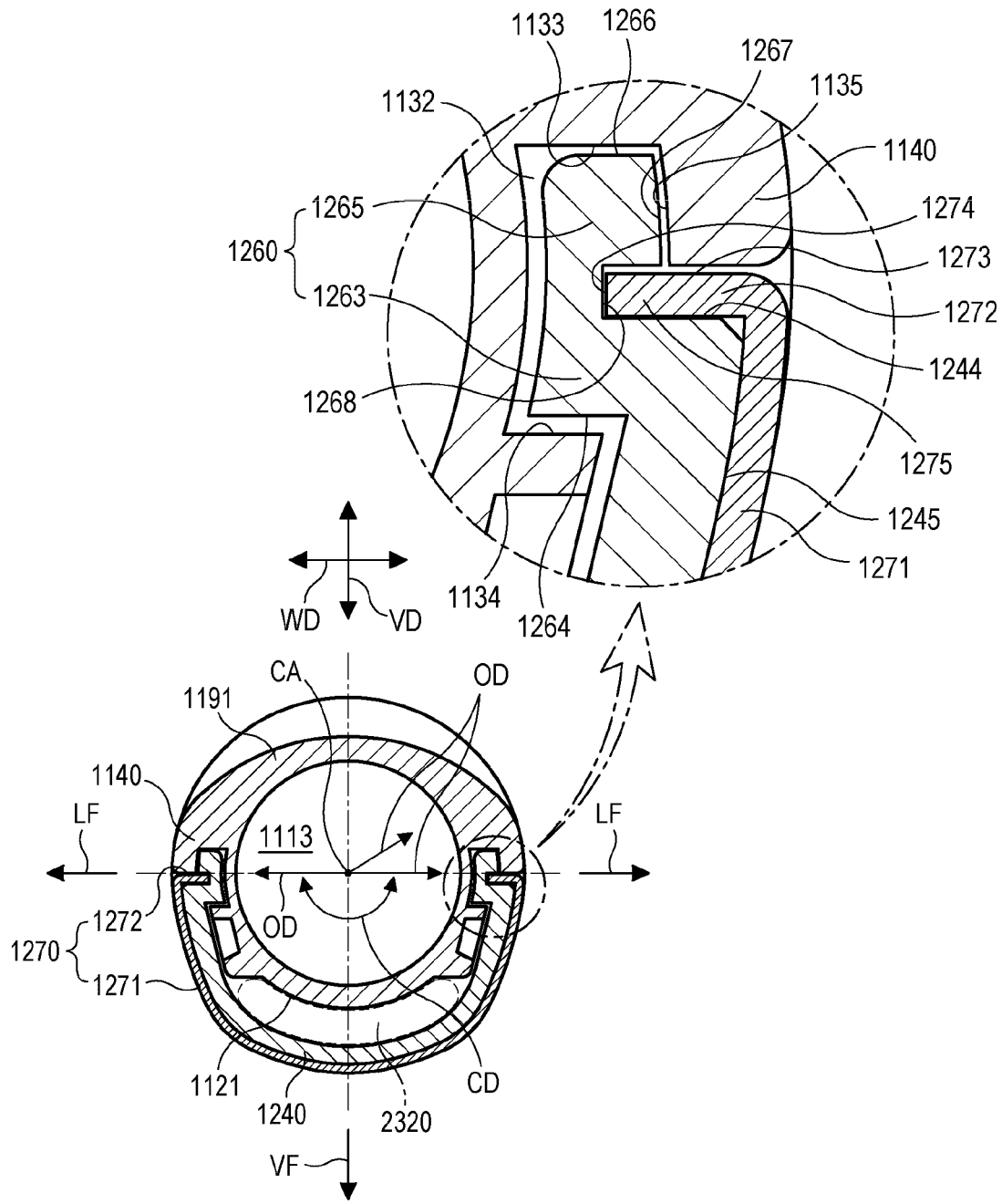
FIG. 59 is a cross-sectional view taken along line 59-59 of FIG. 58.

FIG. 57 is a side view showing a portion of a fishing rod including a reel seat according to one embodiment of the present disclosure. FIG. 58 is a side view of the reel seat shown in FIG. 57. FIG. 59 is a cross-sectional view taken along line 59-59 of FIG. 58. Reference is made to FIGS. 57 to 59.

In the fishing rod 2000 shown in FIG. 57, the reel 2300 is a spinning reel. In the spinning reel, a rotary shaft of a spool around which the fishing line is wound may be disposed along the central axis CA. The first and second legs 2310 and 2320 of the spinning reel are fixed to the lower side of the reel seat 1000, thereby attaching the spinning reel to the reel seat 1000. Therefore, the seating portion 1121 on which the first and second legs 2310 and 2320 are seated is located at the lower side of the seat body 1100, and forms a portion of the lower surface of the grip body 1111.

The structure and configuration of the reel seat according to the above-described embodiment are reversed with reference to the central axis CA, and thus may provide the structure and configuration of the reel seat 1000 according to this embodiment. That is, the cylindrical body, the grip body, and the movable hood of the reel seat according to the above-described embodiment are reversed with reference to the central axis CA, and thus may provide the cylindrical body, the grip body, and the movable hood of the reel seat according to this embodiment. Thus, the structure and configuration of the movable hood 1200 of the reel seat 1000 according to this embodiment can be understood by referring to the structure and configuration of the movable hood according to the above-described embodiment.

The reel seat 1000 includes the seat body 1100 capable of being coupled to the rod bodies 2110 and 2120, and the seat body 1100 has the above-described bore. The seat body 1100 has the grip body 1111 that can be gripped by an angler's fingers, and the above-described cylindrical body extending frontward from the grip body 1111. Further, the reel seat 1000 includes the movable hood 1200 which is coupled to the seat body 1100 (specifically, the cylindrical body) so as to be movable along the central axis CA of the bore.

The grip body 1111 of the seat body may be gripped by the index finger F1, the middle finger F2, the ring finger F3, and the little finger F4. The grip body 1111 of the seat body includes the above-described seating portion 1121 which forms a portion of the lower surface of the seat body. The grip body 1111 of the seat body includes the above-described projecting portion 1140. The projecting portion 1140 is located at the opposite side of the seating portion 1121 with reference to the central axis CA, i.e., above the seating portion 1121. The projecting portion 1140 is formed in the circumferential direction CD and protrudes in the radially outward direction OD.

The grip body 1111 of the seat body includes a curved surface portion 1191 which is located adjacent to the projecting portion 1140 and is arcuately curved so as to be concave with respect to the central axis CA. The curved surface portion 1191 may correspond to the first curved surface portion in the above-described embodiment. In this embodiment, the curved surface portion 1191 can make contact with a thumb F5. When the angler grips the reel seat 1000, the curved surface portion 1191 can improve the grip feel for the thumb F5 and can facilitate a casting motion.

The grip body 1111 of the seat body includes an upper surface portion 1192, which extends rearward from the curved surface portion 1191 and is arcuately curved so as to be convex with respect to the central axis CA. The upper surface portion 1192 may correspond to the above-described bulging portion. The upper surface portion 1192 can make contact with a palm. As another example, the upper surface portion 1192 may take a shape arcuately curved so as to be concave with respect to the central axis CA. Alternatively, a part made of a soft material such as cork, EVA (ethylene-vinyl acetate copolymer), elastomer, or rubber may be fitted to the upper surface portion 1192.

The grip body 1111 of the seat body includes the first hood portion 1122, which is located at the seating portion so as to be located opposite to the movable hood 1200 along the central axis and fixes the first leg 2310. The cylindrical body of the seat body forms a cylindrical end portion of the seat body, which extends from the seating portion 1121 and the projecting portion 1140 along the central axis CA. The cylindrical body of the seat body includes the above-described male thread formed on its outer periphery, and the above-described pair of guide grooves extending through the male thread. The pair of guide grooves extend from the front end of the cylindrical body of the seat body (one end of the cylindrical body) to the projecting portion 1140.

The movable hood 1200 includes the nut 1211 threadedly coupled to the male thread of the seat body so as to be rotatable in the circumferential direction CD, and the movable body 1212 movable along the central axis CA by the nut 1211.

The movable body 1212 includes the annular portion 1230, the second hood portion 1240, the accommodating portion 1250, the guide protrusion 1260, and the reinforcing cover 1270. The nut 1211 is coupled to the annular portion 1230 so as to be relatively rotatable. The second hood portion 1240 presses and fixes the second leg 2320 to the seating portion 1121. The second hood portion 1240 extends from the annular portion 1230 toward the first hood portion 1122. Further, the second hood portion 1240 is positioned at the opposite side of the projecting portion (below the projecting portion) in the vertical direction VD by moving alongside the projecting portion 1140 along the central axis CA. The accommodating portion 1250 is formed as a space between the annular portion 1230 and the second hood portion 1240 and accommodates the projecting portion 1140. The guide protrusion 1260 is formed at each lateral end edge of the second hood portion in the circumferential direction CD and is slidably inserted into the guide groove.

The reinforcing cover 1270 of the movable body is engaged with the lateral end edge 1241 of the second hood portion while covering the outer surface of the second hood portion 1240. The reinforcing cover 1270 reinforces the second hood portion and the guide protrusion and prevents the deformation of the second hood portion and the guide protrusion. In this embodiment, the reinforcing cover 1270 can make contact with the index finger F1. The surface of the engaging portion 1272 of the reinforcing cover in the circumferential direction CD forms the above-described first edge of the accommodating portion 1250.

Each guide protrusion 1260 includes the first protrusion portion 1263 extending from the lateral end edge 1241 toward the central axis CA, and the second protrusion portion 1265 extending upward from the first protrusion portion 1263 beyond the central axis CA in the circumferential direction CD. The concave portion 1268 of each guide protrusion 1260 is located adjacent to the circumferential surface 1264 of the first protrusion portion 1263 (the lower surface of the first protrusion portion) and is formed in the outward surface 1267 of the second protrusion portion 1265.

The first circumferential surface 1133 of the guide groove 1132 is spaced apart from the central axis CA in the vertical direction VD, and can make contact with the circumferential surface 1266 of the second protrusion portion 1265 (the upper surface of the second protrusion portion) in the circumferential direction CD. The inward surface 1135 of the guide groove 1132 is located inside the projecting portion 1140. The inward surface 1135 extends upward from the first circumferential surface 1133 in the circumferential direction CD and can make contact with the outward surface 1267 of the second protrusion portion in the radially outward direction OD.

The engaging portion 1272 of the reinforcing cover covers the engaging groove 1244 up to the outward surface 1267 of the second protrusion portion 1265. The convex portion 1275 of the reinforcing cover protrudes continuously from the engaging portion 1272 toward the central axis CA, and is engaged with the concave portion 1268 formed in the second protrusion portion 1265 to reinforce the guide protrusion 1260.

As the second hood portion 1240 is moved alongside the projecting portion 1140, the second hood portion 1240 presses the second leg 2320 of the reel to the seating portion 1121. The reaction force VF (see FIG. 59) resisting the pressing acts to push the second hood portion 1240 downward. The circumferential surface 1264 of the first protrusion portion 1263 (the lower surface of the first protrusion portion) is brought into contact with the second circumferential surface 1134 of the guide groove 1132 by the reaction force VF, and the second hood portion 1240 and the guide protrusion 1260 may be deformed thereby. However, the cover portion 1271 of the reinforcing cover can prevent the deformation of the second hood portion 1240, and the engaging portion 1272 of the reinforcing cover can prevent the deformation of the guide protrusion 1260.

The second protrusion portion 1265 extends upward beyond the central axis CA, and the outward surface 1267 of the second protrusion portion can be supported by the inward surface 1135 of the guide groove in the radially outward direction OD (or in the width direction WD). Thus, due to the second protrusion portion 1265, the guide protrusion 1260 can effectively resist the expansion force LF that expands the second hood portion 1240. Further, since the inward end surface 1274 of the engaging portion 1272 faces toward the outward surface 1267 of the second protrusion portion, the reinforcing cover can suppress being pushed in the radially outward direction (or in the width direction) of the second protrusion portion 1265, and can reinforce the guide protrusion 1260.

Since the position where the convex portion 1275 is coupled to the concave portion 1268 is located below the inward surface 1135 of the guide groove, the second protrusion portion 1265 can be reinforced. At the position of the guide protrusion 1260 where the first protrusion portion changes to the second protrusion portion, due to the rigidity of the reinforcing cover, the first protrusion portion 1263 and the second protrusion portion 1265 are suppressed from being pushed in the radially outward direction, and the deformation of the guide protrusion 1260 is suppressed. Thus, when the expansion force LF acts on the second hood portion 1240, the guide protrusion 1260 is reinforced such that the guide protrusion 1260 is suppressed from being pushed in the radially outward direction due to the rigidity of the reinforcing cover 1270.

The configuration of the guide groove, the guide protrusion, and the reinforcing cover shown in FIG. 59 may be one example to be employed in the reel seat according to this embodiment. The configuration of the guide groove, the guide protrusion, and the reinforcing cover according to the embodiment shown in FIG. 46, and the configuration of the guide groove, the guide protrusion, the and reinforcing cover according to the embodiment shown in FIG. 51 may be employed in the reel seat according to this embodiment.

Figure 60:
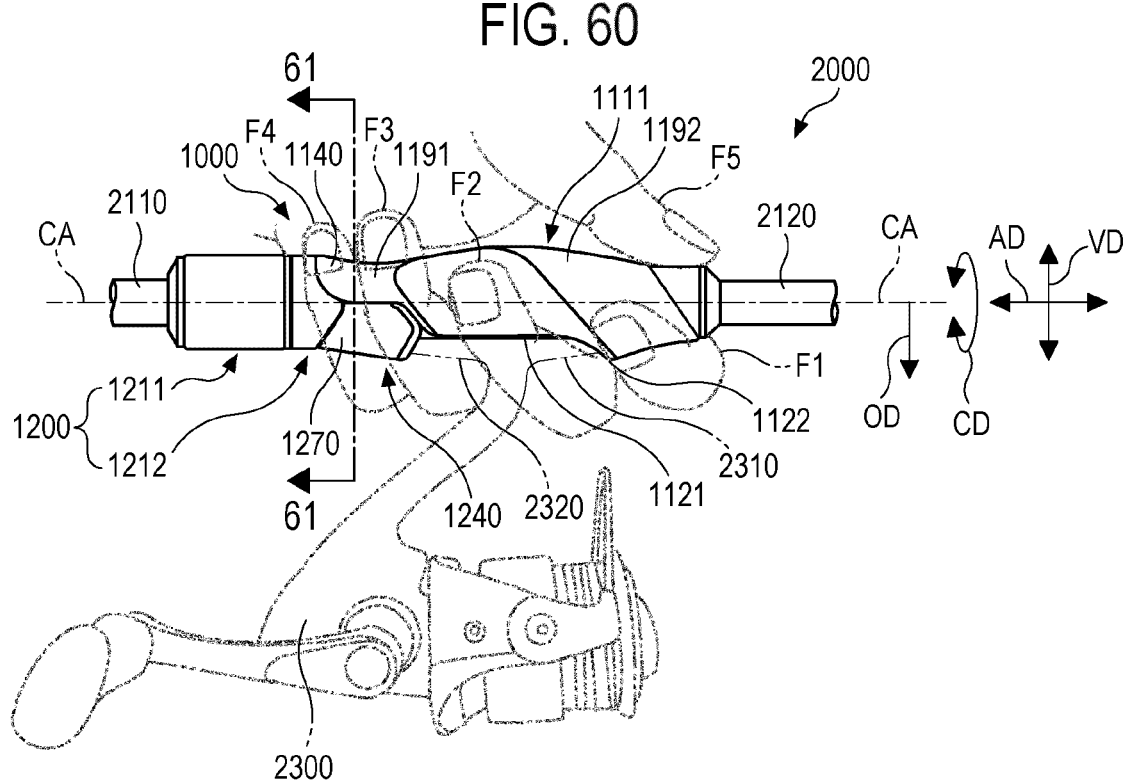
FIG. 60 is a side view showing a portion of the fishing rod including the reel seat according to one embodiment of the present disclosure.
Figure 61:
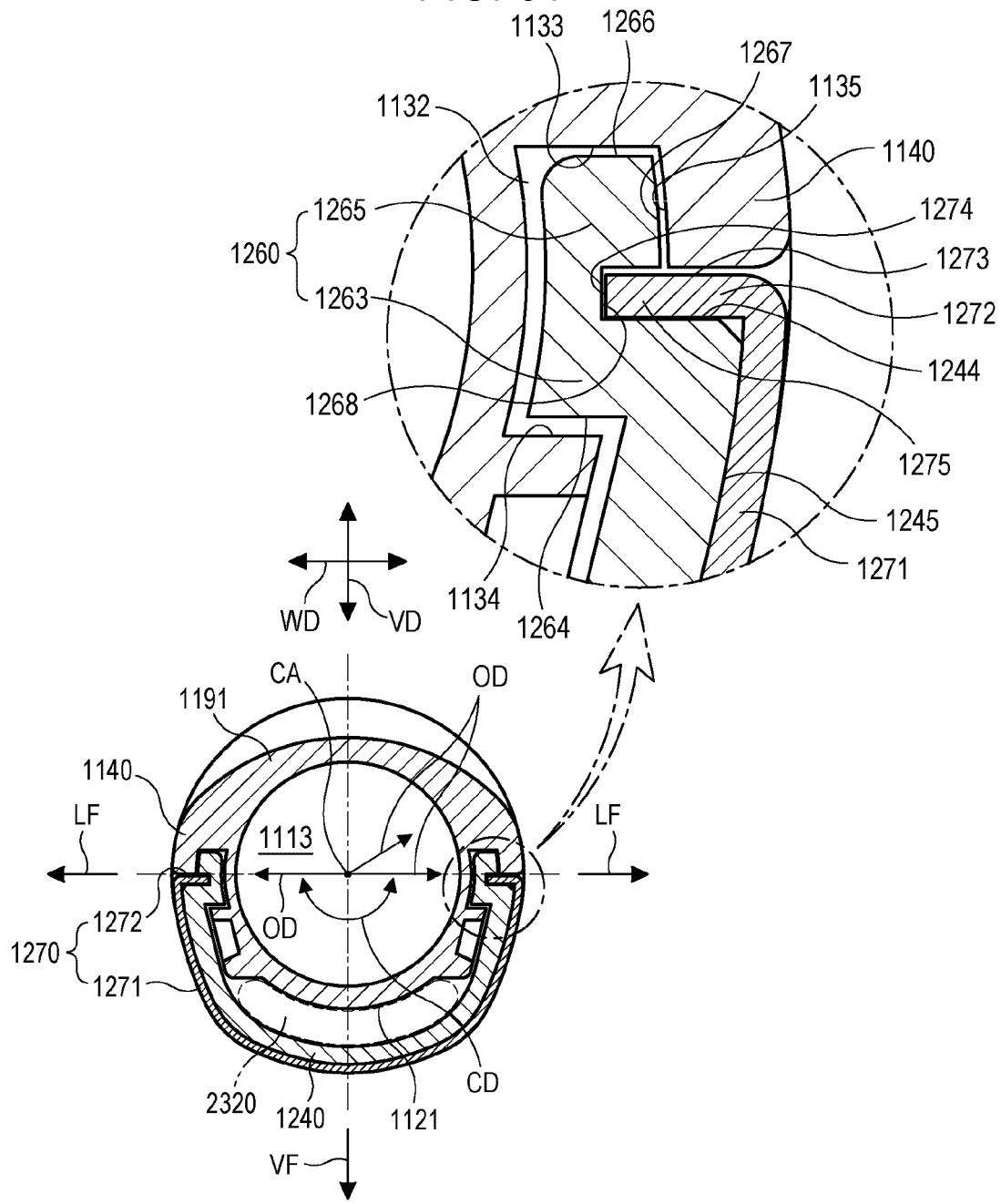
FIG. 61 is a cross-sectional view taken along line 61-61 of FIG. 60.

FIG. 60 is a side view showing a portion of a fishing rod including a reel seat according to one embodiment of the present disclosure. FIG. 61 is a cross-sectional view taken along line 61-61 of FIG. 60. Reference is made to FIGS. 60 and 61.

In the fishing rod 2000 shown in FIG. 60, the reel seat 1000 couples the reel 2300, such as the spinning reel shown in FIG. 57, to the rod bodies 2110 and 2120 of the fishing rod. The reel seat according to this embodiment has a structure and configuration where the structure and configuration of the reel seat described with reference to FIGS. 57 to 60 is reversed back and forth. Thus, the structure and configuration of the movable hood 1200 of the reel seat 1000 according to this embodiment can be understood by referring to the structure and configuration of the movable hood according to the above-described embodiment.

The first leg 2310 of the reel 2300 extends in the frontward direction and is fixed by the first hood portion 1122 located at the front portion of the reel seat 1000. The second leg 2320 of the reel extends in the rearward direction, and is fixed by the second hood portion 1240 of the movable hood 1200 located at the rear portion of the reel seat 1000.

The seating portion 1121 of the seat body is located in the lower surface of the seat body. The projecting portion 1140 is located at the rear portion of the seat body, and the movable hood 1200 is located at the rear portion of the reel seat. To fix the second leg 2320, the movable hood 1200 is moved by the nut 1211 toward the first hood portion 1122 in the frontward direction. The curved surface portion 1191 is located adjacent to the projecting portion 1140 and is arcuately curved so as to be concave with respect to the central axis CA. The curved surface portion 1191 can make contact with a palm. The lower surface of the grip body in which the first hood portion 122 is formed can make contact with the index finger F1, and the upper surface of the grip body located at the opposite side of the first hood portion 1122 can make contact with the thumb F5. The reinforcing cover 1270 can make contact with the little finger F4.

When the second hood portion 1240 is moved alongside the projecting portion 1140, the reaction force VF (see FIG. 61) acts to push the second hood portion 1240 downward. The cover portion 1271 of the reinforcing cover can prevent the deformation of the second hood portion 1240, and the engaging portion 1272 of the reinforcing cover can prevent the deformation of the guide protrusion 1260. Further, due to the second protrusion portion 1265, the guide protrusion 1260 can effectively resist the expansion force LF that expands the second hood portion 1240. Further, the inward end surface 1274 of the engaging portion 1272 can suppress being pushed in the radially outward direction (or in the width direction) of the second protrusion portion 1265, and can reinforce the guide protrusion 1260. Since the position where the convex portion 1275 is coupled to the concave portion 1268 is located above the inward surface 1135 of the guide groove, the second protrusion portion 1265 can be reinforced. Due to the rigidity of the reinforcing cover, the first protrusion portion 1263 and the second protrusion portion 1265 are suppressed from being pushed in the radially outward direction, and the deformation of the guide protrusion 1260 is suppressed. Thus, when the expansion force LF acts on the second hood portion 1240, the guide protrusion 1260 is reinforced such that the guide protrusion 1260 is suppressed from being pushed in the radially outward direction due to the rigidity of the reinforcing cover 1270.

The configuration of the guide groove, the guide protrusion, and the reinforcing cover shown in FIG. 61 may be one example to be employed in the reel seat according to this embodiment. The configuration of the guide groove, the guide protrusion, and the reinforcing cover according to the embodiment shown in FIG. 46, and the configuration of the guide groove, the guide protrusion, and the reinforcing cover according to the embodiment shown in FIG. 51 may be employed in the reel seat according to this embodiment.

Figure 62:
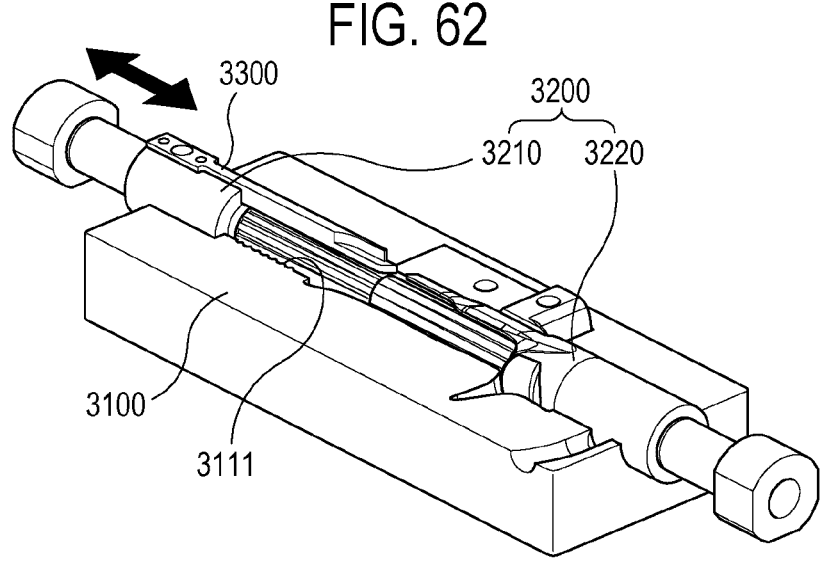
FIG. 62 is a perspective view showing a molding die apparatus capable of molding a seat body of a reel seat according to one embodiment.

In the reel seat of the above-described embodiments, the seat body includes the seating portion 1121, the first hood portion 1122, the projecting portion 1140, the male thread 1131, and the guide groove 1132. The guide groove 1132 extends from the front or rear end of the seat body through the male thread 1131 to the projecting portion 1140, and has its terminal end within the region of the projecting portion 1140. Further, the guide groove 1132 is formed to have the first circumferential surface 1133 and the inward surface 1135. The seat body configured as described above is integrally formed so as to have the seating portion 1121, the first hood portion 1122, the projecting portion 1140, the male thread 1131, and the guide groove 1132, and may be molded from thermoplastic resin. Byway of example, the seat body may be integrally molded from glass fiber-reinforced thermoplastic resin. As another example, the seat body may be integrally molded from carbon fiber-reinforced thermoplastic resin having a low density and a high tensile strength. Regarding molding the seat body, reference is made to FIG. 62 which shows a portion of a molding die apparatus capable of molding a seat body of a reel seat according to one embodiment.

A molding cavity 3111 of a molding die 3100 is formed to correspond to the shape of the outer surface of the seat body. A core 3200 corresponding to the shape of the bore of the seat body is disposed in the molding cavity 3111. The core 3200 is formed in an approximately cylindrical shape and has a high rigidity. The core 3200 has a first portion 3210 and a second portion 3220 slidably coupled to each other. The guide groove, which has the first and second circumferential surfaces and the inward surface, may be formed by an insert 3300, and the insert 3300 is fixed to the first portion 3210 of the core by bolts or pins. Thus, the insert 3300, which is thin and tends to deform, can be made to slide without deformation, by a sliding force of the first portion 3210 of the core.

Figure 63:
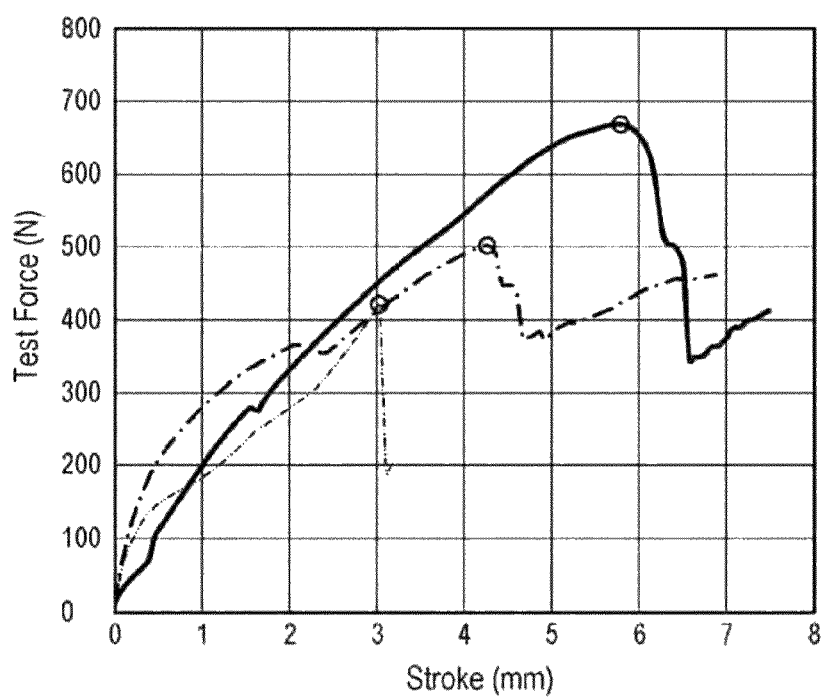
FIG. 63 is a graph showing results of a strength measurement test for the movable hood according to one embodiment and the movable hood according to a comparative example.

As described above, the reinforcing cover reinforces the second hood portion and the guide protrusion, and suppresses the deformation of the second hood portion and the guide protrusion. Thus, the movable body of the reel seat according to one embodiment has an improved strength. To evaluate the improved strength of the movable body, a strength measurement test was conducted, by using a load tester, on the movable hood having the movable body according to the embodiment and the movable hood according to a comparative example. In the strength measurement test, similarly to the case where the expansion force expanding the second hood portion (e.g., the expansion force LF shown in FIGS. 51, 56 and 59) acts on the second hood portion, a pressing force was applied to the movable hood by the load tester. Reference is made to FIG. 63 which shows results of the strength measurement test.

A solid line shown in FIG. 63 corresponds to the result of the strength measurement test for the movable hood according to one embodiment, which has the second hood portion and the accommodating portion with the reinforcing cover coupled to the second hood portion. An alternate long and short dash line shown in FIG. 63 corresponds to the result of the strength measurement test for the movable hood according to one embodiment, which has the second hood portion and the accommodating portion, but does not have the reinforcing cover. An alternate long and two short dashes line shown in FIG. 63 corresponds to the result of the strength measurement test for the movable hood according to a comparative example, which does not have the second hood portion and the accommodating portion and is formed in a cylindrical shape. The movable hood according to one embodiment, which has the second hood portion and the accommodating portion with the reinforcing cover coupled to the second hood portion, showed the highest test force of 668 N. The movable hood according to one embodiment, which has the second hood portion and the accommodating portion but does not have the reinforcing cover, showed the test force of 502 N. The movable hood according to the comparative example, which is formed in a cylindrical shape, showed the lowest test force of 420 N.

The technical idea of the present disclosure has been described heretofore with reference to some embodiments and examples shown in the accompanying drawings. However, it is to be understood that various substitutions, modifications, and alterations may be made without departing from the technical idea and scope of the present disclosure that can be understood by those of ordinary skill in the technical field to which the present disclosure pertains. Further, it is to be understood that such substitutions, modifications, and alterations fall within the scope of the appended claims.

What is claimed is:

1. A reel seat for coupling a reel having first and second legs to a rod body of a fishing rod, comprising:
    a seat body having a bore which is formed in an axial direction of the rod body and is capable of being coupled to the rod body; and
    a movable hood coupled to the seat body so as to be movable along a central axis of the bore,
    wherein the seat body includes:
    a seating portion which forms a portion of an upper surface of the seat body or a portion of a lower surface of the seat body, and on which the first and second legs are seated;
    a first hood portion located at the seating portion so as to be located opposite to the movable hood and fixing the first leg;
    a projecting portion formed along a circumferential direction of the central axis at an opposite side of the seating portion with reference to the central axis and protruding in a radially outward direction of the central axis;
    a cylindrical end portion extending from the seating portion and the projecting portion along the central axis;
    a male thread formed on an outer periphery of the cylindrical end portion; and
    a pair of guide grooves extending from one end of the cylindrical end portion through the male thread to the projecting portion, wherein the movable hood includes:
a nut coupled to the male thread of the seat body so as to be rotatable in the circumferential direction; and
a movable body movable along the central axis by the nut, and
wherein the movable body includes:
an annular portion to which the nut is relatively rotatably coupled;
a second hood portion extending from the annular portion toward the first hood portion, formed so as to press and fix the second leg to the seating portion, and positioned at an opposite side of the projecting portion in a vertical direction by moving alongside the projecting portion along the central axis;
an accommodating portion located at an opposite side of the second hood portion in the vertical direction, formed as a space between the annular portion and the second hood portion, and accommodating the projecting portion;
a guide protrusion formed on each of a pair of lateral end edges of the second hood portion in the circumferential direction and slidably inserted into each of the pair of guide grooves; and
a reinforcing cover configured to cover an outer surface of the second hood portion and to be engaged with the pair of lateral end edges to prevent deformation of the second hood portion and the guide protrusion.

2. The reel seat of claim 1, wherein the reinforcing cover includes a cover portion formed so as to be in close contact with the outer surface, and an engaging portion protruding from each lateral end of the cover portion in the circumferential direction and engaged with one of the pair of lateral end edges,
wherein the accommodating portion has a pair of first edges that become the pair of lateral end edges of the second hood portion respectively and are parallel to the central axis, and a second edge interconnecting the pair of first edges,
wherein the projecting portion has edges formed in a shape corresponding to the pair of first edges and the second edge, and
wherein one of the pair of first edges partially includes a surface of the engaging portion in the circumferential direction.

3. The reel seat of claim 2, wherein the second hood portion has a pair of engaging grooves with each of which the engaging portion is engaged, and the pair of engaging grooves are formed along the pair of lateral end edges respectively and have a depth corresponding to a thickness of the engaging portion.

4. The reel seat of claim 3, wherein the second hood portion has a seating groove which is formed between the pair of engaging grooves along the outer surface, and on which the cover portion is seated, and the seating groove has a depth corresponding to a thickness of the cover portion.

5. The reel seat of claim 2, wherein the guide protrusion includes a first protrusion portion extending from one of the pair of lateral end edges toward the central axis, and a second protrusion portion extending from the first protrusion portion beyond the central axis in the circumferential direction,
wherein each of the pair of guide grooves has:
a circumferential surface spaced apart from the central axis in the vertical direction and capable of making contact with a circumferential surface of the second protrusion portion in the circumferential direction; and
an inward surface located inside the projecting portion, extending from the circumferential surface in the circumferential direction, and capable of making contact with an outward surface of the second protrusion portion in the radially outward direction, and
wherein the engaging portion is engaged with the one of the pair of lateral end edges so as to face toward the outward surface of the second protrusion portion to suppress deformation of the guide protrusion.

6. The reel seat of claim 5, wherein the reinforcing cover includes at least one convex portion protruding from the engaging portion toward the central axis,
wherein the guide protrusion includes a concave portion which is formed in the outward surface of the second protrusion portion to be adjacent to the first protrusion portion, and with which the convex portion is engaged with, and
wherein the convex portion is engaged with the concave portion to suppress deformation of the guide protrusion.

7. The reel seat of claim 1, wherein the reinforcing cover is made of a metal material.

8. The reel seat of claim 1, wherein the seat body is integrally formed and is made of carbon fiber-reinforced thermoplastic resin.

9. The reel seat of claim 1, wherein the seating portion is located in the upper surface of the seat body, and
wherein the seat body includes a curved surface portion which is arcuately curved so as to be concave with respect to the central axis, is located adjacent to the projecting portion, and is capable of making contact with an index finger.

10. The reel seat of claim 1, wherein the seating portion is located in the lower surface of the seat body,
wherein the reinforcing cover is capable of making contact with an index finger, and
wherein the seat body includes a curved surface portion which is arcuately curved so as to be concave with respect to the central axis, is located adjacent to the projecting portion, and is capable of making contact with a thumb.

11. The reel seat of claim 1, wherein the seating portion is located in the lower surface of the seat body,
wherein the reinforcing cover is capable of making contact with a little finger, and
wherein the seat body includes a curved surface portion, which is arcuately curved so as to be concave with respect to the central axis and is located adjacent to the projecting portion.

12. A fishing rod comprising:
a rod body; and
the reel seat of claim 1 coupled to the rod body.

* * * * *